United States Patent
Okazaki et al.

(10) Patent No.: US 9,452,331 B2
(45) Date of Patent: Sep. 27, 2016

(54) GOLF CLUB SHAFT FITTING METHOD

(71) Applicants: DUNLOP SPORTS CO. LTD., Kobe, Hyogo (JP); SUMITOMO RUBBER INDUSTRIES, LTD., Kobe, Hyogo (JP)

(72) Inventors: Kousuke Okazaki, Kobe (JP); Masahiko Ueda, Kobe (JP); Masatoshi Kato, Kobe (JP)

(73) Assignees: DUNLOP SPORTS CO. LTD., Kobe-Shi (JP); SUMITOMO RUBBER INDUSTRIES, LTD., Kobe-Shi (JP)

( * ) Notice: Subject to any disclaimer, the term of this patent is extended or adjusted under 35 U.S.C. 154(b) by 383 days.

(21) Appl. No.: 13/853,125

(22) Filed: Mar. 29, 2013

(65) Prior Publication Data

US 2013/0260923 A1  Oct. 3, 2013

(30) Foreign Application Priority Data

Mar. 30, 2012 (JP) ................. 2012-081773
Mar. 30, 2012 (JP) ................. 2012-081800
Mar. 30, 2012 (JP) ................. 2012-081828
May 17, 2012 (JP) ................. 2012-113777

(51) Int. Cl.
*A63B 57/00* (2015.01)
*G01B 7/00* (2006.01)

(52) U.S. Cl.
CPC ............. *A63B 57/00* (2013.01); *G01B 7/001* (2013.01)

(58) Field of Classification Search
USPC ................................. 473/316, 409
See application file for complete search history.

(56) References Cited

U.S. PATENT DOCUMENTS

| 5,233,544 | A  | * | 8/1993  | Kobayashi ............ 702/141 |
| 5,351,952 | A  | * | 10/1994 | Hackman ............. 473/409 |
| 5,441,256 | A  | * | 8/1995  | Hackman ............. 473/409 |
| 5,591,091 | A  | * | 1/1997  | Hackman ............. 473/289 |
| 6,224,493 | B1 | * | 5/2001  | Lee et al. ............ 473/223 |
| 6,441,745 | B1 | * | 8/2002  | Gates .................. 340/669 |
| 6,607,450 | B1 | * | 8/2003  | Hackman ............. 473/223 |
| 6,702,692 | B1 | * | 3/2004  | Smith .................. 473/289 |
| 6,719,648 | B1 | * | 4/2004  | Smith .................. 473/409 |
| 6,966,843 | B2 | * | 11/2005 | Rankin et al. ........ 473/202 |
| 7,041,014 | B2 | * | 5/2006  | Wright et al. ........ 473/409 |
| 7,147,570 | B2 | * | 12/2006 | Toulon et al. ........ 473/290 |
| 7,871,333 | B1 | * | 1/2011  | Davenport et al. ... 473/223 |
| 7,887,440 | B2 | * | 2/2011  | Wright et al. ........ 473/409 |
| 8,425,340 | B2 | * | 4/2013  | Davenport ........... 473/223 |
| 8,444,510 | B2 | * | 5/2013  | Olsson et al. ........ 473/409 |
| 8,506,425 | B2 | * | 8/2013  | Wright et al. ........ 473/409 |
| 8,657,707 | B2 | * | 2/2014  | Ueda et al. .......... 473/409 |
| 8,700,354 | B1 | * | 4/2014  | Bentley et al. ....... 702/141 |
| 8,944,932 | B2 | * | 2/2015  | Sato et al. ........... 473/223 |

(Continued)

FOREIGN PATENT DOCUMENTS

JP  2006-230466 A  9/2006
JP  2009-18043 A   1/2009

*Primary Examiner* — Gene Kim
*Assistant Examiner* — Matthew B Stanczak
(74) *Attorney, Agent, or Firm* — Birch, Stewart, Kolasch & Birch, LLP

(57) ABSTRACT

A fitting method of a shaft of a golf club for selecting a shaft matching a golfer based on a swing of the golfer. The method includes the steps of obtaining measurement values from a sensor attached to a grip of a golf club; determining address, top, and impact of a swing from the measurement values; and selecting a shaft that matches a golfer through a usage of the swing characteristic amounts and values.

6 Claims, 59 Drawing Sheets

(56) References Cited

U.S. PATENT DOCUMENTS

| | | | |
|---|---|---|---|
| 8,992,346 B1* | 3/2015 | Raposo | 473/407 |
| 9,028,337 B2* | 5/2015 | Bentley | 473/223 |
| 9,033,810 B2* | 5/2015 | Bentley | 473/221 |
| 2002/0077189 A1* | 6/2002 | Tuer et al. | 473/151 |
| 2003/0008731 A1* | 1/2003 | Anderson et al. | 473/407 |
| 2003/0040380 A1* | 2/2003 | Wright et al. | 473/409 |
| 2006/0166738 A1* | 7/2006 | Eyestone et al. | 463/36 |
| 2007/0135225 A1* | 6/2007 | Nieminen et al. | 473/212 |
| 2010/0267462 A1 | 10/2010 | Mooney | |
| 2010/0323805 A1* | 12/2010 | Kamino et al. | 473/221 |
| 2011/0028248 A1* | 2/2011 | Ueda | 473/409 |
| 2011/0124440 A1* | 5/2011 | Ueda et al. | 473/409 |
| 2012/0015754 A1* | 1/2012 | Balardeta et al. | 473/222 |
| 2012/0277015 A1* | 11/2012 | Boyd et al. | 473/223 |
| 2013/0065711 A1* | 3/2013 | Ueda et al. | 473/409 |

* cited by examiner

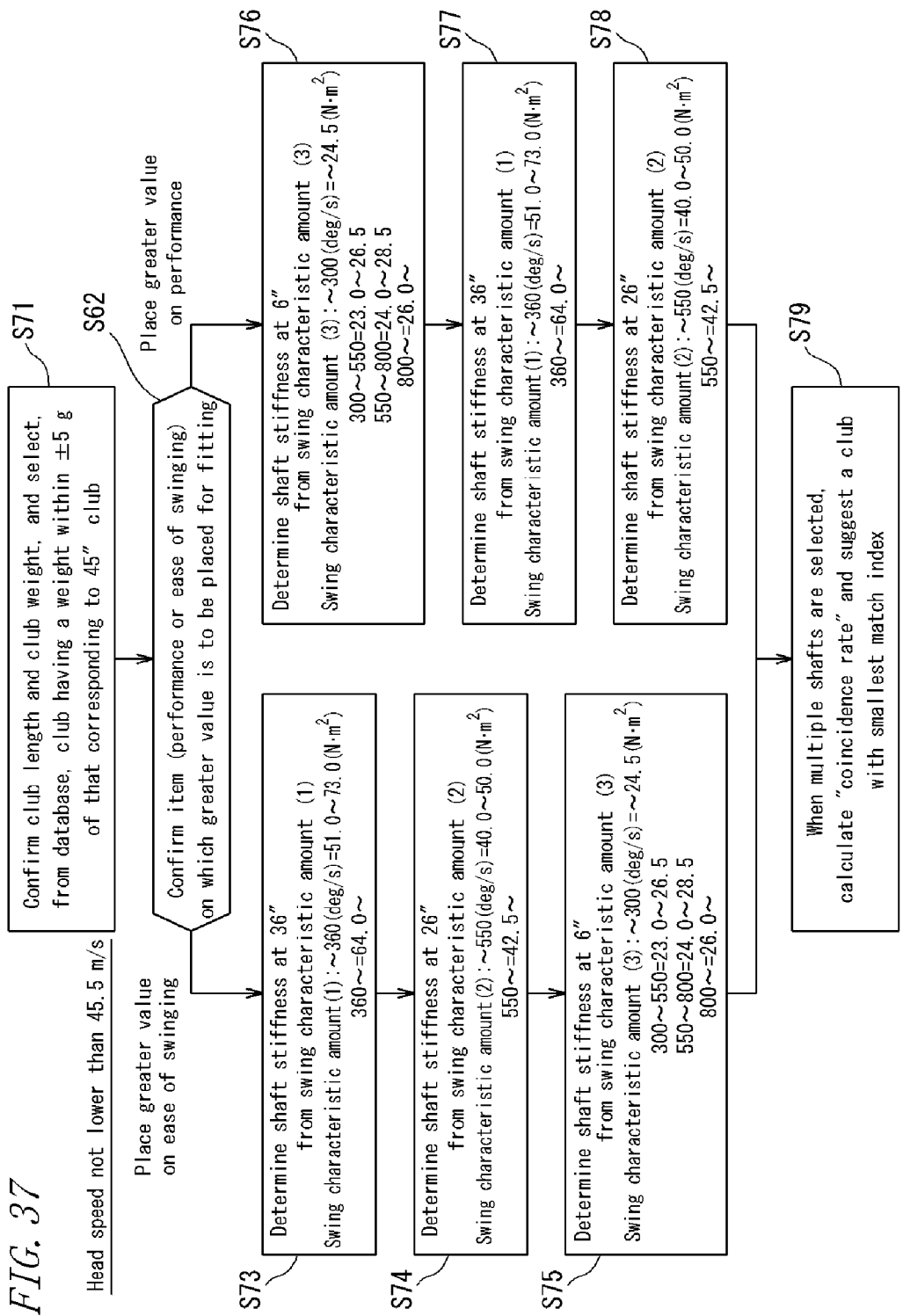

GOLF CLUB SHAFT FITTING METHOD

TECHNICAL FIELD

The present invention relates to a method for fitting shafts of golf clubs.

BACKGROUND ART

For golfers, it is an eternal theme to extend flight distance of a ball and shoot the ball at an aimed direction and angle. Therefore, it is important to use a golf club suited for one's own swing.

Selecting a golf club suited for a golfer is generally referred to as fitting. In order to effectively perform this fitting, it is necessary to take into consideration various factors such as the total weight of a golf club, the weight of a club head, and the length of the golf club. In particular, the success or failure of fitting is greatly influenced by physical properties of a shaft of a golf club.

For example, one of the physical properties of a shaft is flex. This flex represents the hardness (stiffness) of a shaft. As shown in FIG. 58, when a point that is 129 mm away from a tip end 20a of a shaft 20 is defined as a load point $W_1$, when a point that is 824 mm away towards the butt end side of the shaft 20 from the load point $W_1$ is defined as a fulcrum point A, and when a position that is 140 mm away towards the butt end side from the fulcrum point A is defined as a working point B; a forward flex is a displacement magnitude of the tip end 20a when a load Wt of 2.7 kgf is applied on the load point $W_1$. With respect to this displacement magnitude F1 (this value is referred to as forward flex), flex is determined by defining, as an X shaft, one that has a range from certain value f1 to certain value f2.

Generally, regarding flex, a suited hardness is recommended depending on the level of head speed. A shaft that is easily flexed is recommended for a golfer with a relatively low head speed, whereas a shaft that is hard is recommended for a golfer having a relatively high head speed. However, there is no unified standard for flex, and different standards are defined by every manufacturer. Therefore, selecting a suited flex value depends largely on the experience and intuition of the person (fitter) who performs the fitting, and the selection result is not objective and varies from person to person.

Another physical property of a shaft is kick point. As shown in FIG. 59, the kick point is determined in the following manner. When a position that is 12 mm away from the tip end 20a of the shaft 20 is defined as a working point C, when a point 140 mm away from the working point C towards the butt end of the shaft 20 is defined is a fulcrum point D, and when a point 776 mm away from the fulcrum point D towards to the butt end side is defined as a load point $W_2$; a displacement magnitude F2 (this value is referred to as backward flex) of the butt end 20b when a load Wt of 1.3 kgf is applied on the load point $W_2$ is obtained, T is calculated from values of this F2 and the above described F1 (forward flex) in accordance with the following expression (1), and it is determined whether a shaft has low kick point or high kick point depending on the magnitude of the value of T.

$$T = F2/(F1+F2) \times 100 \quad (1)$$

Similar to the case using the above described flex, selecting a golf club using this kick point also has to depend on the experience and intuition of the person who performs the fitting, and the selection result is not objective and varies from person to person.

Therefore, when performing the fitting, it is proposed to ask a golfer to actually swing a golf club, and perform the fitting from a measurement result of the swing (e.g., cf. Patent Literatures 1 and 2).

Patent Literature 1 discloses an evaluation method of a golf swing, and the method includes: a model creation step of generating a golf club model of a golf club used in a golf swing; a property value calculation step of calculating, in order to reproduce a golf swing using the golf club model, a desired dynamic property value of the golf club model in a golf swing by computing a swing action of the golf club model by providing a predetermined boundary condition to the golf club model; a repeat step of obtaining respective dynamic property values for multiple golf club models by repeatedly conducting the property value calculation step while changing the type of the golf club model that is generated; and a swing evaluation step of extracting a maximum value and a minimum value of the dynamic property values among the multiple dynamic property values obtained in the repeat step, and classifying and evaluating characteristics of a golf swing based on the difference between the maximum value and the minimum value.

Furthermore, Patent Literature 2 discloses a swing evaluation method of a golf club including a golf club head provided with, at a crown part thereof, a hosel part at which a golf club shaft is mounted. In the swing evaluation method, respective speeds during a swing of a golf club are measured at two points that are separated by at least 10 mm and are on an intersection line of the crown part of the golf club head and a plane that, when the golf club head is placed on the horizontal plane, contains an axis line of the golf club shaft and that perpendicularly intersects the horizontal plane, and the swing is evaluated based on the speed of each of the points.

CITATION LIST

Patent Literature

[PTL 1] Japanese Laid-Open Patent Publication No. 2006-230466

[PTL 2] Japanese Laid-Open Patent Publication No. 2009-18043

SUMMARY OF INVENTION

Technical Problem

However, with the method disclosed in Patent Literature 1, the size of the apparatus used therein is large and there is a limit in the location where the apparatus can be installed. In addition, since a large-scale computation device is required, there is a problem of the cost being high.

Furthermore, in the method disclosed in Patent Literature 2, the evaluation of a swing is performed only from the impact, and characteristics of the whole swing from the address to the impact via the top are not reflected therein. Therefore, there are cases where a shaft suited for a swing of a golfer cannot be selected, and improvements have been desired.

The present invention has been made in view of such circumstances, and an objective of the present invention is to provide a fitting method of a shaft of a golf club, allowing a wide selection range for an installation location of an apparatus that is used, since the apparatus can be made small and light, and enabling fitting that reflects the whole swing and that is based on further detailed shaft specifications.

Solution to the Problems (1) A fitting method of a shaft of a golf club (hereinafter, also simply referred to as "fitting method") according to a first aspect of the present invention is a fitting method for selecting a shaft matching a golfer based on a swing of the golfer, the method comprising the steps of:

obtaining measurement values from a sensor attached to a grip of a golf club and capable of measuring angular velocities about three axes when a golf ball is hit by the golf club;

determining address, top, and impact of a swing from the measurement values; and selecting a shaft that matches a golfer through a usage of the following swing characteristic amounts of (a) to (d) obtained from the measurement values.

(a) Amount of change of grip angular velocity in a direction of a wrist cock around the top.

(b) An average value of grip angular velocity in the direction of a wrist cock, from the top to a point during a downswing where a grip angular velocity in the direction of a wrist cock becomes a maximum.

(c) An average value of grip angular velocity in the direction of a wrist cock, from a point during a downswing where a grip angular velocity in the direction of a wrist cock becomes a maximum to the impact.

(d) An average value of grip angular velocity in the direction of a wrist cock, from the top to the impact.

With the fitting method according to the first aspect of the present invention, since a shaft can be selected based on not only limited phases along a swing of a golfer but on four swing characteristic amounts reflecting the whole swing from the top to the impact, fitting can be performed based on further detailed shaft specifications. As a result, it becomes possible to provide a shaft with further excellent performance (flight distance, directionality, and ease of swinging) for the golfer.

In addition, with the fitting method according to the first aspect of the present invention, since swing characteristics can be quantified by simply mounting a sensor on the grip end of a club and since it is unnecessary to have large-scale equipment such as a conventional camera or the like, the cost for the equipment for the fitting can be reduced. Furthermore, since data can be wirelessly delivered to a data analysis device and the overall configuration of the equipment can be simplified, it is possible to easily carry, install, and remove the equipment.

(2) Possibly in the fitting method of (1):
the above described (a) to (d) are respectively selected so as to correspond to bending stiffnesses of the shaft at four positions of 36 inches, 26 inches, 16 inches, and 6 inches each from a tip end of the shaft;

an approximate expression that is created in advance with test-hitting and that represents a relationship between bending stiffnesses of the shaft and each of the swing characteristic amounts of (a) to (d), and the swing characteristic amounts of (a) to (d) obtained from the measurement values, are used to acquire bending stiffnesses of the shaft at four positions of 36 inches, 26 inches, 16 inches, and 6 inches from the tip end of the shaft; and from multiple shafts whose bending stiffnesses are measured in advance at the four positions, a shaft matching a golfer is selected based on the acquired bending stiffnesses of the shaft at four positions.

(3) Preferably in the fitting method of (2):
one rank value among multiple-scale rank values is given to each of the bending stiffnesses at the four positions in accordance with the acquired bending stiffness values; and a shaft matching a golfer is selected based on the given rank values at the four positions, from multiple shafts whose bending stiffnesses have been measured in advance at the four positions and that are each given one rank value among multiple-scale rank values in accordance with measured bending stiffness values.

(4) Preferably in the fitting method of (2), multiple approximate expressions are created in accordance with head speed.

(5) Preferably in the fitting method of (2), when a length of the golf club of a user is different from a length of a golf club having the shaft selected from multiple shafts, a total weight of the golf club is changed based on the difference of the two lengths.

(6) A fitting method of a shaft of a golf club according to a second aspect of the present invention is a fitting method for selecting a shaft matching a golfer based on a swing of the golfer, the method comprising the steps of:

obtaining measurement values from a sensor attached to a grip of a golf club and capable of measuring angular velocities about three axes when a golf ball is hit by the golf club;

determining address, top, and impact of a swing from the measurement values; and selecting a shaft that matches a golfer through a usage of at least two of the following swing characteristic amounts of (a) to (c) obtained from the measurement values, wherein the above described (a) to (c) are respectively selected so as to correspond to bending stiffnesses of the shaft at three positions of 36 inches, 26 inches, and 6 inches each from a tip end of the shaft, based on a relationship between bending stiffnesses of the shaft and each of the swing characteristic amounts of (a) to (c) created in advance with test-hitting, in each of the positions, each of the swing characteristic amounts is divided into multiple ranges, and bending-stiffness ranges of the shaft are configured so as to correspond to the respective ranges, from the measurement values, the bending-stiffness ranges of the shaft are acquired at positions corresponding to the swing characteristic amounts at least two positions among three positions of 36 inches, 26 inches, and 6 inches from the tip end of the shaft, and from multiple shafts whose bending stiffnesses are measured in advance at the three positions, a shaft matching a golfer is selected based on the acquired bending-stiffness ranges of the shaft at least two positions.

(a) Amount of change of grip angular velocity in a direction of a wrist cock around the top.

(b) An average value of grip angular velocity in the direction of a wrist cock, from the top to a point during a downswing where a grip angular velocity in the direction of a wrist cock becomes a maximum.

(c) An average value of grip angular velocity in the direction of a wrist cock, from the top to the impact.

With the fitting method according to the second aspect of the present invention, since a shaft can be selected based on not only limited phases along a swing of a golfer but on at least two among three swing characteristic amounts reflecting the whole swing from the top to the impact, fitting can be performed based on further detailed shaft specifications. As a result, it becomes possible to provide a shaft with further excellent performance (flight distance, directionality, and ease of swinging) for the golfer.

In addition, with the fitting method according to the second aspect of the present invention, since swing characteristics can be quantified by simply mounting a sensor on the grip end of a club and since it is unnecessary to have large-scale equipment such as a conventional camera or the like, the cost for the equipment for the fitting can be reduced. Furthermore, since data can be wirelessly delivered to a data analysis device and the overall configuration of the equipment can be simplified, it is possible to easily carry, install, and remove the equipment.

(7) Possibly in the fitting method of (6):

one rank value among multiple-scale rank values is given to each of bending stiffnesses at the three positions in accordance with the acquired bending stiffness values; and a shaft matching a golfer is selected based on the given rank values at the three positions, from multiple shafts whose bending stiffnesses have been measured in advance at the three positions and that are each given one rank value among multiple-scale rank values in accordance with measured bending stiffness values.

(8) Possibly in the fitting method of (6):

a classification of bending stiffness EI $(N \cdot m^2)<68.5$ is applied when the swing characteristic amount (a) is not larger than 360 (deg/s), and a classification of bending stiffness EI $(N \cdot m^2)>60.0$ is applied when the swing characteristic amount (a) is larger than 360 (deg/s);

a classification of bending stiffness EI $(N \cdot m^2)<47.5$ is applied when the swing characteristic amount (b) is not larger than 550 (deg/s), and a classification of bending stiffness EI $(N \cdot m^2)>42.5$ is applied when the swing characteristic amount (b) is larger than 550 (deg/s); and a classification of bending stiffness EI $(N \cdot m^2)<24.5$ is applied when the swing characteristic amount (c) is not larger than 400 (deg/s), a classification of $23.0<$bending stiffness EI $(N \cdot m^2)<27.5$ is applied when the swing characteristic amount (a) is larger than 400 (deg/s) but not larger than 800 (deg/s), and a classification of bending stiffness EI $(N \cdot m^2)>25.5$ is applied when the swing characteristic amount (c) is larger than 800 (deg/s).

(9) Possibly in the fitting method of (8), upon selecting a shaft matching a golfer using the three swing characteristic amounts, when a shaft conforming to all the bending-stiffness ranges of the shaft acquired from each of the swing characteristic amount does not exist in the multiple shafts whose bending stiffnesses are measured in advance at the three positions corresponding to the three swing characteristic amounts; selecting of a shaft is conducted in accordance with a priority order of: a shaft conforming to a bending-stiffness range of a shaft acquired from the swing characteristic amount of (c), a shaft conforming to a bending-stiffness range of a shaft acquired from the swing characteristic amount of (a), and a shaft conforming to a bending-stiffness range of a shaft acquired from the swing characteristic amount of (b).

(10) Possibly in the fitting method of (8), upon selecting a shaft matching a golfer using the three swing characteristic amounts, when a shaft conforming to all the bending-stiffness ranges of the shaft acquired from each of the swing characteristic amount does not exist in the multiple shafts whose bending stiffnesses are measured in advance at the three positions corresponding to the three swing characteristic amounts; selecting of a shaft is conducted in accordance with a priority order of: a shaft conforming to a bending-stiffness range of a shaft acquired from the swing characteristic amount of (a), a shaft conforming to a bending-stiffness range of a shaft acquired from the swing characteristic amount of (b), and a shaft conforming to a bending-stiffness range of a shaft acquired from the swing characteristic amount of (c).

(11) A fitting method of a shaft of a golf club according to a third aspect of the present invention is a fitting method of a shaft of a golf club for selecting a shaft matching a golfer based on a swing of the golfer, the method comprising the steps of:

obtaining measurement values from a sensor attached to a grip of a golf club and capable of measuring angular velocities about three axes when a golf ball is hit by the golf club, and measuring a face angle and an approach angle of a head of the golf club immediately before impact;

determining timing of top and impact of a swing from the measurement values; and selecting a shaft that matches a golfer, through a usage of at least two swing characteristic amounts of the following (a) to (d) obtained from the measurement values, and the measured face angle and approach angle, wherein a shaft suited for a golfer is preliminarily selected based on the measured face angle and approach angle and on a relation C created using a pre-created correlation R between a hit-ball result and face angle and approach angle immediately before impact, and then a shaft is selected with a usage of the swing characteristic amounts.

(a) Amount of change of grip angular velocity in a direction of a wrist cock around the top.

(b) An average value of grip angular velocity in the direction of a wrist cock, from the top to a point during a downswing where a grip angular velocity in the direction of a wrist cock becomes a maximum.

(c) An average value of grip angular velocity in the direction of a wrist cock, from a point during a downswing where a grip angular velocity in the direction of a wrist cock becomes a maximum to the impact.

(d) An average value of grip angular velocity in the direction of a wrist cock, from the top to the impact.

In the fitting method according to the third aspect of the present invention, a kick point rate suited for a golfer is obtained using a face angle and an approach angle obtained by having the golfer actually swing a golf club, and a preliminary selection of a shaft is conducted based on this kick point rate. Then a flex suited for the golfer is obtained using swing characteristic amounts measured from the swing by the golfer. With this, it is possible to suggest the golfer a shaft having further excellent performance by taking into consideration both the kick point rate and flex of the shaft.

(12) Possibly in the fitting method of (11):

the correlation R is based on hit-ball results of multiple golf clubs having different shaft kick point rates;

the relation C is a predetermined relational expression of a face angle and an approach angle immediately before impact and a shaft kick point rate created in advance; and in the step of selecting, a shaft kick point rate is calculated using the relational expression from the face angle and the approach angle immediately before impact, and a shaft conforming to the calculated kick point rate is preliminarily selected from multiple shafts.

(13) Possibly in the fitting method of (11):

the above described (a) to (d) correspond to bending stiffnesses of the shaft at four positions of 36 inches, 26 inches, 16 inches, and 6 inches each from a tip end of the shaft;

based on an approximate expression that is created in advance with test-hitting and that represents a relationship between bending stiffnesses of the shaft and each of the swing characteristic amounts of (a) to (d), from the swing characteristic amounts of (a) to (d) obtained from the measurement values, bending stiffness of the shaft is acquired at four positions of 36 inches, 26 inches, 16 inches, and 6 inches each from the tip end of the shaft; and from multiple shafts whose bending stiffnesses are measured in advance at the four positions, a shaft matching a golfer is selected based on the acquired bending stiffnesses of the shaft at four positions.

(14) Possibly in the fitting method of (13):

one rank value among multiple-scale rank values is given to each of the bending stiffnesses at the four positions in accordance with the acquired bending stiffness values; and a shaft matching a golfer is selected based on the given rank values at the four positions, from multiple shafts whose bending stiffnesses have been measured in advance at the four positions and that are each given one rank value among multiple-scale rank values in accordance with measured bending stiffness values.

(15) An extraction method of an impact time in a golf swing (hereinafter, also referred to as "extraction method") according to a fourth aspect of the present invention is a method for extracting an impact time in a swing based on measurement values from a sensor attached to a grip of a golf club and capable of measuring angular velocities about three axes when a golf ball is hit by the golf club, the method comprising the steps of:

judging whether or not an angular velocity ωz about a shaft axis, which is the z axis, in a predetermined time duration in measured data is over range;

configuring a first provisional impact time when a judgment of over range is obtained in the step of judging, and configuring a second provisional impact time when a judgment of over range has not been obtained;

acquiring three candidates for impact time from respective time-series waveforms of an angular velocity ωx about an x axis, an angular velocity ωy about a y axis, and an angular velocity ωz about a z axis using the configured first or second provisional impact time as a reference; and determining impact time in accordance with a predetermined determination criterion from the three candidates for impact time.

In the extraction method of the present invention, a provisional impact time is configured, and by using this provisional impact time as a reference, three candidates for impact time are acquired from respective time-series waveforms of angular velocities about three axes, and impact time is determined in accordance with a predetermined determination criterion from the three candidates. As a result, impact time can be determined with fine accuracy by removing conventionally known influences of over range etc. With this, analysis of a swing using this impact time can be performed correctly.

(16) Possibly in the extraction method of (15), the first provisional impact time is set to a time at which over range has occurred in the time-series waveform of the angular velocity ωz.

(17) Possibly in the extraction method of (15), when a minimum value has occurred in the time-series waveform of the angular velocity ωz after a time at which a maximum value has occurred but before a first predetermined time, the second provisional impact time is set as a time at which a maximum value has occurred after the time at which the minimum value has occurred but before a second predetermined time.

(18) Possibly in the extraction method of (15), when a minimum value has not occurred in the time-series waveform of the angular velocity ωz after a time at which a maximum value has occurred but before a first predetermined time, the maximum value is set as the second provisional impact time.

(19) Possibly in the extraction method of (16):

the candidate of impact time acquired from the time-series waveform of the angular velocity ωx is set to be a time at which a minimum value has occurred before a third predetermined time but after a time at which a local maximum value has firstly occurred in a first predetermined time duration around the first provisional impact time;

the candidate of impact time acquired from the time-series waveform of the angular velocity ωy is set to be a time at which a turning point has firstly occurred in a second predetermined time duration around the first provisional impact time; and the candidate of impact time acquired from the time-series waveform of the angular velocity ωz is set to be a time at which a turning point has firstly occurred after the first provisional impact time but before a fourth predetermined time.

It should be noted that "local maximum value" refers to a "certain point" in sampled data in a case where, for example, there is a successive increase in three points before the certain point and a successive reduction in two points beyond the certain point.

(20) Possibly in the extraction method of (17):

the candidate of impact time acquired from the time-series waveform of the angular velocity ωx is set to be a time at which a minimum value has occurred in a first predetermined time duration around the second provisional impact time, after a time at which a local maximum value has firstly occurred but before a third predetermined time;

the candidate of impact time acquired from the time-series waveform of the angular velocity ωy is set to be a time at which a turning point has firstly occurred in a second predetermined time duration around the second provisional impact time; and the candidate of impact time acquired from the time-series waveform of the angular velocity ωz is set to be a time at which a turning point has firstly occurred in a third predetermined time duration around the second provisional impact time.

Advantageous Effects of the Invention

The fitting method of the present invention allows a wide selection range for an installation location of an apparatus that is used, since the apparatus can be made small and light, and enables fitting that reflects the whole swing and that is based on further detailed shaft specifications.

BRIEF DESCRIPTION OF THE DRAWINGS

FIG. 37 is a flowchart showing one example of the shaft selection process when head speed is high;

DESCRIPTION OF EMBODIMENTS

In the following, detailed embodiments of a fitting method and an extraction method of impact time in a golf swing of the present invention will be described with reference to the accompanying drawings.

First Embodiment

Principle of Fitting Method of Present Invention

Before describing embodiments of the fitting method of the present invention, the principle or theoretical background of the fitting method of the present invention will be described. The present inventors have focused on the fact that bending of a shaft of a golf club travels from a hand side to a front end side of the shaft as a swing proceeds from the top to the impact. Then, as a result of conducting thorough research and examination under an assumption that there is a correlation between swing characteristics (details of the swing characteristics will be described later), of a certain golfer, associated with the course of time from the top to the impact and hardness in every inch of a shaft matching the golfer, the present inventors have accomplished the present invention.

Figure 1:
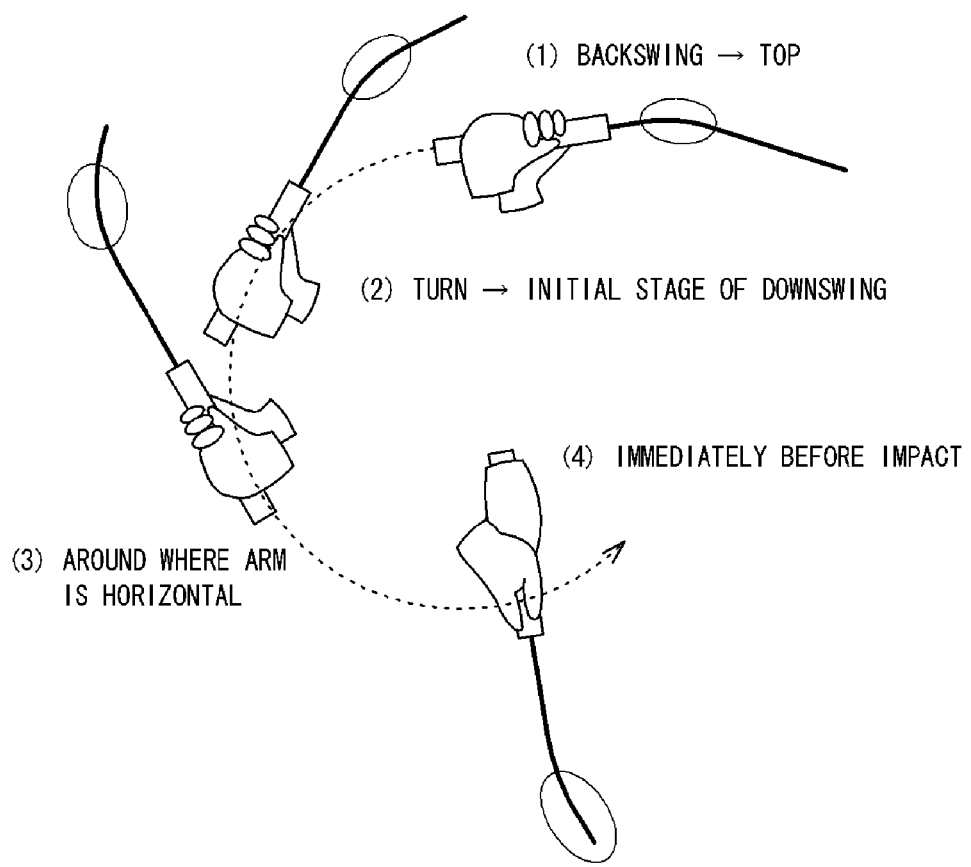
FIG. 1 is for describing an action of flexure in a shaft during a swing.

That is, a swing of a golfer when hitting a ball transitions from the address to top and to impact, and, at that moment, since a head having a relatively large weight exists at the front end of a golf club to cause inertia, bending occurs in a shaft of the golf club due to the inertia. The bending does not occur at the same part of the shaft during the whole swing process, and the bending is transferred from the hand side to the front end side of the shaft during the swing from the top to the impact as shown in FIG. 1. In other words, as the swing proceeds from the top to the impact, the position of bending in the shaft moves from the hand side to the front end side of the shaft.

More specifically, at a time point (a time point shown as (1) in FIG. 1) when a backswing is performed after addressing to reach the top, bending occurs in the shaft near the hand. Then, when a turn is performed to reach the initial stage of a downswing (a time point shown as (2) in FIG. 1), the bending moves slightly to the front end side of the shaft. Subsequently, at a time point when the golfer's arms become horizontal (a time point shown as (3) in FIG. 1), the bending moves further toward the front end side from the center of the shaft. Further, at a time point immediately before impact (a time point shown as (4) in FIG. 1), the bending moves near the front end of the shaft.

In view of the bending of shaft being transferred from the hand side to the front end side of the shaft during a swing from the top to the impact in the above described manner, the present inventors have focused on swing characteristics of a golfer in the time intervals of (1) to (4), and have attempted to select optimal bending stiffness in every inch of the shaft.

Figure 2:
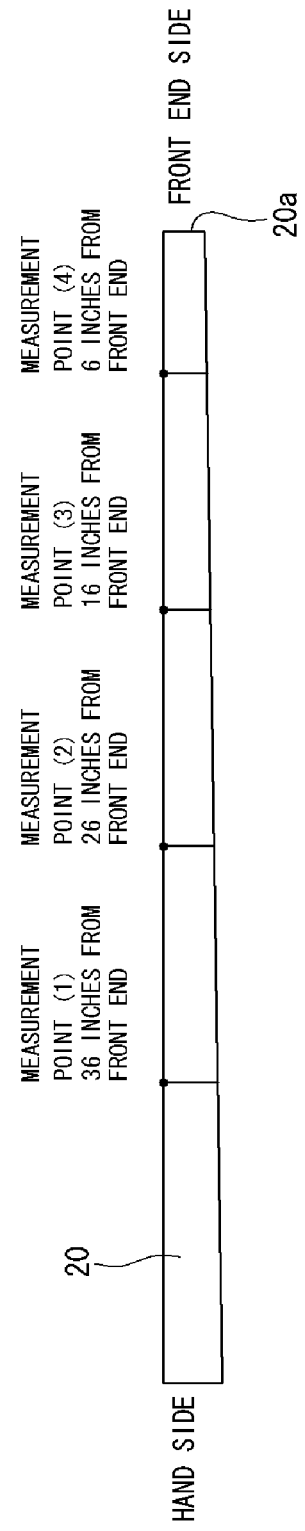
FIG. 2 is for describing four positions of a shaft at which bending stiffnesses are measured, in a fitting method according to a first embodiment of the present invention.

Specifically, as shown in FIG. 2, a shaft 20 is divided into four regions, and bending stiffness at a single point in each of the regions is defined. In the present embodiment, with respect to a tip end 20a of the shaft 20, a part 36 inches therefrom is defined as a measurement point (1), a part 26 inches therefrom is defined as a measurement point (2), a part 16 inches therefrom is defined as a measurement point (3), and a part 6 inches therefrom is defined as a measurement point (4). Then, bending stiffnesses at the four measurement points of the shaft 20 are measured and converted into numerical values. It should be noted that, in the present specification, "every inch" does not mean "at 1 inch, at 2 inches, etc.," but means "every part of a plurality of parts whose distances from one end of a shaft are predetermined inches;" and "predetermined inches" in the present embodiment are 36 inches, 26 inches, 16 inches, and 6 inches from the tip end 20a of the shaft 20 as described above. Although four measurements of bending stiffnesses of the shaft at 36 inches, 26 inches, 16 inches, and 6 inches from the tip end of the shaft are conducted in the present embodiment, the number of inches is not particularly limited in the present invention, and it is possible to apply changes to each number of inches within a range of plus and minus several inches. For example, the measurement point (1) may be set as 36±2 inches from the tip end of the shaft.

Figure 3:
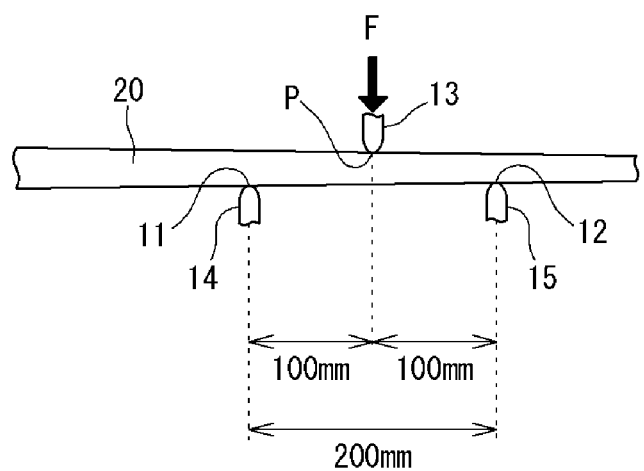
FIG. 3 is for describing a method for measuring bending stiffness in the present invention.

Bending stiffness (EI value: $N \cdot m^2$) of every inch of the shaft can be measured as shown in FIG. 3 using, for example, a model 2020 measuring machine (maximum load 500 kgf) manufactured by INTESCO Co., Ltd.

Specifically, a flexure amount α of a measurement point P is measured when a load F is applied thereto from above while the shaft 20 is supported from below at two supporting points 11 and 12. The measurement point P in the present embodiment is set at four parts, i.e., 36 inches, 26 inches, 16 inches, and 6 inches from the tip end 20a of the shaft 20. The distance (span) between the supporting point 11 and the supporting point 12 is 200 mm. In addition, the measurement point P is a midpoint between the supporting point 11 and the supporting point 12. The front end of a depressor 13 that applies the load F from above is rounded so as not to damage the shaft 20. A cross-sectional shape of the front end of the depressor 13 in a cross-section parallel to the shaft axis direction has a radius of curvature of 10 mm. In a cross-section perpendicular with respect to the shaft axis direction, a cross-sectional shape of the front end of the depressor 13 is a straight line, and a length thereof is 45 mm.

A support body 14 supports the shaft 20 at the supporting point 11 from below. The front end of the support body 14 has a round convex shape. A cross-sectional shape of the front end of the support body 14 in a cross-section parallel to the shaft axis direction has a radius of curvature of 15 mm. In a cross-section perpendicular with respect to the shaft axis direction, a cross-sectional shape of the front end of the support body 14 is a straight line, and a length thereof is 50 mm. The shape of a support body 15 is identical to that of the support body 14. The support body 15 supports the shaft 20 at the supporting point 12 from below. The front end of the support body 15 has a round convex shape. A cross-sectional shape of the front end of the support body 15 in a cross-section parallel to the shaft axis direction has a radius of curvature of 15 mm. In a cross-section perpendicular with respect to the shaft axis direction, a cross-sectional shape of the front end of the support body 15 is a straight line, and a length thereof is 50 mm.

In a state of having the support body 14 and the support body 15 immobilized, the depressor 13 is moved downward at a velocity of 5 mm/min. Then, the movement of the depressor 13 is stopped at a time point when the load F reaches 20 kgf. The flexure amount α (mm) of the shaft 20 at the moment movement of the depressor 13 is stopped is measured, and bending stiffness EI ($N \cdot m^2$) is calculated in accordance with the following expression (2).

$$\text{Bending stiffness } EI(N \cdot m^2) = 32.7/\alpha \qquad (2)$$

Then, fitting is performed using, as an index, the measured bending stiffness for every inch of the shaft. Since hardness (bending stiffness) of the shaft in every inch is correlated with swing characteristics associated with time from the top to the impact, if the swing characteristics for each golfer can be understood, hardness of the shaft in every inch suited its characteristics can be determined. With regard to bending or deformation (flexure amount) of the shaft during a swing, the bending is transferred from the hand side to the front end side of the shaft in a downswing from the top as described above. In the present invention, focus has been placed on the transfer of the bending, and since the flexure amount of the shaft around the top is related to the speed of action (angular velocity) of the grip around the top, a golfer having higher velocity thereof is provided with a harder shaft and a golfer having a lower velocity thereof is provided with a softer shaft.

In the present embodiment, a rank value is given from among multiple-scale rank values in accordance with bending stiffnesses of the shaft measured for every inch through a usage of the above described method. Specifically, a value of one of 10-scale IFCs is given in accordance with bending stiffness. This IFC is an abbreviation of International Flex Code, and is proposed by the present applicant as an index that represents hardness of a shaft.

The following Tables 1 to 4 are conversion tables for converting an EI value of a shaft to an IFC at the measurement points (1) to (4), respectively. As a method for sorting hardness of a shaft into 10 scales, several methods are conceivable such as a method of sorting shafts into 10 scales using, as subjects, shafts that are all commercially available, and a method of sorting shafts into 10 scales within a range of shafts intended to be provided to a user by a fitter while taking into consideration frequency of usage etc. However, in the present embodiment, fitting is performed using the latter of the two methods.

TABLE 1

(a) IFC at 36 inches

| IFC | EI value [×9.8 N · m$^2$] | | |
|---|---|---|---|
| | Maximum | ~ | Minimum |
| 9 | | ~ | 8.295 |
| 8 | 8.295 | ~ | 7.86 |
| 7 | 7.86 | ~ | 7.425 |
| 6 | 7.425 | ~ | 6.99 |
| 5 | 6.99 | ~ | 6.555 |
| 4 | 6.555 | ~ | 6.12 |
| 3 | 6.12 | ~ | 5.685 |
| 2 | 5.685 | ~ | 5.25 |
| 1 | 5.25 | ~ | 4.185 |
| 0 | 4.185 | ~ | 0 |

TABLE 2

(b) IFC at 26 inches

| IFC | EI value [×9.8 N · m$^2$] | | |
|---|---|---|---|
| | Maximum | ~ | Minimum |
| 9 | | ~ | 5.543 |
| 8 | 5.543 | ~ | 5.306 |
| 7 | 5.306 | ~ | 5.069 |
| 6 | 5.069 | ~ | 4.832 |
| 5 | 4.832 | ~ | 4.595 |
| 4 | 4.595 | ~ | 4.358 |
| 3 | 4.358 | ~ | 4.121 |
| 2 | 4.121 | ~ | 3.884 |
| 1 | 3.884 | ~ | 3.647 |
| 0 | 3.647 | ~ | 0 |

TABLE 3

(c) IFC at 16 inches

| IFC | EI value [×9.8 N · m$^2$] | | |
|---|---|---|---|
| | Maximum | ~ | Minimum |
| 9 | | ~ | 3.849 |
| 8 | 3.849 | ~ | 3.658 |
| 7 | 3.658 | ~ | 3.467 |
| 6 | 3.467 | ~ | 3.276 |
| 5 | 3.276 | ~ | 3.085 |
| 4 | 3.085 | ~ | 2.894 |
| 3 | 2.894 | ~ | 2.703 |
| 2 | 2.703 | ~ | 2.512 |
| 1 | 2.512 | ~ | 2.321 |
| 0 | 2.321 | ~ | 0 |

TABLE 4

(d) IFC at 6 inches

| IFC | EI value [×9.8 N · m$^2$] | | |
|---|---|---|---|
| | Maximum | ~ | Minimum |
| 9 | | ~ | 2.94 |
| 8 | 2.94 | ~ | 2.86 |
| 7 | 2.86 | ~ | 2.78 |
| 6 | 2.78 | ~ | 2.7 |
| 5 | 2.7 | ~ | 2.62 |
| 4 | 2.62 | ~ | 2.54 |
| 3 | 2.54 | ~ | 2.46 |
| 2 | 2.46 | ~ | 2.38 |
| 1 | 2.38 | ~ | 2.3 |
| 0 | 2.3 | ~ | 0 |

[Swing Characteristic Amount]

Figure 4:
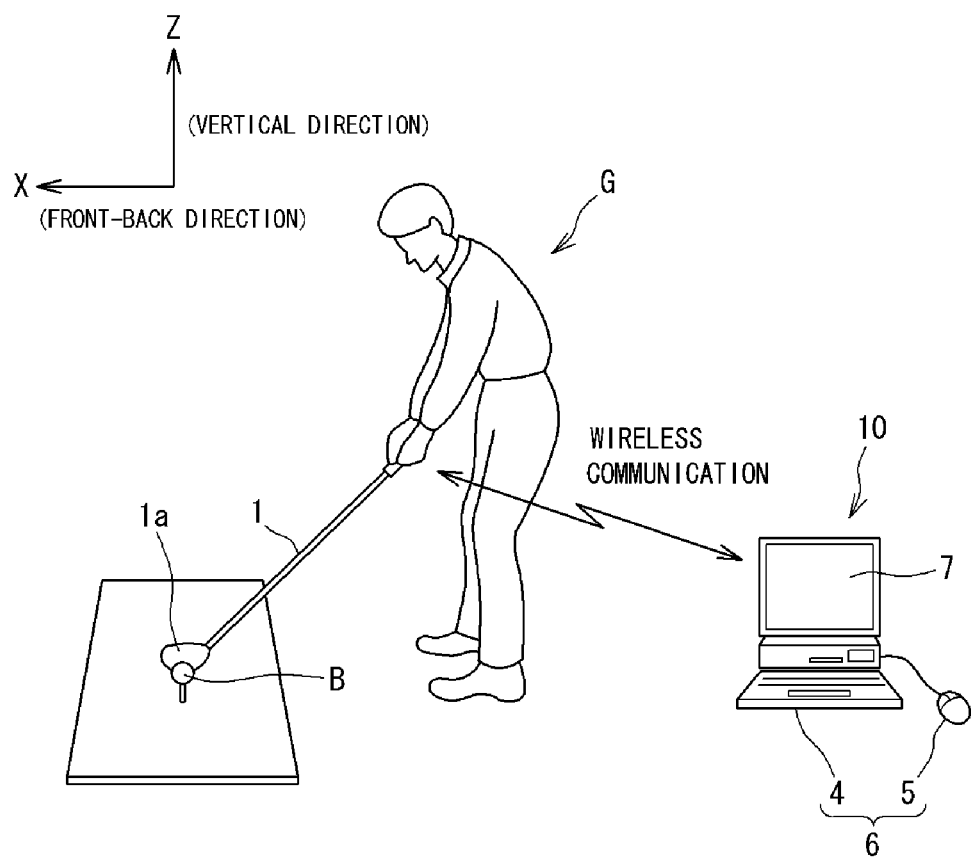
FIG. 4 is for describing a method for measuring a swing characteristic amount in the present invention.
Figure 5:
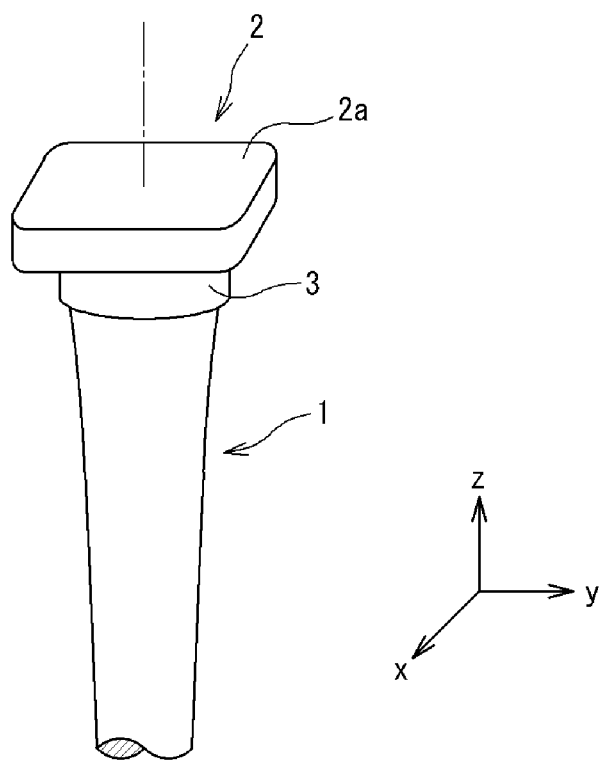
FIG. 5 is a partial expansion perspective diagram of a golf club having attached thereto a sensor.
Figure 6A:
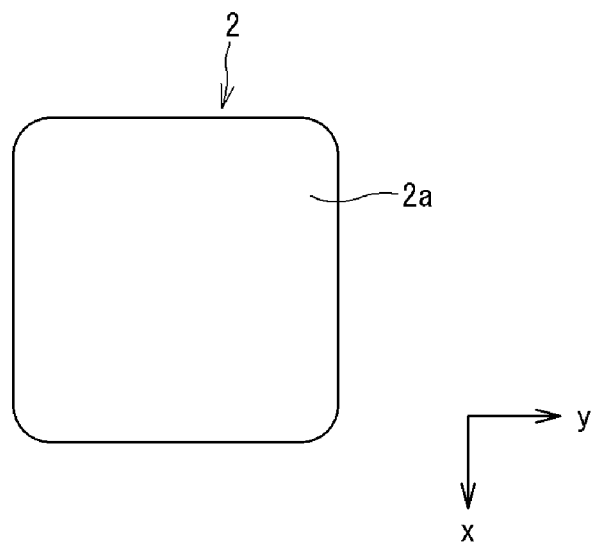
FIG. 6A is a plan view of the sensor shown in FIG. 5.
Figure 6B:
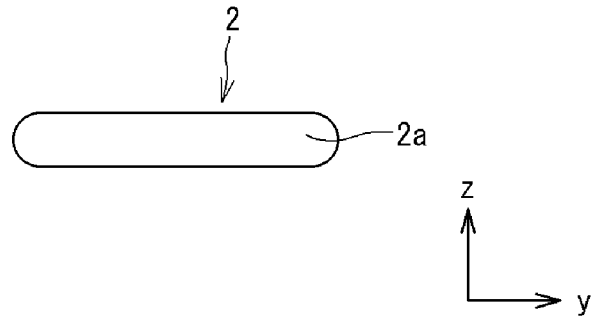
FIG. 6B is a side view of the sensor shown in FIG. 5.

In the present invention, as shown in FIG. 4, a golfer hoping for fitting of a golf club is asked to actually swing a golf club, and swing characteristic amounts specific to the golfer are measured from the swing. At a grip end of a golf club 1, a sensor 2 capable of measuring angular velocities about three axes is attached via an adapter 3 as shown in FIGS. 5 and 6. The sensor 2 includes a casing 2a formed from a box that is a square shape in planar view, and the casing 2a may be fixed to the grip end using a double-sided tape, an adhesive, a screw, or the like. In the example shown in FIG. 4, a golfer G is a right-handed person and is in an address state immediately before initiating a swing to hit a ball B set at a predetermined position.

It should be noted that, for the purpose of improving accuracy of fitting, if a length of a user's own club is different from a length of a golf club based on a shaft stored in a database, it is possible to select a shaft matching the user by changing a club total weight to a weight corresponding to the length of the club prepared in the database. For example, if the length of the club stored in a database is 45 inches, and length A (mm) of the club of the user is different from 45 inches (=1143 mm), the total weight of the club used for measuring a swing is changed to a weight (total weight corresponding to 45 inches) calculated from the following expression to perform the fitting.

(Total Weight of Club used for Measurement)=($A$−1143)×0.377+(Club Total Weight of the User's Own Club)

The sensor 2 is wireless, and measured data are transmitted through wireless communication to a wireless receiver (not shown) built in a computer 10 that functions as a data analysis device. For the wireless communication, for example, standards and technologies of Bluetooth (Registered trademark) can be used.

The sensor 2 has built therein an angular velocity sensor (not shown) capable of measuring angular velocities about three axial directions (x-axial direction, y-axial direction, and z-axial direction). The sensor 2 further includes an A/D converter, a CPU, a wireless interface, a wireless antenna, and a power supply. As the power supply, for example, a button type lithium ion battery or the like can be used. The battery may be one that is rechargeable. Furthermore, the sensor 2 may also include a charging circuit for recharging a battery. Examples of the sensor 2 that can be used include WAA-010 (product name) manufactured by Wireless Technologies Inc.

It should be noted that the wireless receiver for receiving signals from the sensor 2 includes a wireless antenna, a wireless interface, a CPU, and a network interface.

The computer 10 that functions as a data analysis device includes an input section 6 consisting of a keyboard 4 and a mouse 5, and a display section 7. In addition, although not shown, the computer 10 includes a hard disk, a memory, a CPU, and a network interface.

The sensor 2 detects angular velocities about respective axes of x axis, y axis, and z axis. These angular velocities are obtained as analog signals, and these analog signals are converted into digital signals by the A/D converter built in the sensor 2. Output from the A/D converter is transmitted to the CPU and computation processes such as primary filtering are executed. Data processed in the sensor 2 in this manner is transmitted to the wireless receiver built in the computer 10 from the wireless antenna through the wireless interface.

Data transmitted from the sensor 2 is received by the wireless interface through the wireless antenna on the wireless receiver side. The received data is processed by the CPU of the computer 10.

Data sent to the computer 10 are stored in a memory resource such as the hard disk. The hard disk has stored therein a program, data, and the like required for data processing etc. The program causes the CPU to execute required data processing. The CPU is capable of executing various computation processes, and a computed result is outputted to the display section 7, or a printer that is not shown etc.

When attaching the sensor 2 to the grip end, the relationships between measurement axes and the golf club 1 are taken into consideration. In the present embodiment, the z axis of the sensor 2 matches the shaft axis of the golf club 1. The x axis of the sensor 2 is orientated so as to follow along a toe-heel direction of a head 1a of the golf club 1. In addition, the y axis of the sensor 2 is orientated so as to follow along a normal line direction of a face surface of the head 1a. By attaching the sensor 2 in this manner, computation can be simplified.

In the present embodiment, a polar coordinate system is considered, and the x axis, y axis, and z axis of the polar coordinate system is a three-dimensional orthogonal coordinate system. In the present embodiment, the z axis is defined as the shaft axis of the golf club 1, and the x axis is oriented so as to follow along the toe-heel direction of the head 1a. In addition, the y axis is oriented so as to follow along a normal line direction of the face surface of the head 1a.

Thus, the z axis in the polar coordinate system matches the z axis of the sensor 2, and the y axis of the polar coordinate system matches the y axis of the sensor 2. In addition, the x axis of the polar coordinate system matches the x axis of the sensor 2.

With the sensor 2, a plurality of time-series successive data points can be obtained. The number of data points per unit of time depends on sampling frequency.

FIGS. 7 to 10 are for describing a swing by a golfer from the address to the finish. Although the swing includes the follow-through after the impact, in the present invention, focus has been placed on characteristics of the swing from the address to the impact.

Figure 7:
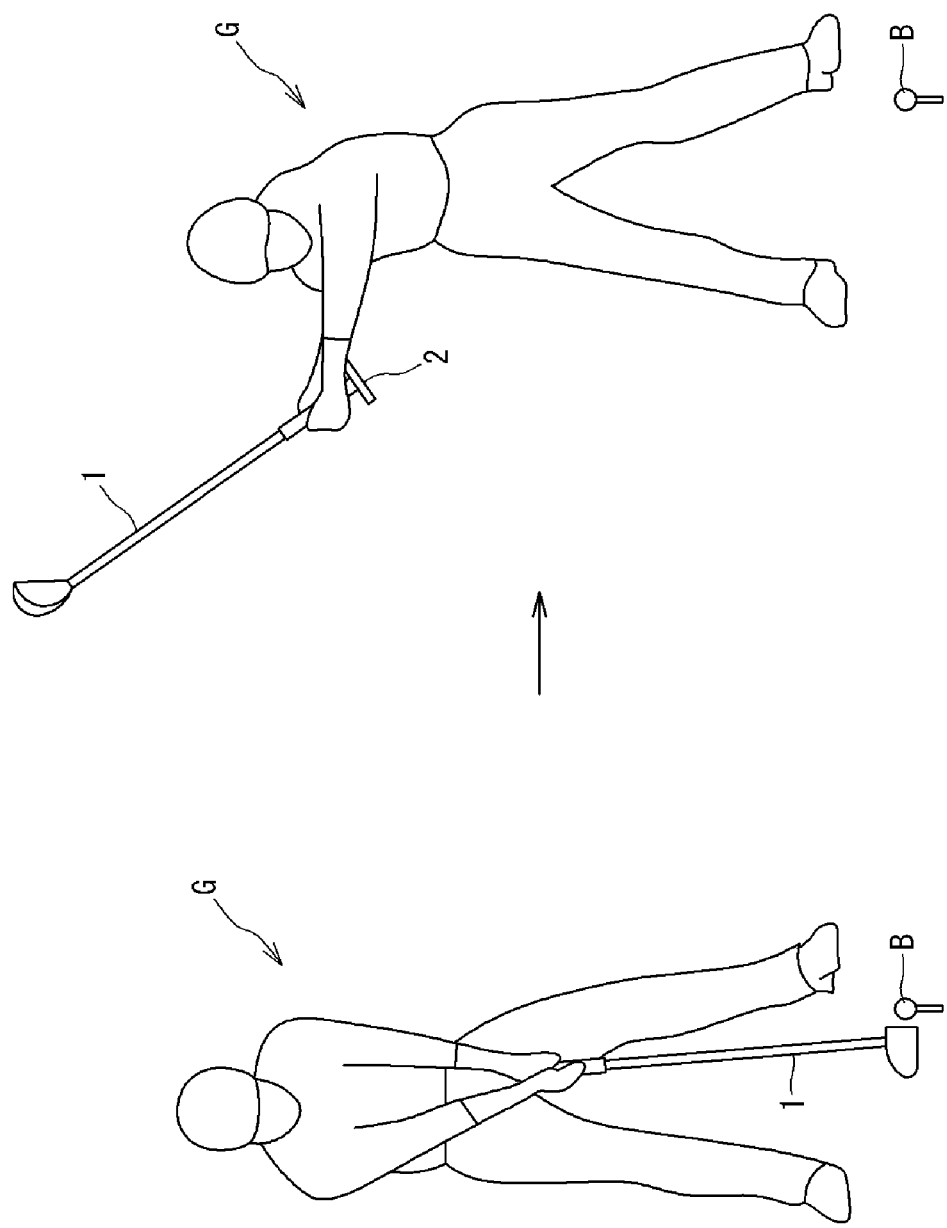
FIG. 7 shows the address and backswing in a swing.
Figure 8:
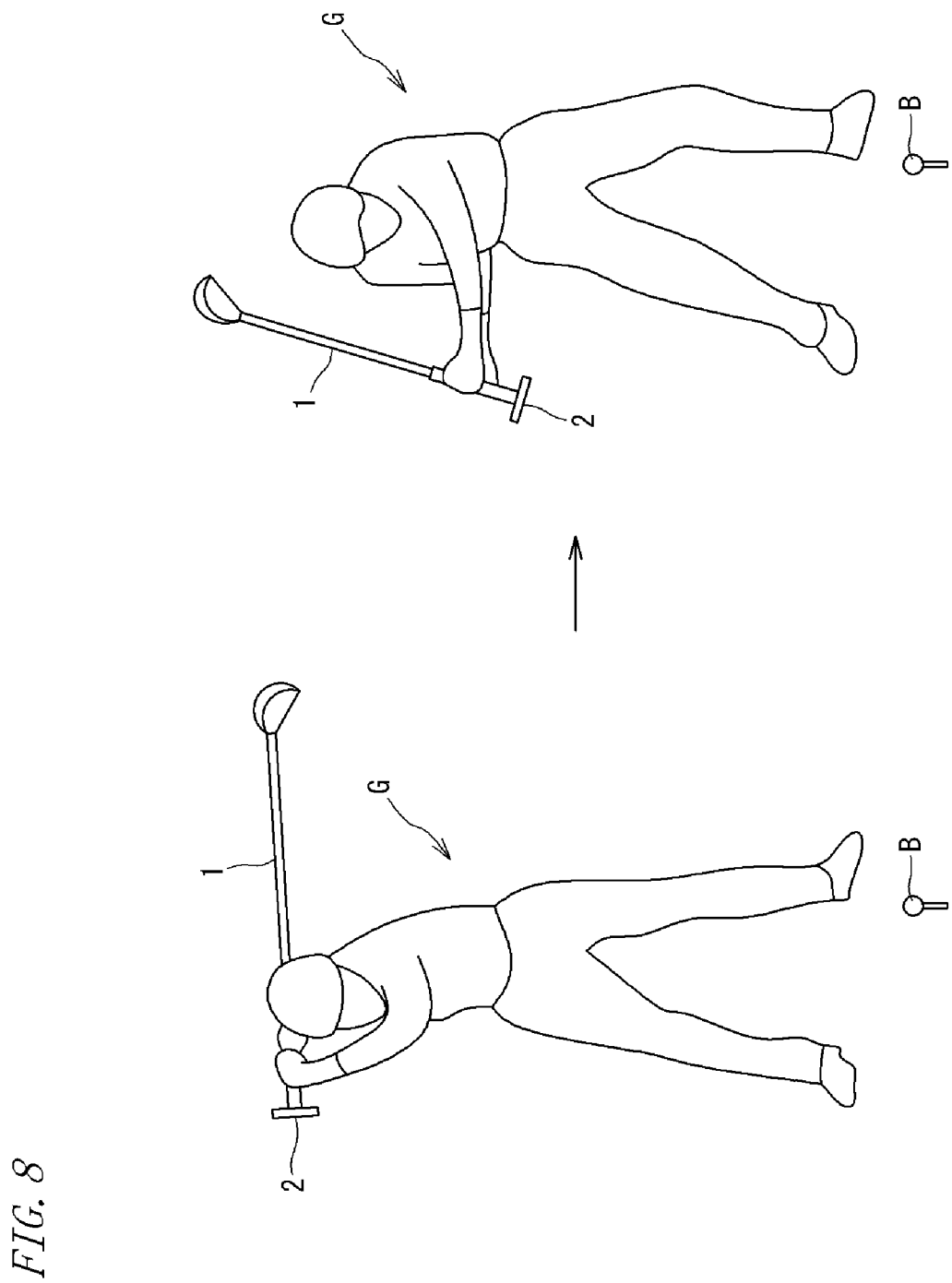
FIG. 8 shows the top and downswing in a swing.
Figure 9:
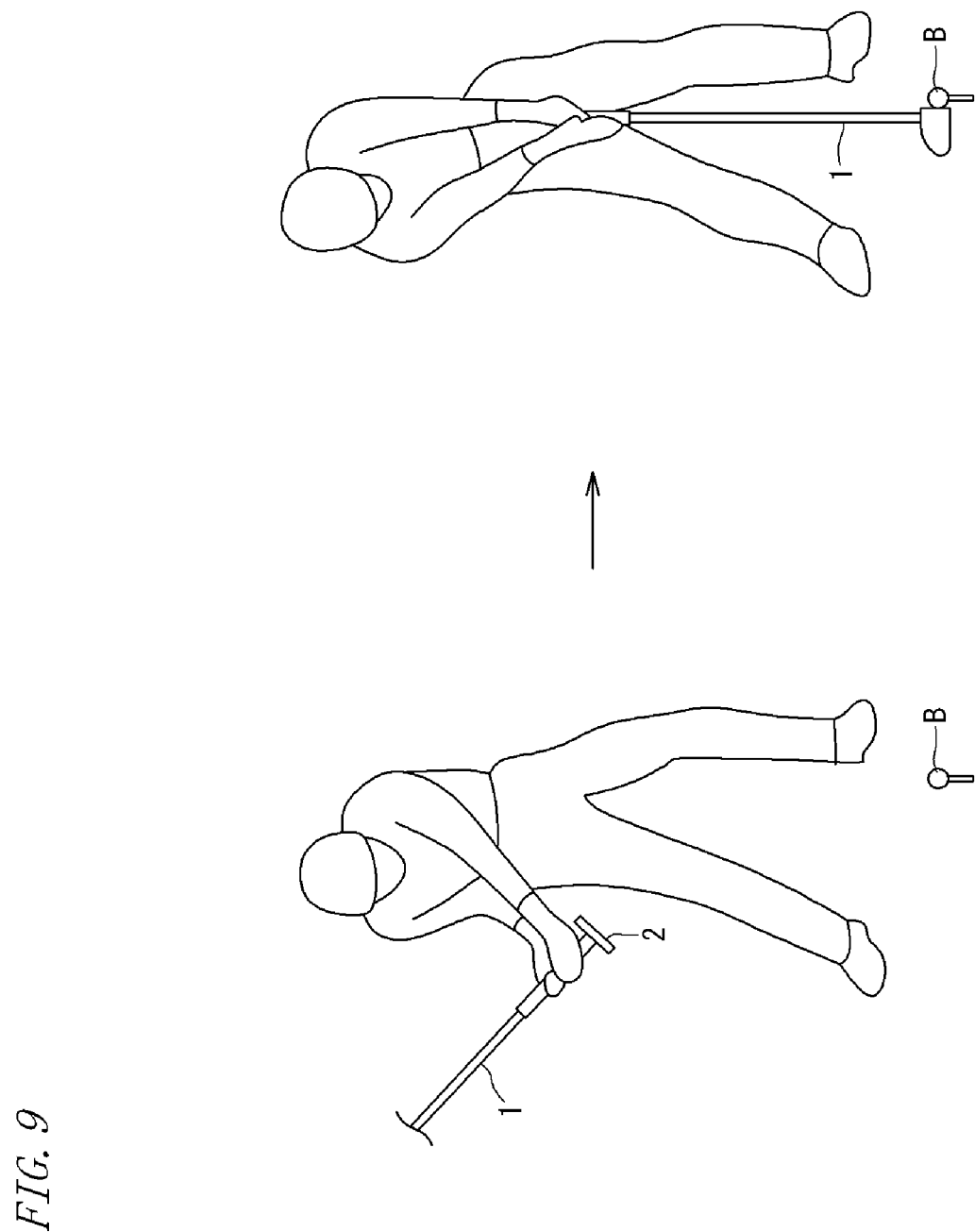
FIG. 9 shows the downswing and impact in a swing.
Figure 10:
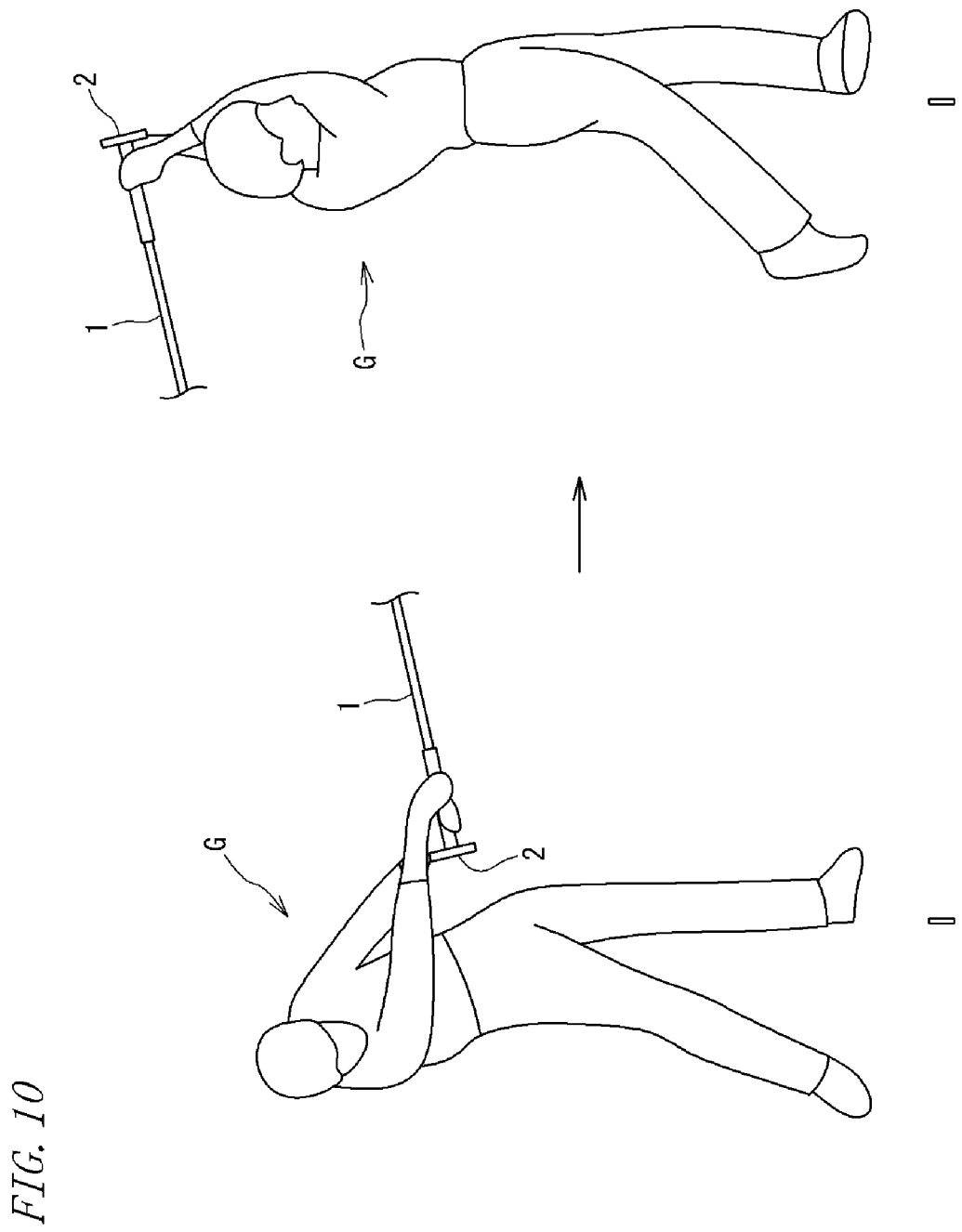
FIG. 10 shows the follow-through and finish in a swing.

FIGS. 7 to 10 are views of a golfer from the front. The beginning of a swing is referred to as the address, and the end of a swing is referred to as the finish. The swing proceeds in a sequence of (S1), (S2), (S3), (S4), (S5), (S6), (S7), and (S8). In FIG. 7, (S1) is the address, and (S2) is the backswing. In FIG. 8, (S3) is the top (top of swing). Ordinarily, the movement velocity of the head during a swing is the lowest at the top. In FIG. 8, (S4) is the downswing. Although (S5) in FIG. 9 is also the downswing, it is a more advanced state of the downswing than (S4) in FIG. 8. In FIG. 9, (S6) is the impact, which is the moment when the head 1a of the golf club 1 and the ball B collides. In FIG. 10, (S7) is the follow-through, and (S8) is the finish. With the finish, the swing ends.

In the present embodiment, among the above described various stages of the swing, focus is placed on an angular velocity ωy in a direction of a wrist cock during a downswing from around the top to the impact, and the angular velocity ωy is subdivided and quantified depending on elapsed time. It should be noted that, in the present specification, "around the top" refers to a time interval including a predetermined time immediately before the top and a predetermined time immediately after the top, and more specifically, refers to a time interval of, for example, 100 ms between −50 ms from the top and +50 ms from the top. It should also be noted that the direction of a wrist cock during a downswing from around the top to the impact is also known as a wrist release direction.

Figure 11:
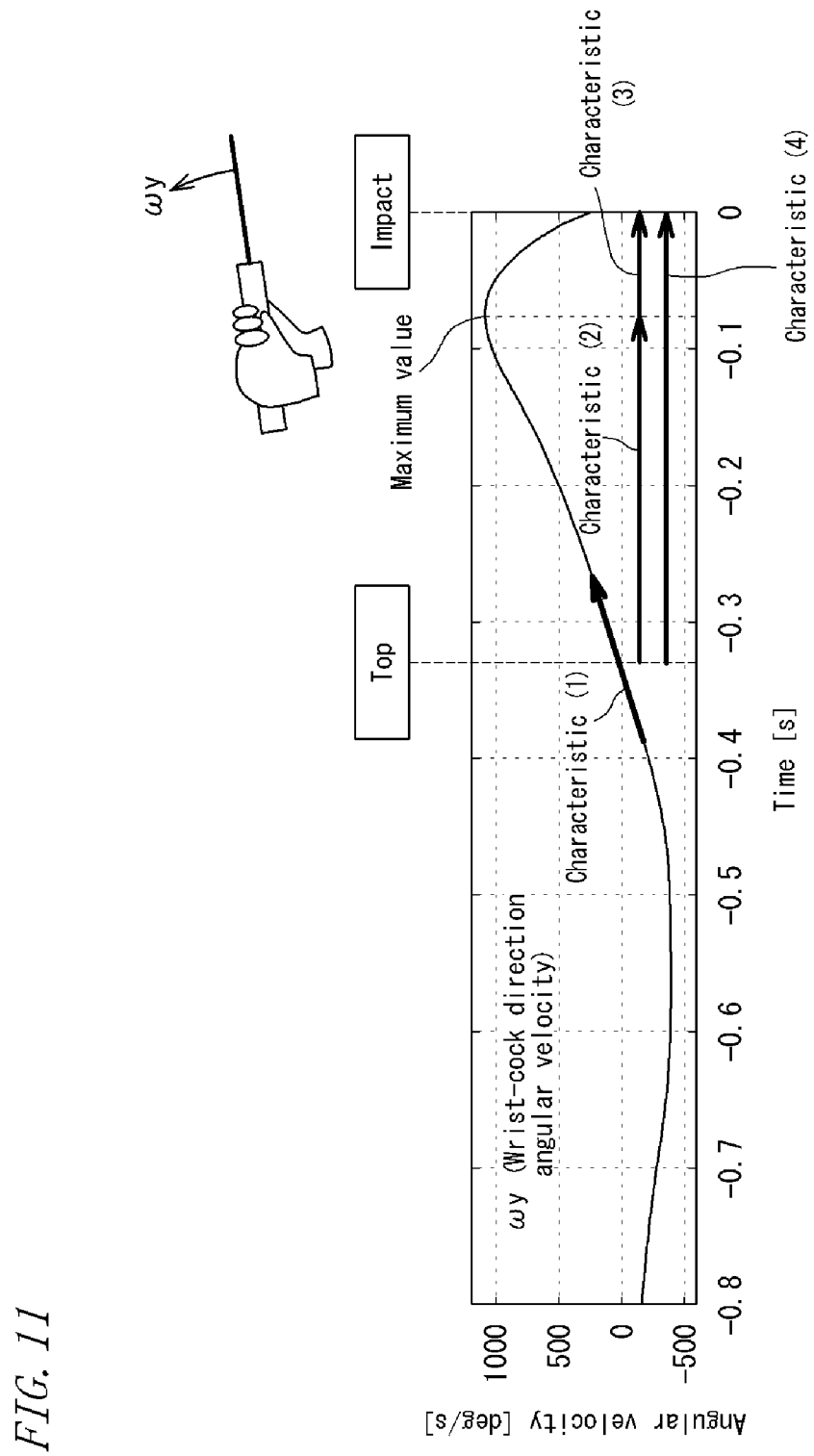
FIG. 11 shows a change in an angular velocity in a direction of a wrist cock during a swing depending on elapsed time.

FIG. 11 shows a relationship in a certain swing between time(s) from the address to the impact and the angular velocity ωy (deg/s) in the direction of a wrist cock. In the present embodiment, as shown in FIG. 11, four swing characteristics of (1) to (4) are configured depending on elapsed time of the swing, and the swing characteristics are each quantified.

The swing characteristic amount (1) as the swing characteristic amount (a) is the slope of the angular velocity ωy in the direction of a wrist cock around the top, and, for example, can be represented as a sum of an angular velocity ωy 50 ms before the top and an angular velocity ωy 50 ms after the top. The swing characteristic amount (1) is correlated with the above described bending stiffness at the measurement point of 36 inches from the tip end of the shaft.

The swing characteristic amount (2) as the swing characteristic amount (b) is an average value of the angular velocity ωy from the top to a time point at which the angular velocity ωy becomes a maximum. The average value can be obtained by obtaining a maximum value of the angular velocity ωy from the top to the impact, and dividing an accumulated value of the angular velocity ωy from the top to the time point at which the maximum value is obtained by a time period from the top to the time point at which the maximum value is obtained. The swing characteristic amount (2) is correlated with the above described bending stiffness at the measurement point of 26 inches from the tip end of the shaft.

The swing characteristic amount (3) as the swing characteristic amount (c) is an average value of the angular velocity ωy from a time point at which the angular velocity ωy becomes a maximum to the impact, and the average value can be obtained by dividing an accumulated value of the angular velocity ωy from the time point at which the maximum value is obtained to the impact by a time period from the time point at which the maximum value is obtained to the impact. The swing characteristic amount (3) is correlated with the above described bending stiffness at the measurement point of 16 inches from the tip end of the shaft.

The swing characteristic amount (4) as the swing characteristic amount (d) is an average value of the angular velocity ωy from the top to the impact, and the average value can be obtained by dividing an accumulated value of the angular velocity ωy from the top to the impact by a time period from the top to the impact. This swing characteristic amount (4) is correlated with the above described bending stiffness at the measurement point of 6 inches from the tip end of the shaft.

For the swing characteristic amounts (1) to (4), a golfer hoping for a fitting is asked to test-hit a predetermined number of balls, for example, five balls, and swing characteristic amounts obtained upon hitting each of the balls can be averaged to be set as swing characteristic amounts of the golfer.

[Extraction of Impact Time]

In the present invention, it is necessary to extract impact time when calculating the swing characteristic amount (3) or (4). The impact time can be extracted from, for example, a time-series waveform measured using the sensor for the angular velocity about the shaft axis. Specifically, in a time-series waveform of an angular velocity of a golf swing including the moment of impact, a time at which the angular velocity about the shaft axis (z axis) becomes a maximum is determined as a provisional impact time. Then, for the purpose of extracting the impact time with better accuracy, in around the provisional impact time (a time duration from a clock time before the provisional impact time by a predetermined time to a clock time after the provisional impact time by a predetermined time), a time that is the earlier between a time at which the angular velocity ωx about the x axis becomes a minimum and a time at which an acceleration about the z axis becomes a minimum is set as an impact time.

Figure 12:
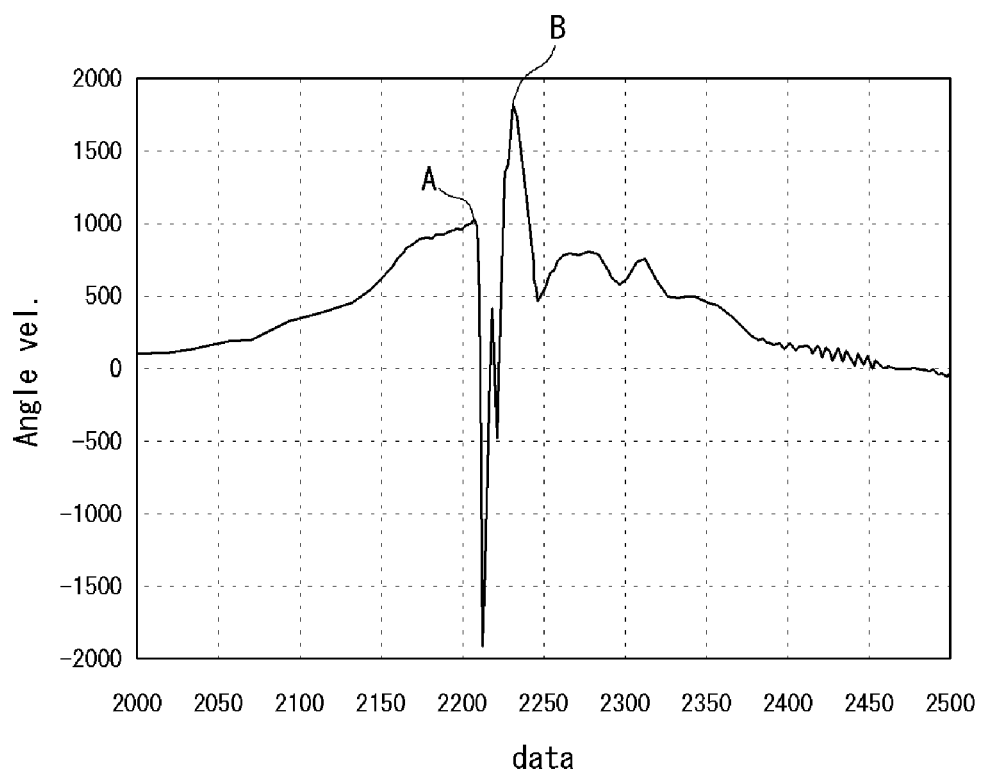
FIG. 12 shows one example of a time-series waveform of an angular velocity about a shaft axis.

When a golfer hoping for a fitting test-hits a ball, depending on the place (hit-spot) where a club face hits a ball, there are cases as shown in FIG. 12 where the angular velocity ωz about the shaft axis becomes a maximum not at the time of impact but after impact. FIG. 12 and a later described FIG. 13 each show one portion (around the impact) of a time-series waveform of the angular velocity ωz about the shaft axis, and in these figures, the horizontal axis represents data point numbers from the start of data acquisition and the vertical axis represents angular velocity (deg/s). Since data sampling frequency in the illustrated example is 1000 Hz, a single data point is 1 ms. In the example in FIG. 12, although point A is the proper impact time that should be extracted, there is a possibility of point B, at which the angular velocity ωz is a maximum, being falsely recognized as the impact time.

Figure 13:
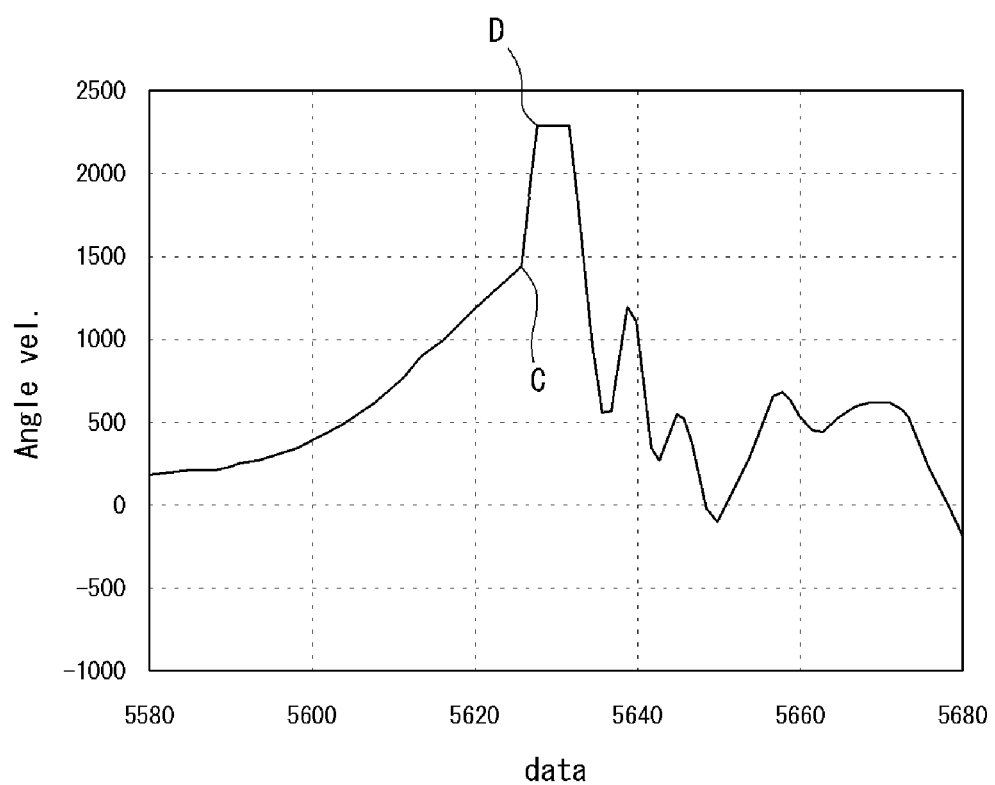
FIG. 13 shows another example of a time-series waveform of the angular velocity about the shaft axis.

In addition, in cases such as when a swing is performed at an angular velocity exceeding a measurable range of a gyro sensor used for the measurement, there are cases where over range of the sensor occurs as shown in FIG. 13. Also in this case, although point C is the proper impact time that should be extracted, there is a possibility of point D, at which the angular velocity ωz is a maximum in the range, being falsely recognized as the impact time.

If a correct impact time is not determined, it is conceivable that the accuracy of fitting based on a swing of a golfer analyzed using the impact time will be influenced.

Therefore, in the present invention, for the purpose of improving accuracy in determining the impact time, an impact time extraction method described in the following is employed.

Figure 14:
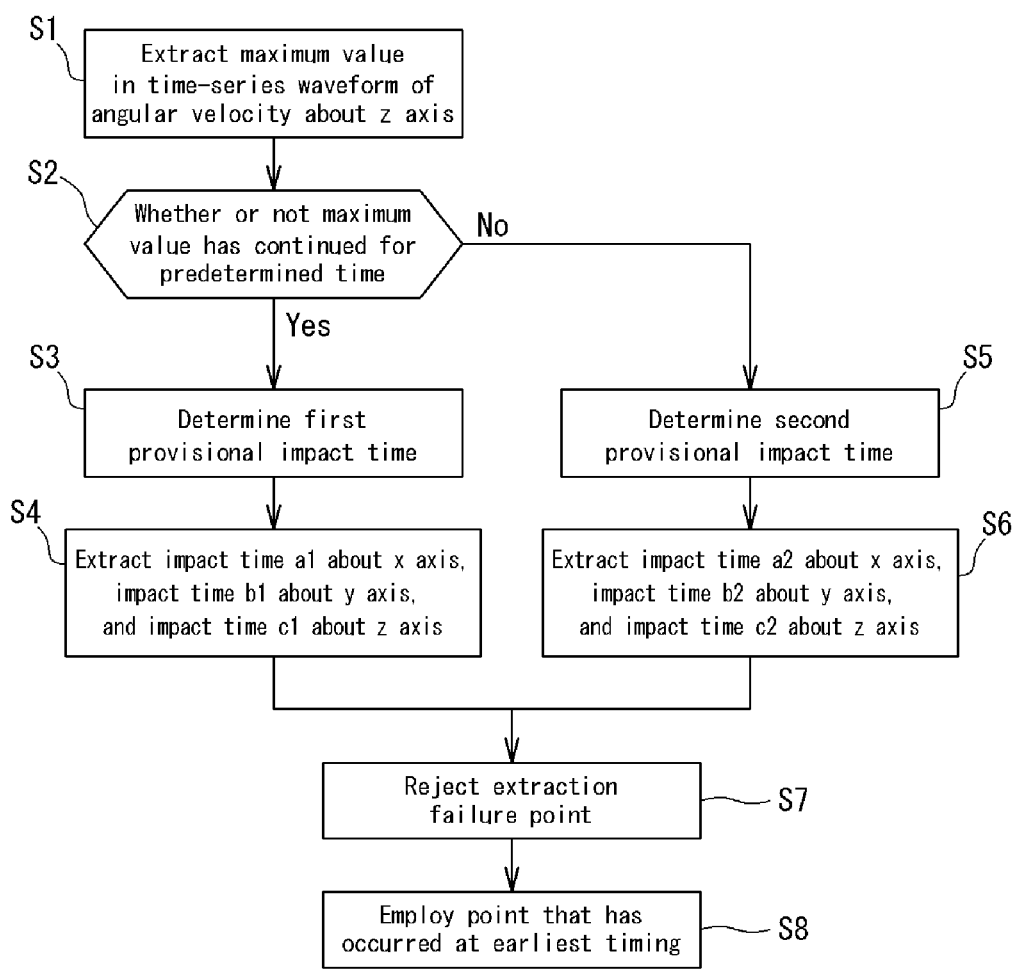
FIG. 14 is a flowchart of one embodiment of an extraction method of the present invention.

FIG. 14 is a flowchart of the impact time extraction method according to one embodiment of the present invention.

First, at step S1, a maximum value in a time-series waveform of the angular velocity ωz about the shaft axis (z axis) is extracted.

Figure 15:
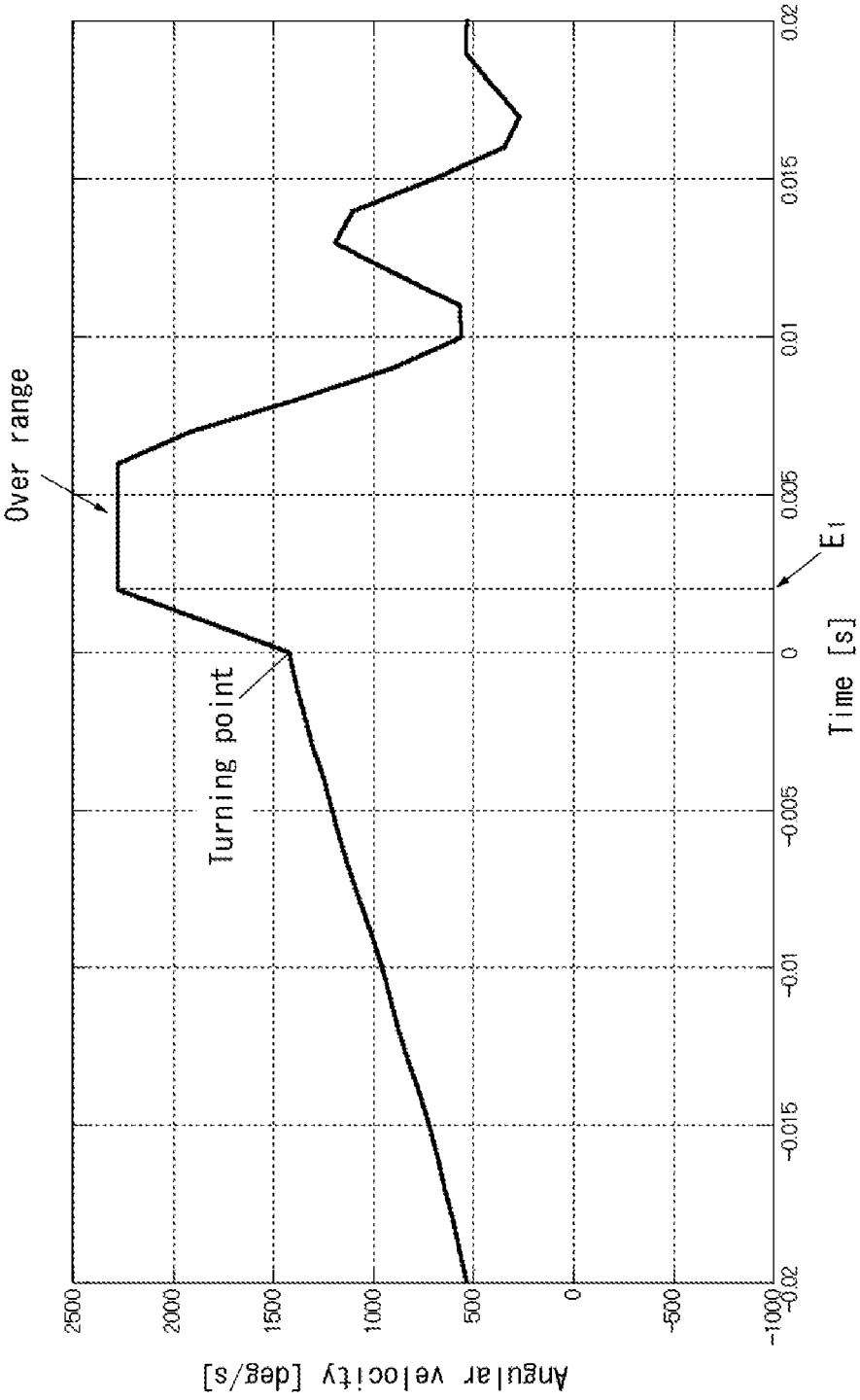
FIG. 15 shows an example of a time-series waveform of an angular velocity about a z axis in which over range has occurred.

Next, at step S2, it is determined whether or not the maximum value extracted at step S1 has continued for a predetermined time (e.g., 3 ms or longer). Having a maximum value continue for a predetermined time may be considered as over range of the sensor occurring due to reasons such as rotational velocity of the wrist being fast etc., as shown in FIG. 15. It should be noted that, although the horizontal axis represents time in the example shown in FIG. 15, when the horizontal axis of a time-series waveform represents data point number from the start of data acquisition as in the examples shown in FIGS. 12 and 13, it is also possible to determine whether or not over range has occurred by counting the number of continuous data points acquired through sampling at a predefined frequency.

At step S2, when it is determined that the extracted maximum value has continued for a predetermined time, the flow advances to step S3, and the first provisional impact time is determined at step S3. Since a maximum value will continue when over range has occurred, a timing (time) at which a maximum value firstly occurs is set as a first provisional impact time $E_1$.

Next, at step S4, by using the first provisional impact time $E_1$ determined at step S3, an impact time a1 which is one candidate of the impact time is extracted from the time-series waveform about the x axis. Extraction of the impact time a1 is conducted in the following manner.

Figure 16:
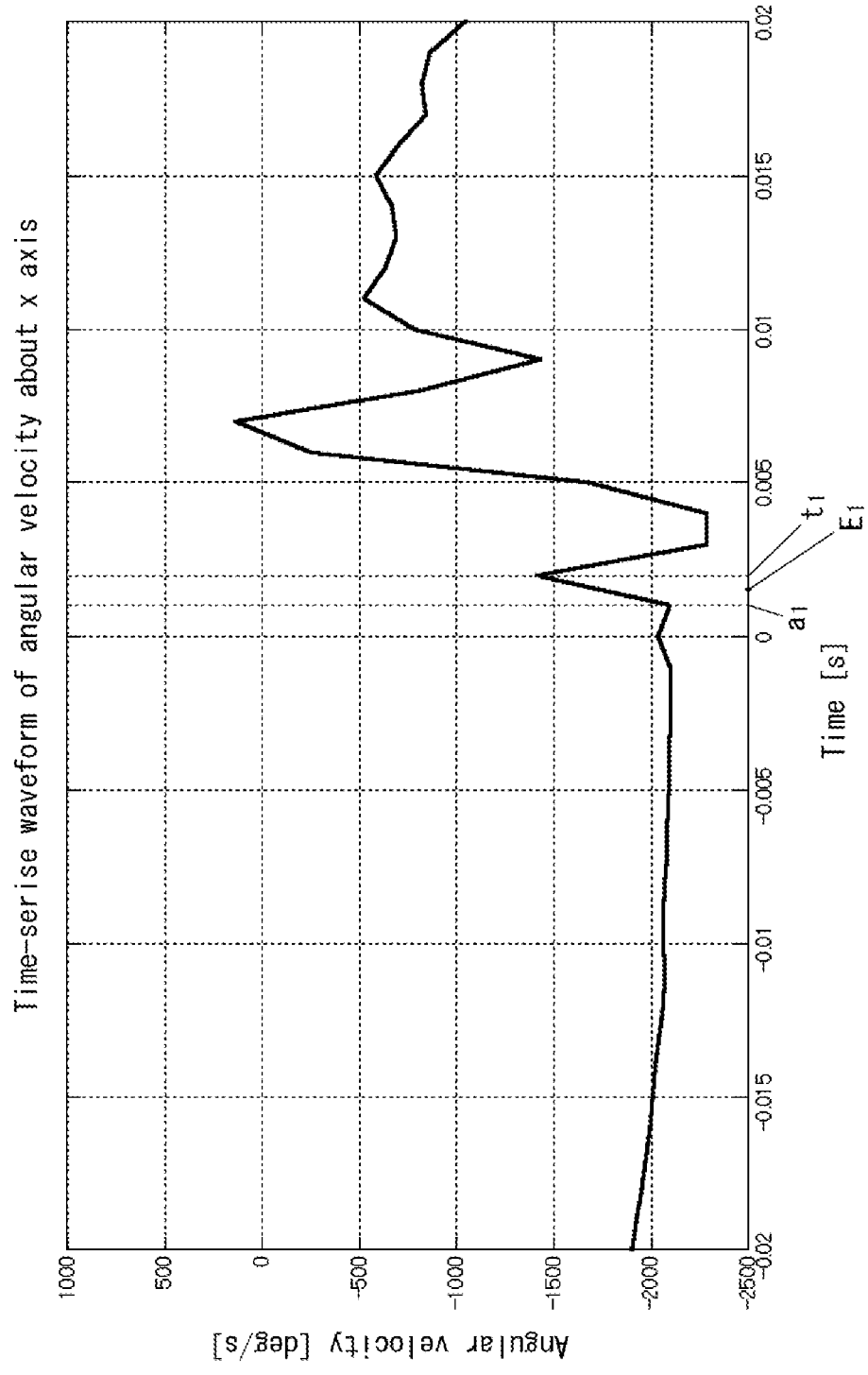
FIG. 16 shows an example of a time-series waveform of an angular velocity about an x axis.

FIG. 16 shows one portion (around impact) of one example of a time-series waveform of the angular velocity ωx about the x axis. At step S3, when the first provisional impact time $E_1$ is determined, the impact time a1 is extracted using as a reference a time corresponding to the first provisional impact time $E_1$ in the time-series waveform of the angular velocity ωx about the x axis. Specifically, first, a time is obtained at which a local maximum value firstly occurs in a predetermined time duration (first predetermined time duration) around the first provisional impact time $E_1$. It is possible to set, as the predetermined time duration (first predetermined time duration), for example, a time duration from 50 ms before the first provisional impact time $E_1$ to 20 ms after the first provisional impact time $E_1$. In FIG. 16, t1 represents the time at which a local maximum value firstly occurs.

Next, a time at which a minimum value occurs after the time t1 at which the local maximum value firstly has occurred but before a predetermined time (third predetermined time) is set as the impact time a1. It is possible to set the predetermined time (third predetermined time) as, for example, 3 ms.

Next, at the same step S4, by using the first provisional impact time $E_1$ determined at step S3, an impact time b1 which is one candidate of the impact time is extracted from the time-series waveform about the y axis. Extraction of the impact time b1 is conducted in the following manner.

Figure 17:
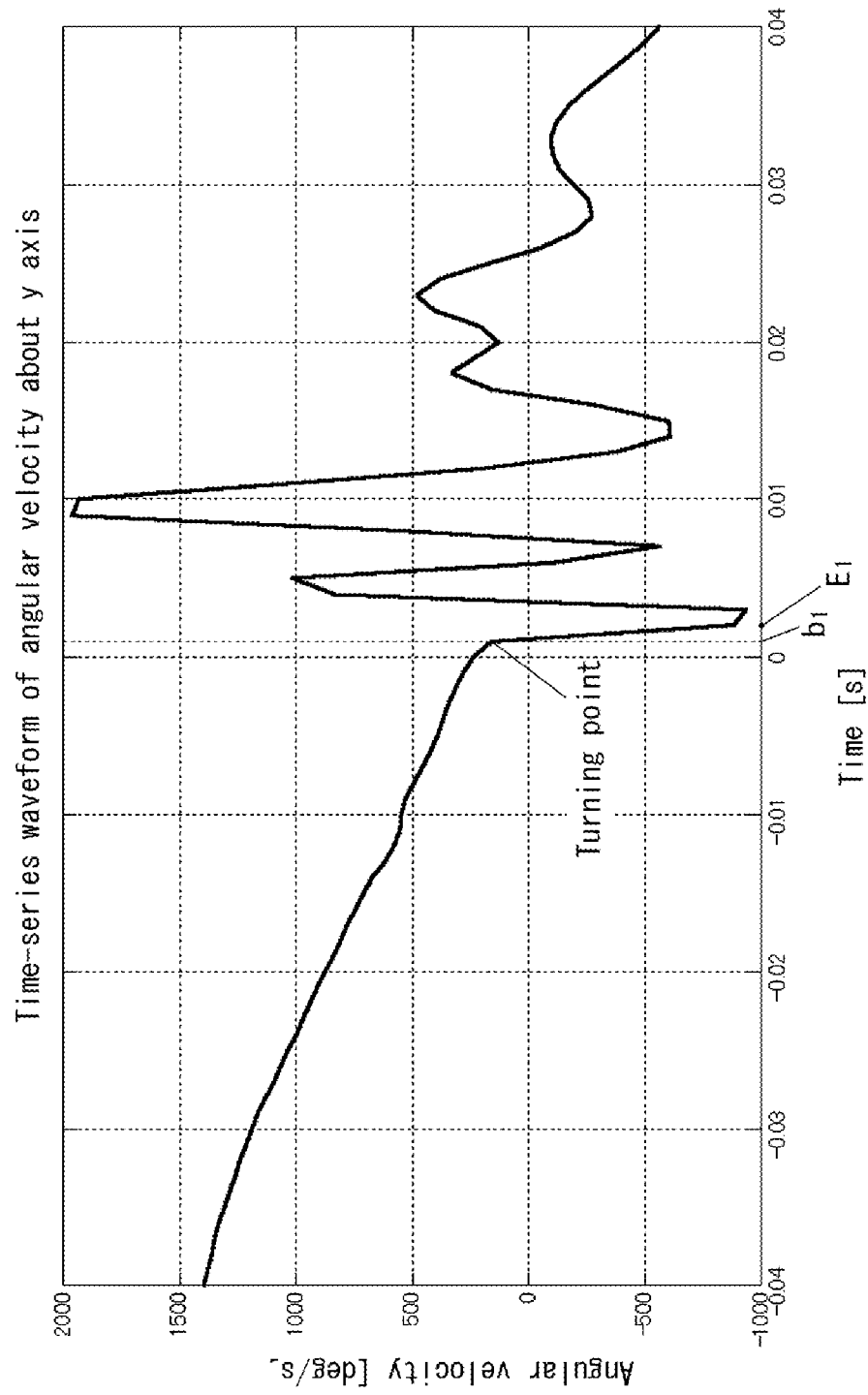
FIG. 17 shows an example of a time-series waveform of an angular velocity about a y axis.

FIG. 17 shows one portion (around impact) of one example of a time-series waveform of the angular velocity ωy about the y axis. At step S3, when the first provisional impact time $E_1$ is determined, the impact time b1 is extracted using as a reference a time corresponding to the first provisional impact time $E_1$ in the time-series waveform of the angular velocity ωy about the y axis. Specifically, a time at which a turning point firstly occurs in a predetermined time duration (second predetermined time duration) around the first provisional impact time $E_1$ is set as the impact time b1. It is possible to set, as the predetermined time duration (second predetermined time duration), for example, a time duration from 30 ms before the first provisional impact time $E_1$ to 50 ms after the first provisional impact time $E_1$.

Figure 18:
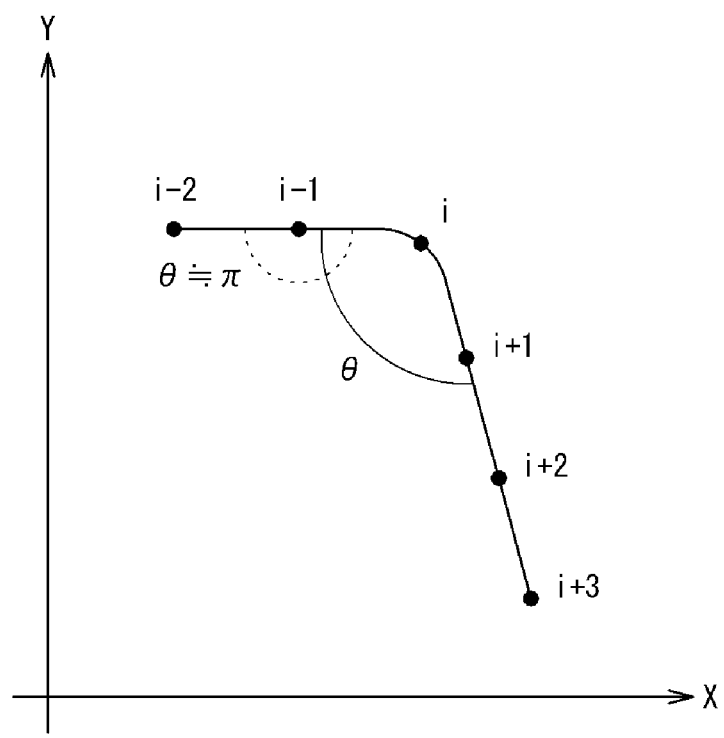
FIG. 18 shows how to obtain a turning point.

A turning point can be obtained, for example, in the following manner. FIG. 18 shows how to obtain a turning point. A middle point in three points that are continuous is used as a center, and an angle θ formed by this central point and the points before and after that is obtained. In FIG. 18, since three continuous points of (i−2), (i−1), and (i) are almost on a straight line, a line segment connecting points (i−2) and (i−1) and a line segment connecting points (i−1) and (i) form an angle θ≈π. Then, the angle θ is continuously calculated by shifting the point that is in the middle by one point each time. At a point other than a turning point, θ≈π is satisfied, whereas the angle θ becomes small at a turning point. A point at which θ becomes a minimum is defined as a "turning point." In the example in FIG. 18, point (i) is a turning point.

Next, at the same step S4, by using the first provisional impact time $E_1$ determined at step S3, an impact time c1 which is one candidate of the impact time is extracted from the time-series waveform about the z axis. Extraction of the impact time c1 is conducted in the following manner.

In FIG. 15, in the angular velocity ωz about the z axis, which is a prerequisite for the extraction, over range has occurred. In such a case, although a time at which a maximum value has firstly occurred, i.e., a time at which over range has occurred, is set as the first provisional impact time $E_1$; a time at which a turning point firstly occurs after the first provisional impact time $E_1$ but before a predetermined time (fourth predetermined time) is set as the impact time c1. It is possible to set the predetermined time (fourth predetermined time) as, for example, 40 ms. It should be noted that the turning point can be acquired using a method described in step S5.

Figure 19:
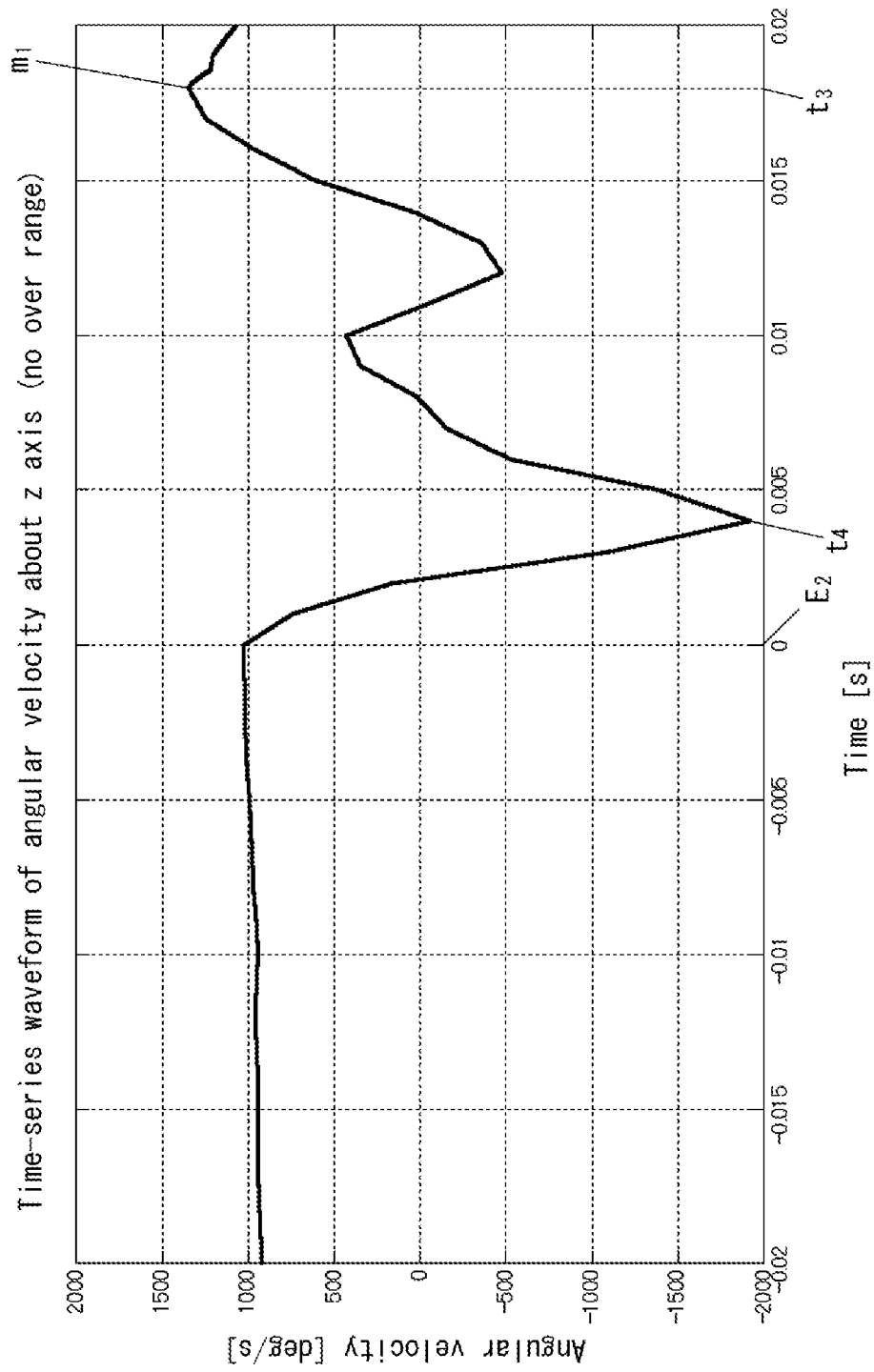
FIG. 19 shows an example of a time-series waveform of an angular velocity about the z axis in which over range has not occurred.

On the other hand, when it is determined at step S2 that a maximum value has not continued for a predetermined time, the flow advances to step S5 and a second provisional impact time $E_2$ is determined. This second provisional impact time $E_2$ is determined in the following manner. FIG. 19 shows an example of a time-series waveform of the angular velocity about the z axis in which over range has not occurred, and in the same figure, m1 represents a maximum value. When a minimum value has occurred after a time t3 at which the maximum value m1 has occurred but before a predetermined time (first predetermined time), the time at which this minimum value has occurred is set as t4. Next, when a maximum value has occurred after t4 but before a predetermined time (second predetermined time), the time at which this maximum value has occurred is set as the second provisional impact time $E_2$. The predetermined time (first predetermined time) may be set as, for example, 20 ms; whereas the other predetermined time (second predetermined time) may be set as, for example, 30 ms.

Next, at step S6, by using the second provisional impact time $E_2$ determined at step S5, an impact time a2, which is one candidate of the impact time, is extracted from the time-series waveform about the x axis. Extraction of this impact time a2 can be conducted in a manner similar for the above described impact time a1.

Next, at the same step S6, by using the second provisional impact time $E_2$ determined at step S5, an impact time b2, which is one candidate of the impact time, is extracted from the time-series waveform about the y axis. Extraction of this impact time b2 can be conducted in a manner similar for the above described impact time b1.

Next, at the same step S6, by using the second provisional impact time $E_2$ determined at step S5, an impact time c2, which is one candidate of the impact time, is extracted from the time-series waveform about the z axis. This impact time c2 is extracted as a time at which a turning point firstly occurs in a predetermined time duration thereafter (third predetermined time duration). It is possible to set the predetermined time duration (third predetermined time duration) as, for example, a time duration from 40 ms before the second provisional impact time $E_2$ to 15 ms after the second provisional impact time $E_2$.

Next, at step S7, rejection of impact time failed to be extracted is conducted for respective sets of impact time candidates of a1, b1, and c1, or impact time candidates of a2, b2, and c2 extracted at step S4 or step S6. A time-series waveform of each of the axes measured by the sensor may include one having over range occurred therein, and when an extraction error occurs in one of the time-series waveforms due to such over range etc., the extraction error may influence the true value of the impact time. Therefore, in the present embodiment, for the purpose of avoiding such an influence, an impact time that is considered as extraction failure among the candidates of extracted impact time is rejected.

Specifically, among the three points of a1, b1, and c1 (same for a2, b2, and c2), an earliest point that has occurred and a latest point that has occurred are determined. Next, if the earliest (latest) point that has occurred is separated from the other two points by, for example, 5 ms or longer, that point is determined as extraction failure of impact time, and is rejected.

Next, at step S8, among the points that have been determined not to be extraction failures at step S7, a point that has occurred at the earliest timing is determined as the impact time.

[Calculation of Shaft Stiffnesses in Every Inch]

Next, based on the calculated swing characteristic amounts (1) to (4), shaft stiffnesses suited for the golfer are calculated in every inch. Preceding this calculation, an approximate expression representing a relationship between swing characteristic amount and preferable bending stiffness (EI value) of a shaft is obtained for each of the swing characteristic amounts. The approximate expression is created based on data collected by having multiple testers conduct test-hits. From a standpoint of increasing reliability of the approximate expression, having a larger number of testers is preferable. In the present embodiment, the testers are intermediate-level or advanced-level players having a handicap of 20 or lower. For each of the testers, several golf clubs have been selected from multiple golf clubs (drivers) prepared in advance using as a reference the weight, length, and flex (or kick point) of golf clubs that are ordinarily used by a tester. Then, a tester is asked to test-hit several balls (excluding miss-shots), e.g., six balls, for each of the several golf clubs, and is asked to select a golf club that is easy to swing in accordance with a later described standard.

With regard to a golf club easy to swing, three items of "flight distance," "directionality," and "ease of swinging" are scored in accordance with evaluation standards shown in, for example, the following Table 5; and a club whose sum total of score is 1.5 points or higher is determined as a club that is easy to swing. The selected several golf clubs have their shaft portions painted in black, and are randomly provided to a tester. With this, a tester cannot determine which club he or she is hitting. The test-hitting is performed in two sets of three balls for each club, and a questionnaire regarding ease of swinging is given to the tester for scoring, every time he or she has test-hit three balls with a certain club.

TABLE 5

Figure 20:
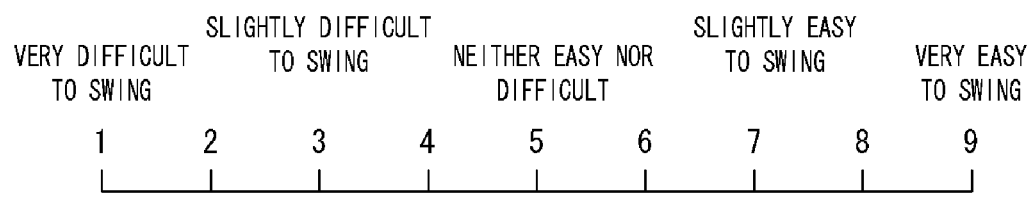
FIG. 20 is for describing an evaluation standard for ease of swinging.

| Item | Evaluation Standard | Score |
|---|---|---|
| Flight Distance | Different from other clubs by 10% significance level (larger flight distance) | +1.0 |
| | Different from other clubs by 15% significance level (larger flight distance) | +0.5 |
| | Different from other clubs by 10% significance level (smaller flight distance) | −1.0 |
| | Different from other clubs by 15% significance level (smaller flight distance) | −0.5 |
| Directionality | Average value of left-right deviation is within ±10 yards from center | +0.5 |
| | Average value of left-right deviation is not smaller than ±30 yards from center | −0.5 |
| | σ of left-right deviation is within ±10 yards | +0.5 |
| | σ of left-right deviation is not smaller than ±20 yards | −0.5 |
| Ease of Swinging | Club that obtained the highest score in 9-scale evaluation shown in FIG. 20 | +0.5 |
| | Club that scored lower than 5 points in 9-scale evaluation shown in FIG. 20 | −0.5 |

Figure 21:
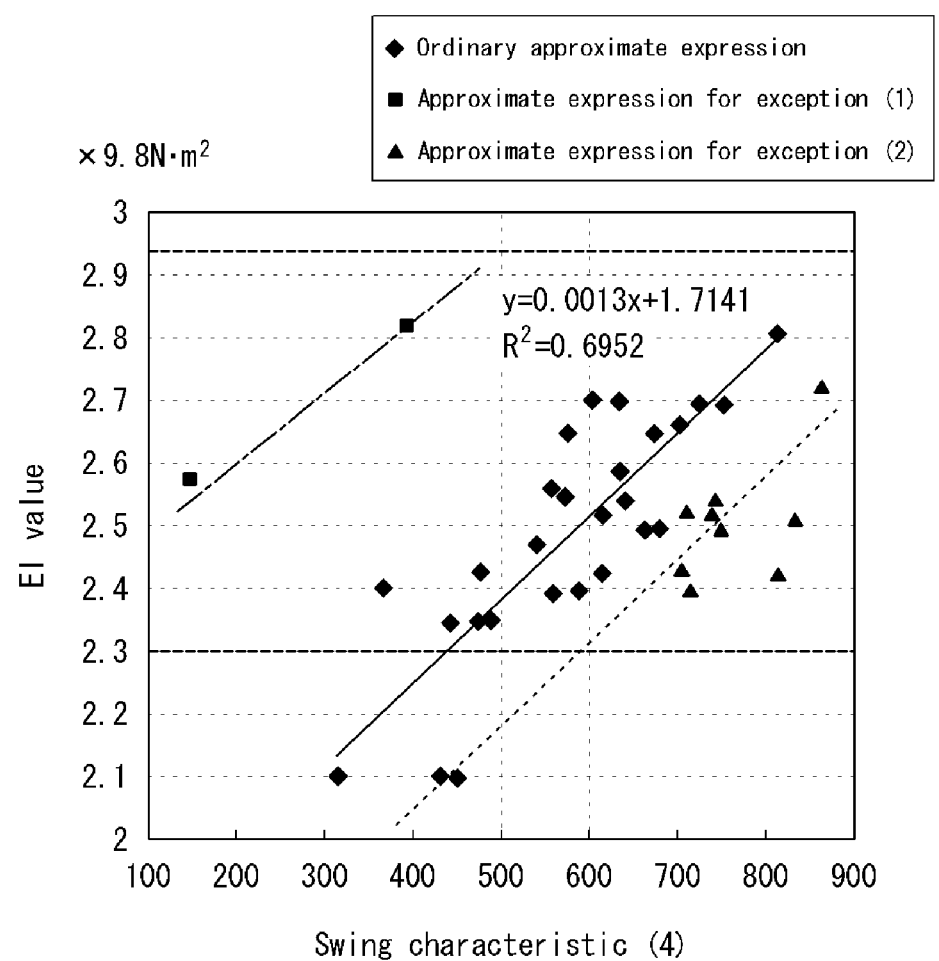
FIG. 21 shows a relationship between bending stiffness (EI value) and swing characteristic amount (4) at a measurement point of "6 inches;"
Figure 22:
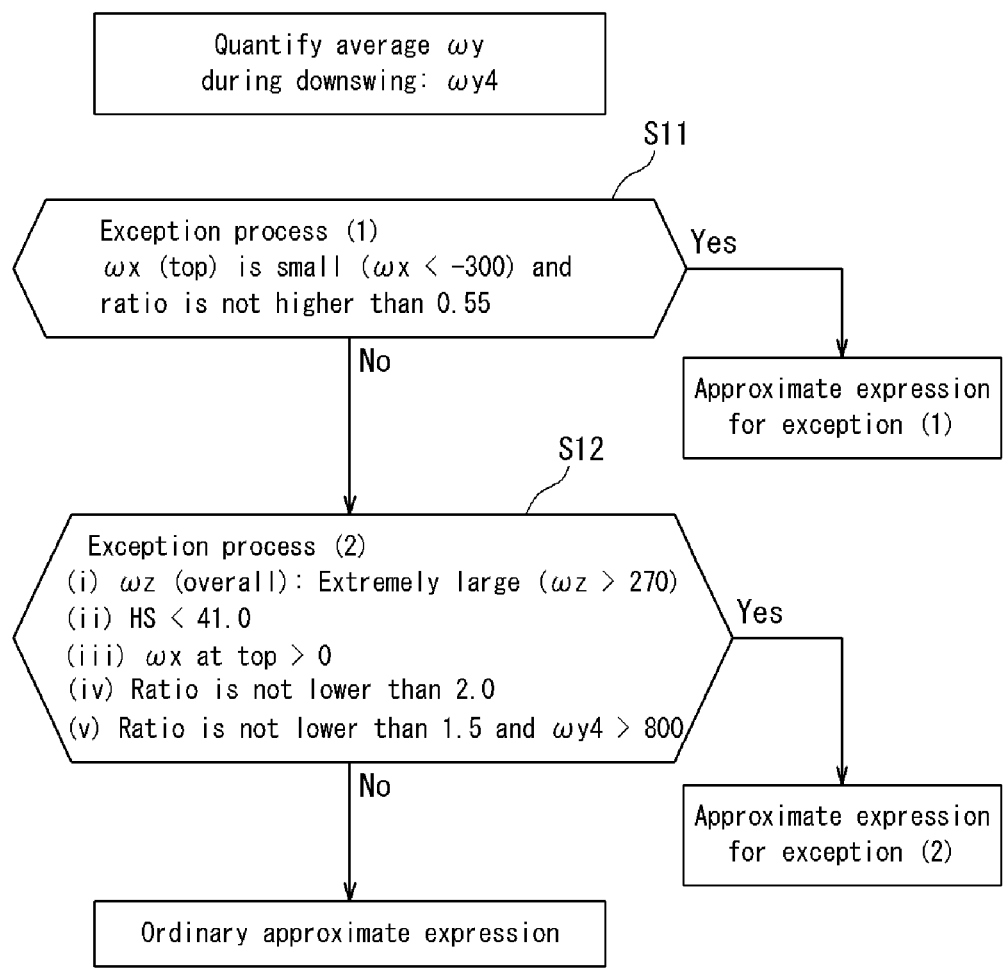
FIG. 22 shows a flow for calculating an EI value at the measurement point of "6 inches;"
Figure 24:
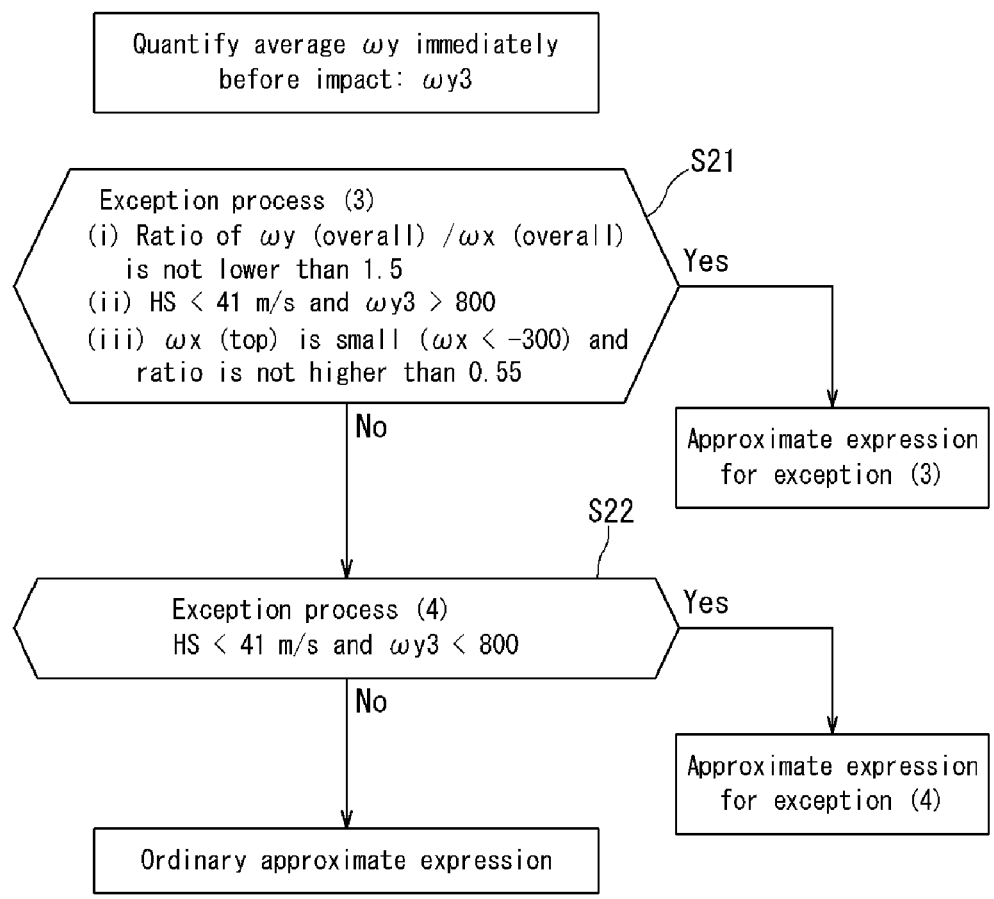
FIG. 24 shows a flow for calculating an EI value at the measurement point of "16 inches;"
Figure 26:
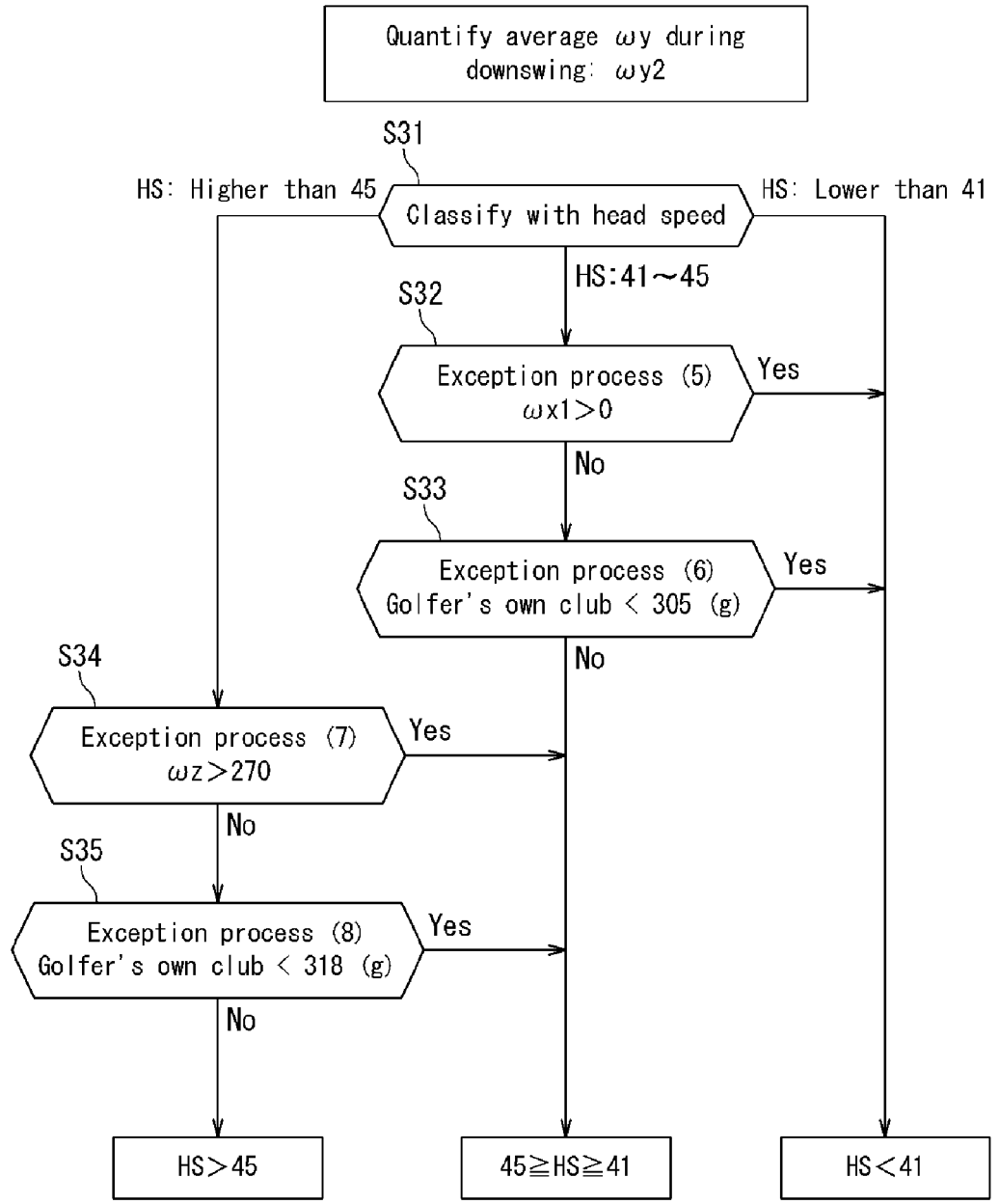
FIG. 26 shows a flow for calculating an EI value at the measurement point of "26 inches;"
Figure 28:
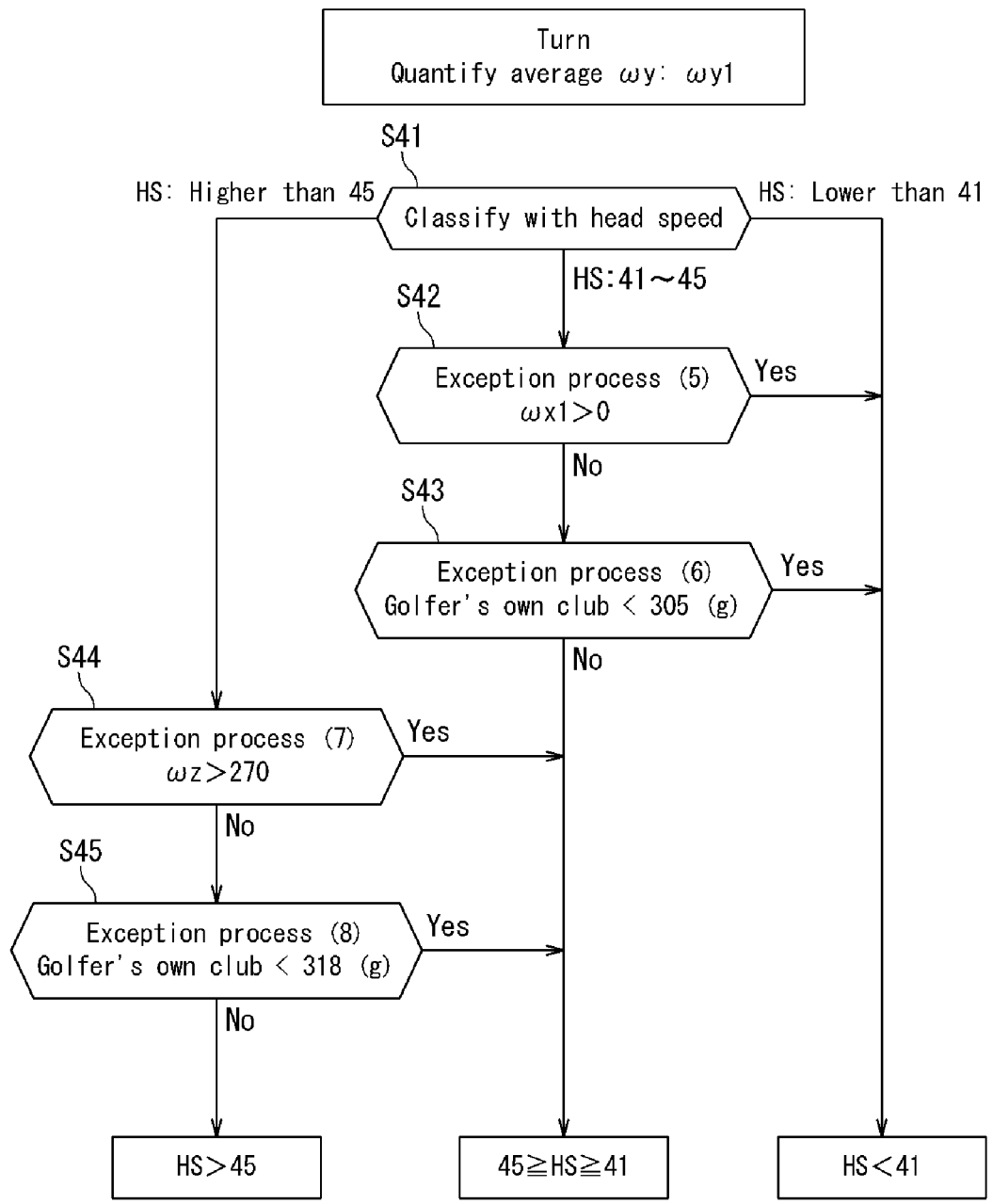
FIG. 28 shows a flow for calculating an EI value at the measurement point of "36 inches;"

FIG. 21 shows a relationship between bending stiffness (EI value) and the swing characteristic amount (4) at the measurement point of "6 inches" created in advance as described above, and FIG. 22 shows a flow for calculating the EI value at the measurement point of "6 inches." It should be noted that, in FIG. 22, "$\omega y4$" is the swing characteristic amount (4) of the angular velocity in the direction of a wrist cock. The same applies for FIGS. 24, 26, and 28 described later.

In the present embodiment, for the purpose of improving accuracy of calculating the EI value, not only one approximate expression but three approximate expressions are prepared in advance. Although it is possible to represent the relationship between the swing characteristic amount (4) and the EI value at the measurement point of "6 inches" with a single approximate expression, there are cases where a highly reliable EI value cannot be calculated with a single approximate expression for golfers whose swings are deviated from average such as golfers having an extremely low angular velocity $\omega x$ in the x-axial direction around the top and golfers having considerably low head-speeds. Therefore, in addition to an ordinary approximate expression for average golfers, an approximate expression for exception (1) and an approximate expression for exception (2) are prepared in the present embodiment.

First, exception process (1) is executed at step S11. Specifically, it is determined whether or not the angular velocity $\omega x$ in the x-axial direction around the top is $\omega x < -300$, and the ratio ($\omega y$(overall)/$\omega x$(overall)) between an average value of the angular velocity $\omega y$ in the y-axial direction from the top to the impact and an average value of the angular velocity $\omega x$ in the x-axial direction from the top to the impact is 0.55 or lower. And if the result is YES, the EI value is calculated using the approximate expression for exception (1) shown by a long dashed short dashed line in FIG. 21.

On the other hand, if the result is NO at step S11, the flow advances to step S12 and exception process (2) is executed. In this exception process (2), it is determined whether or not at least one of the following five conditions of (a) to (e) is satisfied.

(a) An accumulated value of the angular velocity $\omega z$ in the z-axial direction from the top to the impact is extremely large as $\omega z > 270$.

(b) The head speed is lower than 41.0 m/s.

(c) The angular velocity $\omega x$ in the x-axial direction around the top satisfies $\omega x > 0$.

(d) The ratio ($\omega y$(overall)/$\omega x$(overall)) between an average value of the angular velocity $\omega y$ in the y-axial direction from the top to the impact and an average value of the angular velocity $\omega x$ in the x-axial direction from the top to the impact is 2.0 or higher.

(e) The ratio ($\omega y$(overall)/$\omega x$(overall)) between an average value of the angular velocity $\omega y$ in the y-axial direction from the top to the impact and an average value of the angular velocity $\omega x$ in the x-axial direction from the top to the impact is 1.5 or higher, and the swing characteristic amount (4) is larger than 800.

If the result is YES at step S12, the EI value is calculated using the approximate expression for exception (2) shown as a short dashed line in FIG. 21. On the other hand, if the result is NO at step S12, the EI value is calculated using an ordinary approximate expression shown as a solid line in FIG. 21.

The ordinary approximate expression, the approximate expression for exception (1), and the approximate expression for exception (2) can all be regarded as a linear expression representing a regression line obtained by least squares method. Slopes and intercepts of the respective expressions are shown in the following Table 6.

TABLE 6

| | Slope | Intercept |
|---|---|---|
| Ordinary approximate expression | 0.00135 | 1.74 |
| Approximate expression for exception (1) | | 1.74 + 0.6 |
| Approximate expression for exception (2) | | 1.74 − 0.2 |

Figure 23:
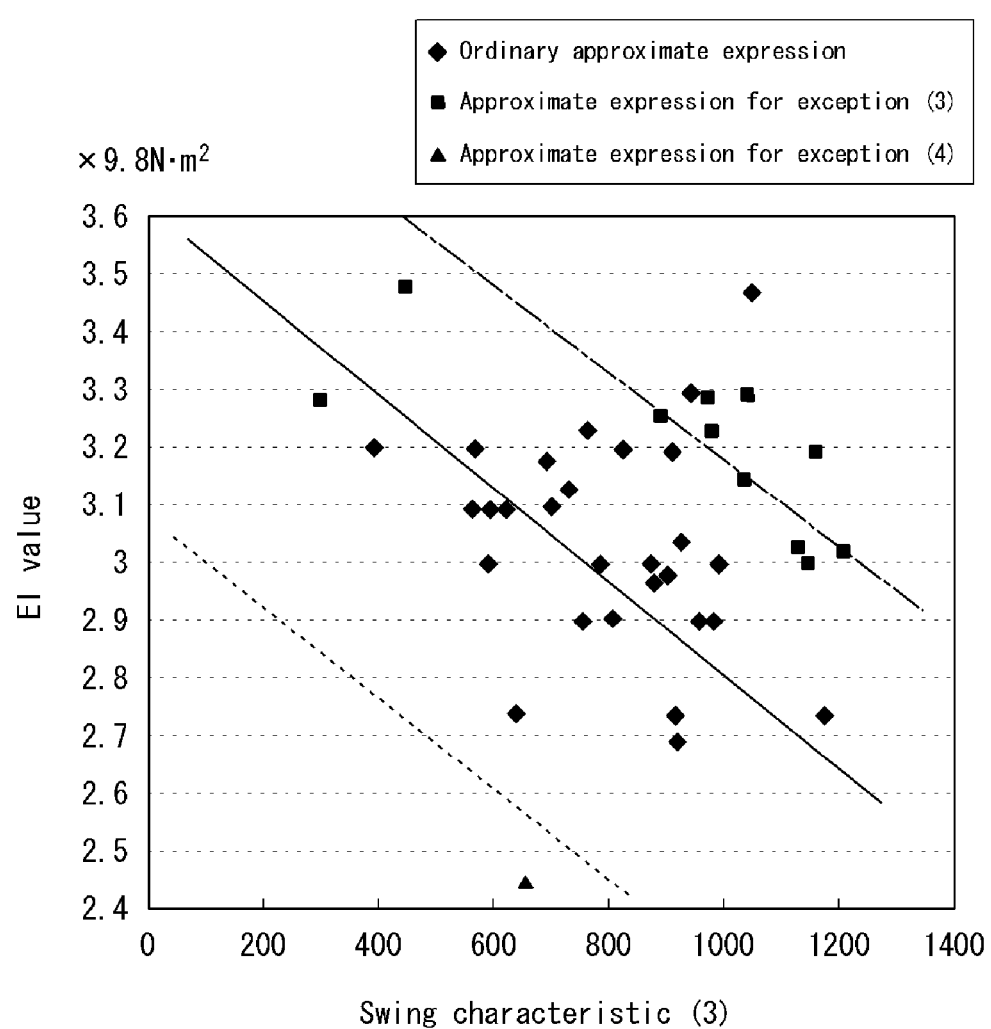
FIG. 23 shows a relationship between bending stiffness (EI value) and swing characteristic amount (3) at a measurement point of "16 inches;"

FIG. 23 shows a relationship between bending stiffness (EI value) and the swing characteristic amount (3) at the measurement point of "16 inches" created in advance as described above, and FIG. 24 shows a flow for calculating the EI value at the measurement point of "16 inches."

First, at step S21, exception process (3) is executed. Specifically, it is determined whether or not at least one of the following three conditions of (f) to (h) is satisfied.

(f) The ratio ($\omega y$(overall)/$\omega x$(overall)) between an average value of the angular velocity $\omega y$ in the y-axial direction from the top to the impact and an average value of the angular velocity $\omega x$ in the x-axial direction from the top to the impact is 1.5 or higher.

(g) The head speed (HS) is lower than 41 m/s, and the swing characteristic amount (3) is larger than 800.

(h) The angular velocity $\omega x$ in the x-axial direction around the top is lower than −300, and the ratio ($\omega y$(overall)/$\omega x$(overall)) between an average value of the angular velocity $\omega y$ in the y-axial direction from the top to the impact and an average value of the angular velocity $\omega x$ in the x-axial direction from the top to the impact is 0.55 or lower.

If the result is YES at step S21, the EI value is calculated using the approximate expression for exception (3) shown as a long dashed short dashed line in FIG. 23. On the other hand, if the result is NO at step S21, the flow advances to step S22 and exception process (4) is executed. In this exception process (4), it is determined whether or not the head speed is lower than 41 m/s and the swing characteristic amount (3) is smaller than 800.

If the result is YES at step S22, the EI value is calculated using the approximate expression for exception (4) shown as a short dashed line in FIG. 23. On the other hand, if the result is NO at step S22, the EI value is calculated using the ordinary approximate expression shown as a solid line in FIG. 23.

The ordinary approximate expression, the approximate expression for exception (3), and the approximate expression for exception (4) can all be regarded as a linear expression representing a regression line obtained by least squares method. Slopes and intercepts of the respective expressions are shown in the following Table 7.

TABLE 7

|  | Slope | Intercept |
| --- | --- | --- |
| Ordinary approximate expression | −0.0008 | 3.6 |
| Approximate expression for exception (3) |  | 3.6 + 0.35 |
| Approximate expression for exception (4) |  | 3.6 − 0.6 |

Figure 25:
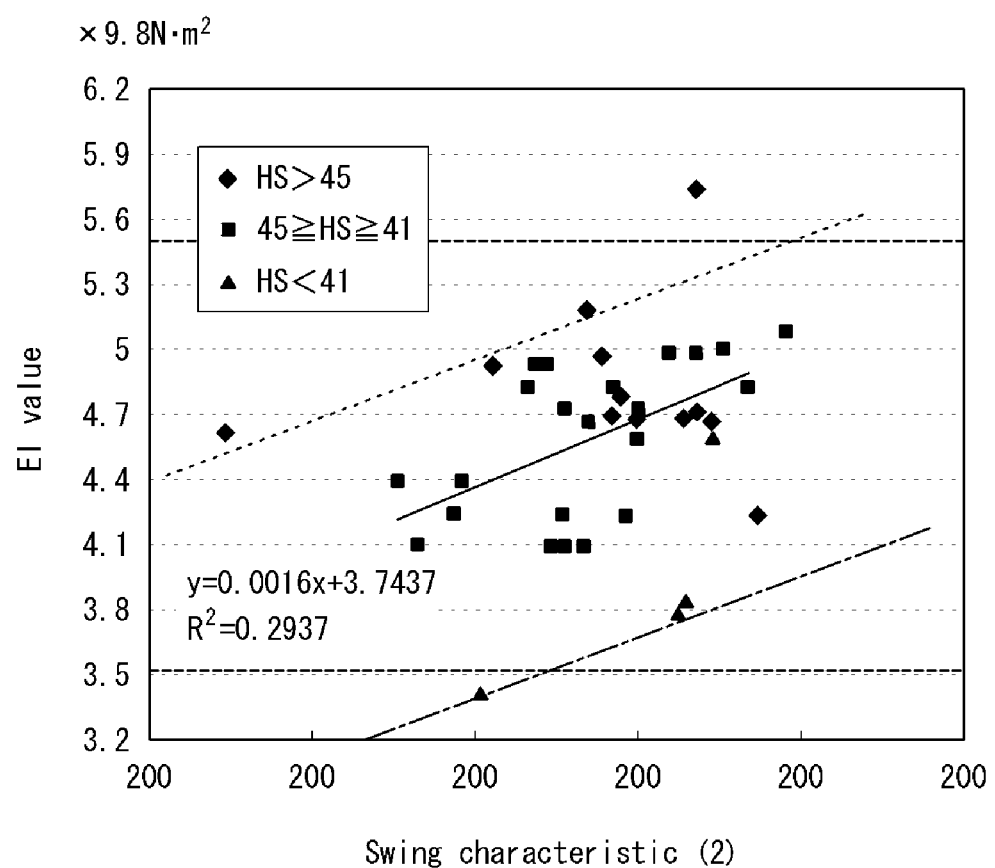
FIG. 25 shows a relationship between bending stiffness (EI value) and swing characteristic amount (2) at a measurement point of "26 inches;"

FIG. 25 shows a relationship between bending stiffness (EI value) and the swing characteristic amount (2) at the measurement point of "26 inches" created in advance as described above, and FIG. 26 shows a flow for calculating the EI value at the measurement point of "26 inches." For the swing characteristic amount (2), three approximate expressions in accordance with head speed of a golfer are configured. More specifically, an approximate expression is configured for each of the cases where the head speeds are lower than 41 m/s (case 1), not lower than 41 m/s but not higher than 45 m/s (case 2), and higher than 45 m/s (case 3).

First, at step S31, it is determined which of case 1, case 2, or case 3 applies to the head speed. If case 1 applies, the EI value is calculated using the approximate expression shown as a long dashed short dashed line in FIG. 25. Furthermore, if case 2 applies, the flow advances to step S32 and exception process (5) is executed. In this exception process (5), it is determined whether or not the angular velocity $\omega x$ in the x-axial direction around the top is larger than zero.

If the result is YES at step S32, the EI value is calculated using the approximate expression shown as a long dashed short dashed line in FIG. 25. On the other hand, if the result is NO at step S32, the flow advances to step S33 and exception process (6) is executed. In this exception process (6), it is determined whether or not the weight of a club (his/her own club) ordinarily used by a golfer to whom a fitting is performed is smaller than 305 g.

If the result is YES at step S33, the EI value is calculated using the approximate expression shown as a long dashed short dashed line in FIG. 25. On the other hand, if the result is NO at step S33, the EI value is calculated using the approximate expression shown as a solid line in FIG. 25.

Furthermore, if case 3 applies at step S31, the flow advances to step S34 and exception process (7) is executed. In this exception process (7), it is determined whether or not the angular velocity $\omega z$ in the z-axial direction is larger than 270. If the result is YES at step S34, the EI value is calculated using the approximate expression shown as a solid line in FIG. 25.

On the other hand, if the result is NO at step S34, the flow advances to step S35 and exception process (8) is executed. In this exception process (8), it is determined whether or not the weight of a club (his/her own club) ordinarily used by a golfer to whom a fitting is performed is smaller than 318 g. If the result is YES at step S35, the EI value is calculated using the approximate expression shown as a solid line in FIG. 25. On the other hand, if the result is NO at step S35, the EI value is calculated using the approximate expression shown as a short dashed line in FIG. 25.

The approximate expression for case (1), the approximate expression for case (2), and the approximate expression for case (3) can all be regarded as a linear expression representing a regression line obtained by least squares method. Slopes and intercepts of the respective expressions are shown in the following Table 8.

TABLE 8

|  | Slope | Intercept |
| --- | --- | --- |
| HS > 45 | 0.0014 | 3.8 + 0.6 |
| 45 ≥ HS ≥ 41 |  | 3.8 |
| HS < 41 |  | 3.8 − 0.9 |

Figure 27:
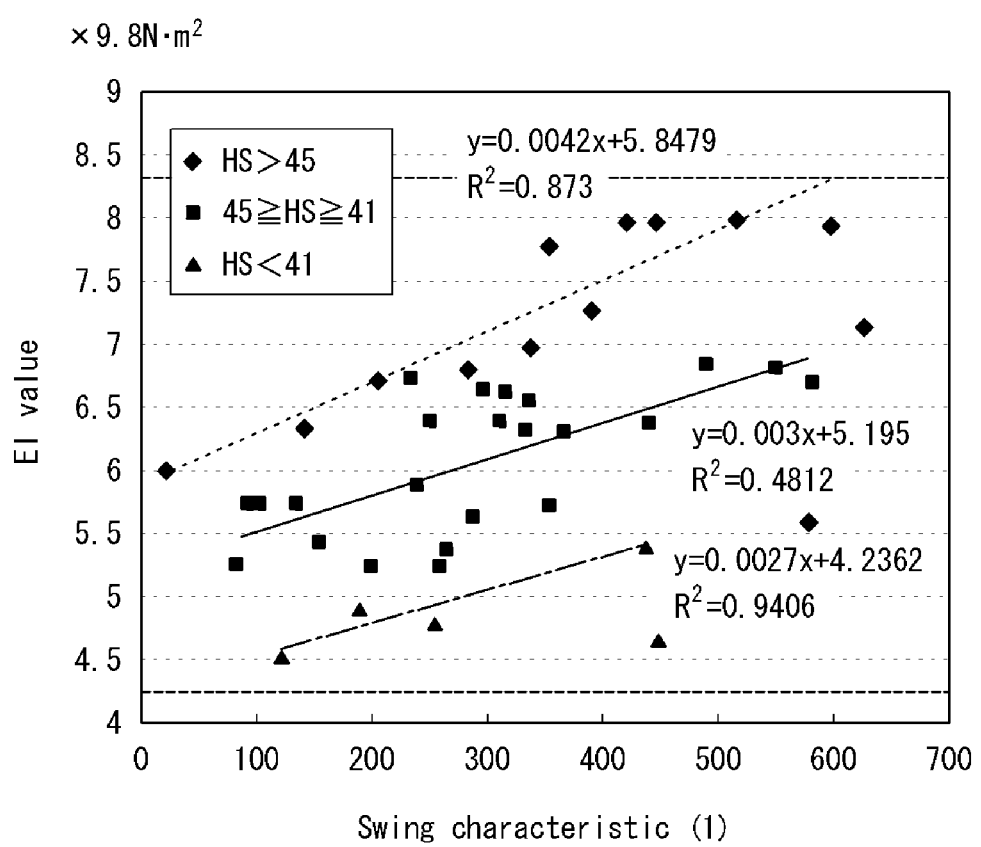
FIG. 27 shows a relationship between bending stiffness (EI value) and swing characteristic amount (1) at a measurement point of "36 inches;"

FIG. 27 shows a relationship between bending stiffness (EI value) and the swing characteristic amount (1) at the measurement point of "36 inches" created in advance as described above, and FIG. 28 shows a flow for calculating the EI value at the measurement point of "36 inches." Also for the swing characteristic amount (1), three approximate expressions in accordance with head speed of a golfer are configured. More specifically, an approximate expression is configured for each of the cases where the head speeds are lower than 41 m/s (case 1), not lower than 41 m/s but not higher than 45 m/s (case 2), and higher than 45 m/s (case 3).

First, at step S41, it is determined which of case 1, case 2, or case 3 applies to the head speed. If case 1 applies, the EI value is calculated using the approximate expression shown as a long dashed short dashed line in FIG. 27. Furthermore, if case 2 applies, the flow advances to step S42 and exception process (5) is executed. In this exception process (5), it is determined whether or not the angular velocity $\omega x$ in the x-axial direction around the top is larger than zero.

If the result is YES at step S42, the EI value is calculated using the approximate expression shown as a long dashed short dashed line in FIG. 27. On the other hand, if the result is NO at step S42, the flow advances to step S43 and exception process (6) is executed. In this exception process (6), it is determined whether or not the weight of a club (his/her own club) ordinarily used by a golfer to whom a fitting is performed is smaller than 305 g.

If the result is YES at step S43, the EI value is calculated using the approximate expression shown as a long dashed short dashed line in FIG. 27. On the other hand, if the result is NO at step S43, the EI value is calculated using the approximate expression shown as a solid line in FIG. 27.

Furthermore, if case 3 applies at step S41, the flow advances to step S44 and exception process (7) is executed. In this exception process (7), it is determined whether or not the angular velocity ωz in the z-axial direction is larger than 270. If the result is YES at step S44, the EI value is calculated using the approximate expression shown as a solid line in FIG. 27.

On the other hand, if the result is NO at step S44, the flow advances to step S45 and exception process (8) is executed. In this exception process (8), it is determined whether or not the weight of a club (his/her own club) ordinarily used by a golfer to whom a fitting is performed is smaller than 318 g. If the result is YES at step S45, the EI value is calculated using the approximate expression shown as a solid line in FIG. 27. On the other hand, if the result is NO at step S45, the EI value is calculated using the approximate expression shown as a short dashed line in FIG. 27.

The approximate expression for case (1), the approximate expression for case (2), and the approximate expression for case (3) can all be regarded as a linear expression representing a regression line obtained by least squares method. Slopes and intercepts of the respective expressions are shown in the following Table 9.

TABLE 9

|  | Slope | Intercept |
|---|---|---|
| HS > 45 | 0.0042 | 5.83 |
| 45 ≥ HS ≥ 41 | 0.0031 | 5.12 |
| HS < 41 | 0.0019 | 4.32 |

[Calculation of IFC in Every Inch]

With respect to the EI value of the shaft calculated in every inch using the above described method, one of the values of the 10-scale IFC is calculated using a conversion table shown in, for example, Tables 1 to 4. As described above, in the present embodiment, a method of sorting shafts into 10 scales within a range of shafts intended to be provided to a user by a fitter while taking into consideration frequency of usage etc., is employed.

[Shaft Selection]

In the manner described above, IFC in every inch is calculated for a golfer to whom a fitting is performed. Examples of calculated IFC may include 36 inches: 5, 26 inches: 4, 16 inches: 4, and 6 inches: 2.

Then, a shaft that matches the most with the calculation result is selected from a database. The database has stored therein data of multiple types of shafts regarding weight, IFC measured in advance in every inch, etc. By using the database, "coincidence rate" shown in the following expression (3) is calculated for all clubs stored in the database, and a club whose value therefrom is the smallest is suggested to the golfer. It should be noted that "coincidence rate" in the present specification does not mean the degree of coincidence but indicates an index whose value is small when a shaft has a bending stiffness that is close to a calculation result, as obvious from expression (3). A coincidence rate of zero means a shaft has bending stiffness that is identical to a calculation result in every inch.

$$\text{(Coincidence rate)} = \sum_{i=1}^{4} |\text{Calculated } i - \text{Database } i| \tag{3}$$

When there are multiple shafts whose coincidence rates are small to the same degree, multiple shafts may be suggested to the user, or they may be narrowed down to a single shaft after taking into consideration a request of the user. As the standard for narrowing down to a single shaft, there are methods such as a method of placing greater value on ease of swinging by prioritizing a coincidence rate of IFC at "36 inches" or "26 inches" on the shaft hand side, and a method of placing greater value on performance (flight distance, directionality) by prioritizing a coincidence rate of IFC at "16 inches" or "6 inches" on the shaft front end side.

Furthermore, in the present embodiment, when performing the selecting based on "coincidence rate" described above, an interview is conducted beforehand with the golfer to whom a fitting is performed with regard to the weight of his/her own club. Among the multiple shafts that are stored in the database, fitting is performed based on the result of the interview, using shafts having a weight within a range of plus and minus 5 g of the weight of the golfer's own club. If the weight of a golf club having a selected shaft is largely different from the weight of his/her own club that is ordinarily used, there is a possibility of the golfer not being able to exert his/her full performance due to swinging being difficult because of difficulty in adjusting the timing. In order to prevent this with certainty, it is preferable to perform the fitting using shafts having a weight within a range of plus and minus 5 g of the weight of the golfer's own club.

[Verification Result]

A shaft-exchangeable golf club whose shaft can be freely exchanged was manufactured, and verification of the effectiveness of the fitting method according to the present embodiment was conducted using this golf club.

An experiment was conducted using, as subjects, testers who use an S or an X shaft and who have skills equivalent to a single digit handicap player. The number of the testers was 23, and their head speeds were about 41 to 51 m/s.

First, a tester was asked to test-hit a ball using a golf club having a sensor attached on a grip thereof to measure swing characteristic amounts of the tester, and a single shaft having a bending stiffness matching the tester was determined from a database using the swing characteristic amounts. In this database, data of 59 shafts whose IFCs are calculated in advance in every inch are stored.

Figure 29:
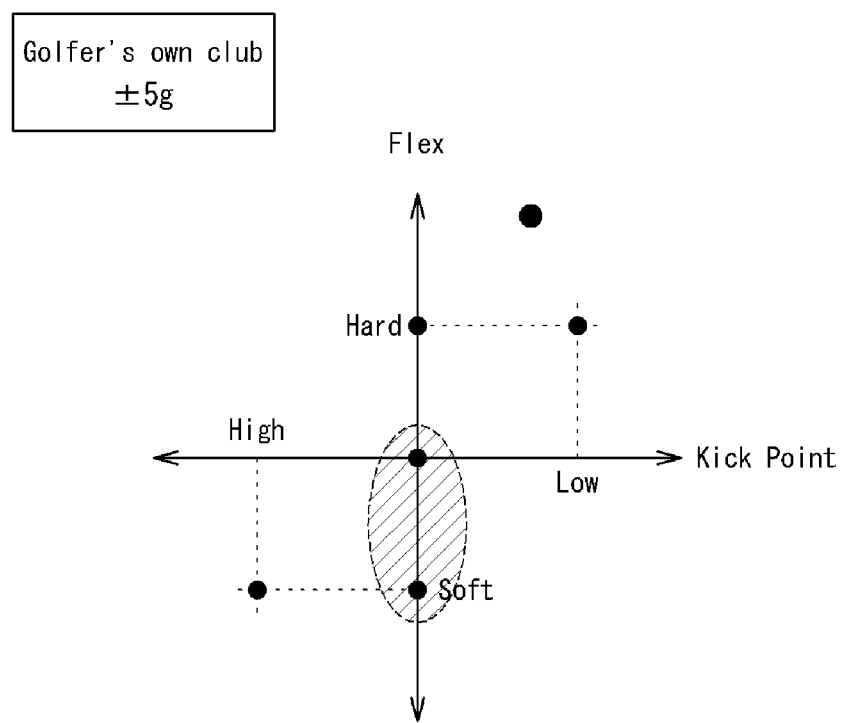
FIG. 29 is an illustrative diagram of flex and kick point of five shafts used for verification of the advantageous effect of the present invention.

Next, the tester was asked to test-hit using, from among the 59 shafts, five shafts that have different shaft properties (flex, kick point) and whose weights are within plus and minus 5 g of the tester's own club. As shown in FIG. 29, the five shafts had properties regarding flex (hardness) and kick point of: hard and low kick point; hard and middle kick point; moderate hardness and middle kick point; soft and middle kick point; and soft and high kick point. Shafts having such five patterns of properties were prepared in different weight levels.

Evaluation standards were set as, as a result of the test-hit: if there is one club that has large flight distance, capable of obtaining a ball course that does not curve, and is easy to swing among the five clubs, whether or not a shaft whose shaft properties are close to those of the one club has been selected; or if there are two or more such clubs, whether or not the selected shaft is contained in or in the vicinity of an ellipse (cf. shaded area in FIG. 29) including those shafts.

For each of the 23 testers, it was determined as a "correct answer" when the fitted club was included in the ellipse. The result was that 21 out of the 23 testers confirmed that fitting was performed correctly. The correct answer rate was (21/23)×100≈91%. Then, it was confirmed with the 21 testers to whom the method was effective (who obtained a correct answer) how effective the method was regarding flight distance, directionality, and ease of swinging. As averages of the 21 testers, it was confirmed that flight distance increased by 5.5 yards, directionality improved where a shift of 12 yards toward the center was observed, and ease of swinging improved by 1.0 point. It should be noted that evaluation of ease of swinging is based on a 9-scale evaluation ("5" as being neither easy nor difficult) shown in FIG. 20.

Second Embodiment

In a second embodiment, unlike the first embodiment described above, bending stiffnesses at three measurement points of the shaft 20 are measured and converted into numerical values.

Figure 30:
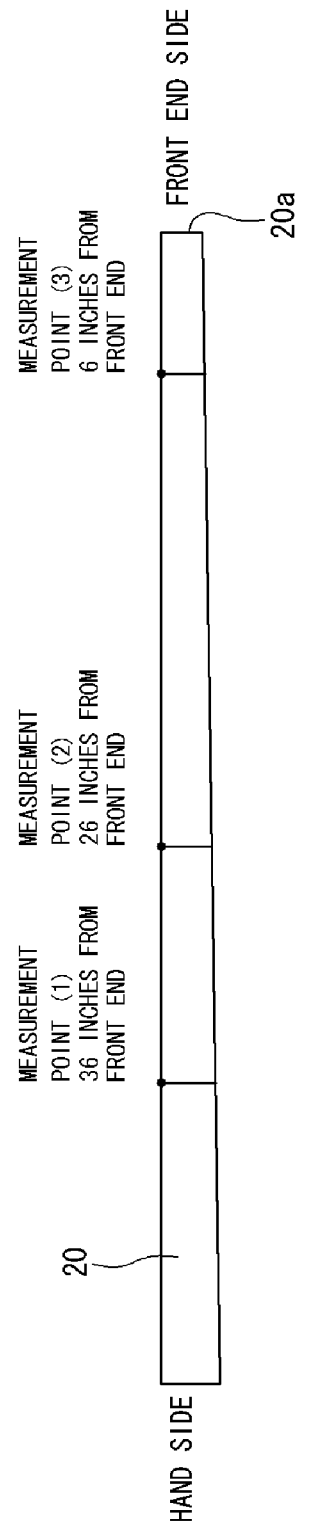
FIG. 30 is for describing three positions of a shaft at which bending stiffnesses are measured, in a fitting method according to a second embodiment of the present invention.

Specifically, as shown in FIG. 30, the shaft 20 is divided into three regions, and bending stiffness at a single point in each of the regions is defined. In the present embodiment, with respect to the tip end 20a of the shaft 20, a part 36 inches therefrom is defined as a measurement point (1), a part 26 inches therefrom is defined as a measurement point (2), and a part 6 inches therefrom is defined as a measurement point (3). Then, bending stiffnesses at the three measurement points of the shaft 20 are measured and converted into numerical values. It should be noted that, in the present specification, "every inch" does not mean "at 1 inch, at 2 inches, etc.," but means "every part of a plurality of parts whose distances from one end of a shaft are predetermined inches;" and "predetermined inches" in the present embodiment are 36 inches, 26 inches, and 6 inches from the tip end 20a of the shaft 20 as described above. Although three measurements of bending stiffnesses of the shaft at 36 inches, 26 inches, and 6 inches from the tip end of the shaft are conducted in the present embodiment, the number of inches is not particularly limited in the present invention, and it is possible to apply changes to each number of inches within a range of plus and minus several inches. For example, the measurement point (1) may be set as 36±3 inches from the tip end of the shaft.

Furthermore, in addition to the three measurement points, for example, a part 16 inches from the tip end of the shaft can be used as a measurement point.

In a manner similar to the first embodiment, bending stiffness (EI value: N·m$^2$) of every inch of the shaft can be measured as shown in FIG. 3 using, for example, a model 2020 measuring machine (maximum load 500 kgf) manufactured by INTESCO Co., Ltd.

Also in the present embodiment, similar to the first embodiment, a rank value is given from among multiple-scale rank values in accordance with bending stiffnesses of the shaft measured for every inch. Specifically, a value of one of the above described 10-scale IFCs is given in accordance with bending stiffness.

The following Tables 10 to 12 are conversion tables for converting an EI value of a shaft to an IFC at the measurement points (1) to (3), respectively. As a method for sorting hardness of a shaft into 10 scales, several methods are conceivable such as a method of sorting shafts into 10 scales using, as subjects, all commercially available shafts, and a method of sorting shafts into 10 scales within a range of shafts intended to be provided to a user by a fitter while taking into consideration frequency of usage etc. However, in the present embodiment, fitting is performed using the latter of the two methods. It should be noted that, a similar conversion table can be created for other measurement points (e.g., the above described part that is 16 inches from the tip end of the shaft).

TABLE 10

(a) IFC at 36 inches

| IFC | EI value [×9.8 N · m$^2$] | | |
|---|---|---|---|
| | Maximum | ~ | Minimum |
| 9 | | ~ | 8.295 |
| 8 | 8.295 | ~ | 7.86 |
| 7 | 7.86 | ~ | 7.425 |
| 6 | 7.425 | ~ | 6.99 |
| 5 | 6.99 | ~ | 6.555 |
| 4 | 6.555 | ~ | 6.12 |
| 3 | 6.12 | ~ | 5.685 |
| 2 | 5.685 | ~ | 5.25 |
| 1 | 5.25 | ~ | 4.185 |
| 0 | 4.185 | ~ | 0 |

TABLE 11

(b) IFC at 26 inches

| IFC | EI value [×9.8 N · m$^2$] | | |
|---|---|---|---|
| | Maximum | ~ | Minimum |
| 9 | | ~ | 5.543 |
| 8 | 5.543 | ~ | 5.306 |
| 7 | 5.306 | ~ | 5.069 |
| 6 | 5.069 | ~ | 4.832 |
| 5 | 4.832 | ~ | 4.595 |
| 4 | 4.595 | ~ | 4.358 |
| 3 | 4.358 | ~ | 4.121 |
| 2 | 4.121 | ~ | 3.884 |
| 1 | 3.884 | ~ | 3.647 |
| 0 | 3.647 | ~ | 0 |

TABLE 12

(c) IFC at 6 inches

| IFC | EI value [×9.8 N · m$^2$] | | |
|---|---|---|---|
| | Maximum | ~ | Minimum |
| 9 | | ~ | 2.94 |
| 8 | 2.94 | ~ | 2.86 |
| 7 | 2.86 | ~ | 2.78 |
| 6 | 2.78 | ~ | 2.7 |
| 5 | 2.7 | ~ | 2.62 |
| 4 | 2.62 | ~ | 2.54 |
| 3 | 2.54 | ~ | 2.46 |

TABLE 12-continued (c) IFC at 6 inches

| IFC | EI value [×9.8 N·m$^2$] | | |
|---|---|---|---|
| | Maximum | ~ | Minimum |
| 2 | 2.46 | ~ | 2.38 |
| 1 | 2.38 | ~ | 2.3 |
| 0 | 2.3 | ~ | 0 |

[Swing Characteristic Amount]

Also in the present embodiment, similar to the first embodiment, a golfer hoping for fitting of a golf club is asked to actually swing a golf club, and swing characteristic amounts specific to the golfer are measured from the swing (cf. FIG. 4).

In the present embodiment, among the above described various stages of the swing, focus is placed on an angular velocity ωy in a direction of a wrist cock during a downswing from around the top to the impact, and the angular velocity ωy is subdivided and quantified depending on elapsed time. It should be noted that, in the present specification, "around the top" refers to a time interval including a predetermined time immediately before the top and a predetermined time immediately after the top, and more specifically, refers to a time interval of, for example, 100 ms between −50 ms from the top and +50 ms from the top.

Figure 31:
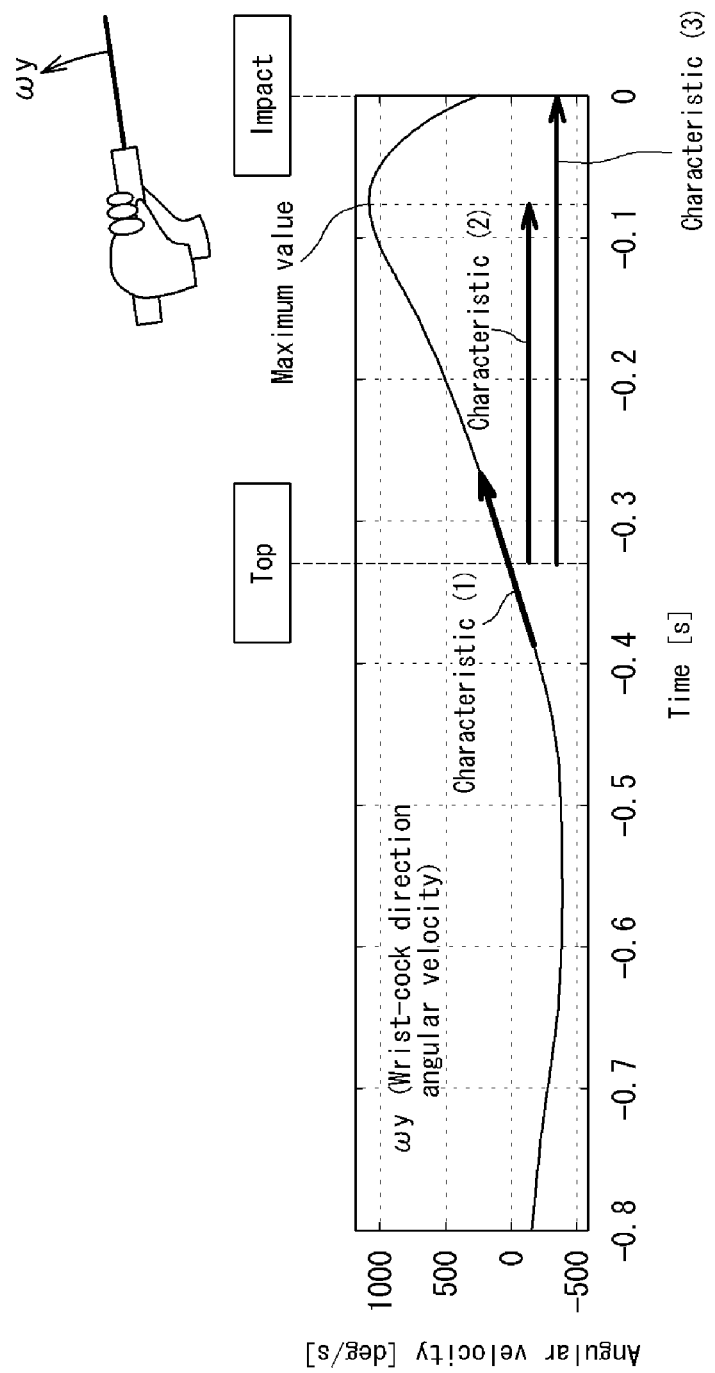
FIG. 31 shows a change in the angular velocity in the direction of a wrist cock during a swing depending on elapsed time.

FIG. 31 shows a relationship in a certain swing between time (s) from the address to the impact and the angular velocity ωy (deg/s) in the direction of a wrist cock. In the present embodiment, as shown in FIG. 31, three swing characteristics of (1) to (3) are configured depending on elapsed time of the swing, and the swing characteristics are each quantified. It should be noted that the swing characteristic amount (3) of the present embodiment corresponds to the swing characteristic amount (4) in the first embodiment.

The swing characteristic amount (1) as the swing characteristic amount (a) is the slope (amount of change) of the angular velocity ωy in the direction of a wrist cock around the top, and, for example, can be represented as a sum of an angular velocity ωy 50 ms before the top and an angular velocity ωy after 50 ms of the top. The swing characteristic amount (1) is correlated with the above described bending stiffness at the measurement point of 36 inches from the tip end of the shaft.

The swing characteristic amount (2) as the swing characteristic amount (b) is an average value of the angular velocity ωy from the top to a time point at which the angular velocity ωy becomes a maximum. The average value can be obtained by obtaining a maximum value of the angular velocity ωy from the top to the impact, and dividing an accumulated value of the angular velocity ωy from the top to the time point at which the maximum value is obtained by a time period from the top to the time point at which the maximum value is obtained. The swing characteristic amount (2) is correlated with the above described bending stiffness at the measurement point of 26 inches from the tip end of the shaft.

The swing characteristic amount (3) as the swing characteristic amount (c) is an average value of the angular velocity ωy from the top to the impact, and the average value can be obtained by dividing an accumulated value of the angular velocity ωy from the top to the impact by a time period from the top to the impact. The swing characteristic amount (3) is correlated with the above described bending stiffness at the measurement point of 6 inches from the tip end of the shaft.

It should be noted that other swing characteristic amounts include an average value of the angular velocity ωy, from a time point at which the angular velocity ωy becomes a maximum to the impact (the swing characteristic amount (3) in the first embodiment). The average value can be obtained by dividing an accumulated value of the angular velocity ωy from the time point at which the maximum value is obtained to the impact by a time period from the time point at which the maximum value is obtained to the impact. This swing characteristic amount is known to be correlated with the above described bending stiffness at the measurement point of 16 inches from the tip end of the shaft, although it is not correlated as much as the swing characteristic amounts (1) to (3). Thus, fitting can be performed by additionally using this swing characteristic amount.

For the swing characteristic amounts (1) to (3), a golfer hoping for fitting is asked to test-hit a predetermined number of balls, for example, five balls, and swing characteristic amounts obtained upon hitting each of the balls can be averaged to be set as swing characteristic amounts of the golfer.

[Calculation of Shaft Stiffnesses in Every Inch]

Next, based on the calculated swing characteristic amounts (1) to (3), shaft stiffnesses suited for the golfer are calculated in every inch. Preceding this calculation, an approximate expression representing a relationship between swing characteristic amount and preferable bending stiffness (EI value) of a shaft is obtained for each of the swing characteristic amounts. The approximate expression is created based on data collected by having multiple testers conduct test-hits. From a standpoint of increasing reliability of the approximate expression, having a larger number of testers is preferable. In the present embodiment, the testers are intermediate-level or advanced-level players having a handicap of 20 or lower. For each of the testers, several golf clubs have been selected from multiple golf clubs (drivers) prepared in advance using as a reference the weight, length, and flex (or kick point) of golf clubs that are ordinarily used by a tester. Then, a tester is asked to test-hit several balls (excluding miss-shots), e.g., six balls, for each of the several golf clubs, and is asked to select a golf club that is easy to hit a ball in accordance with a later described standard.

With regard to a golf club easy to hit with, three items of "flight distance," "directionality," and "ease of swinging" are scored in accordance with evaluation standards shown in, for example, the above described Table 5; and a club whose sum total of score is 1.5 points or higher is determined as a club that is easy to hit with. The selected several golf clubs have their shaft portions painted in black, and are randomly provided to a tester. With this, a tester cannot determine which club he or she is hitting. The test-hitting is performed in two sets of three balls for each club, and a questionnaire regarding ease of swinging is given to the tester for scoring, every time he or she has test-hit three balls with a certain club.

Figure 32:
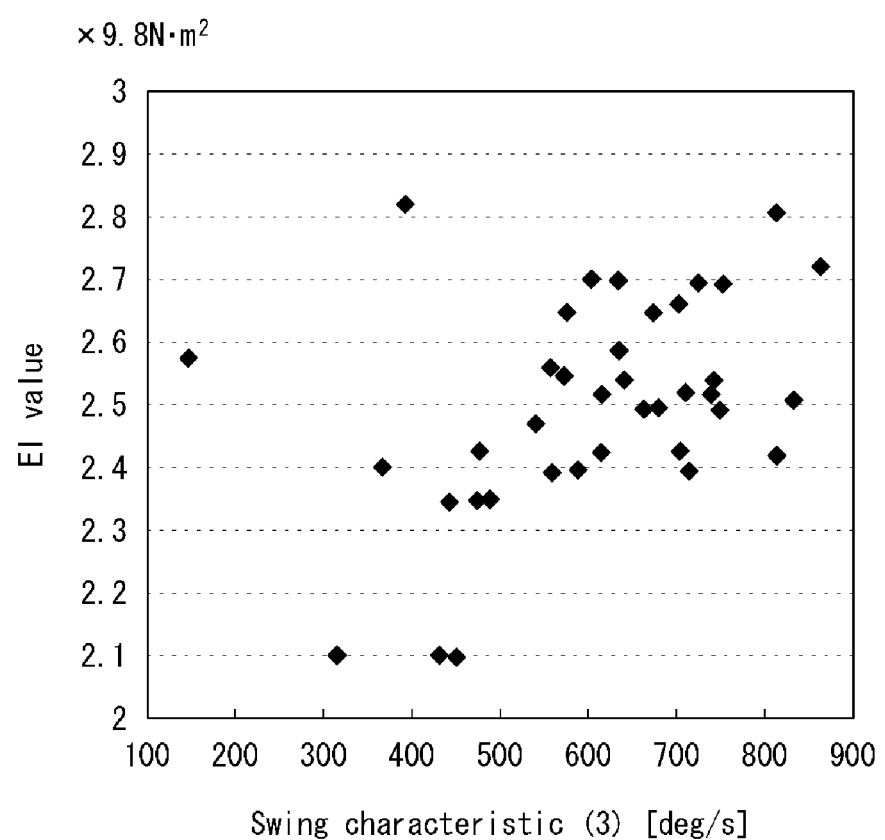
FIG. 32 shows a relationship between bending stiffness (EI value) and swing characteristic amount (3) at the measurement point of "6 inches;"

FIG. 32 shows a relationship between bending stiffness (EI value) and the swing characteristic amount (3) at the measurement point of "6 inches" created in advance as described above, FIG. 33 shows a relationship between bending stiffness (EI value) and the swing characteristic amount (2) at the measurement point of "26 inches" created in advance as described above, and FIG. 34 shows a relationship between bending stiffness (EI value) and the swing characteristic amount (1) at the measurement point of "36 inches" created in advance as described above.

Figure 33:
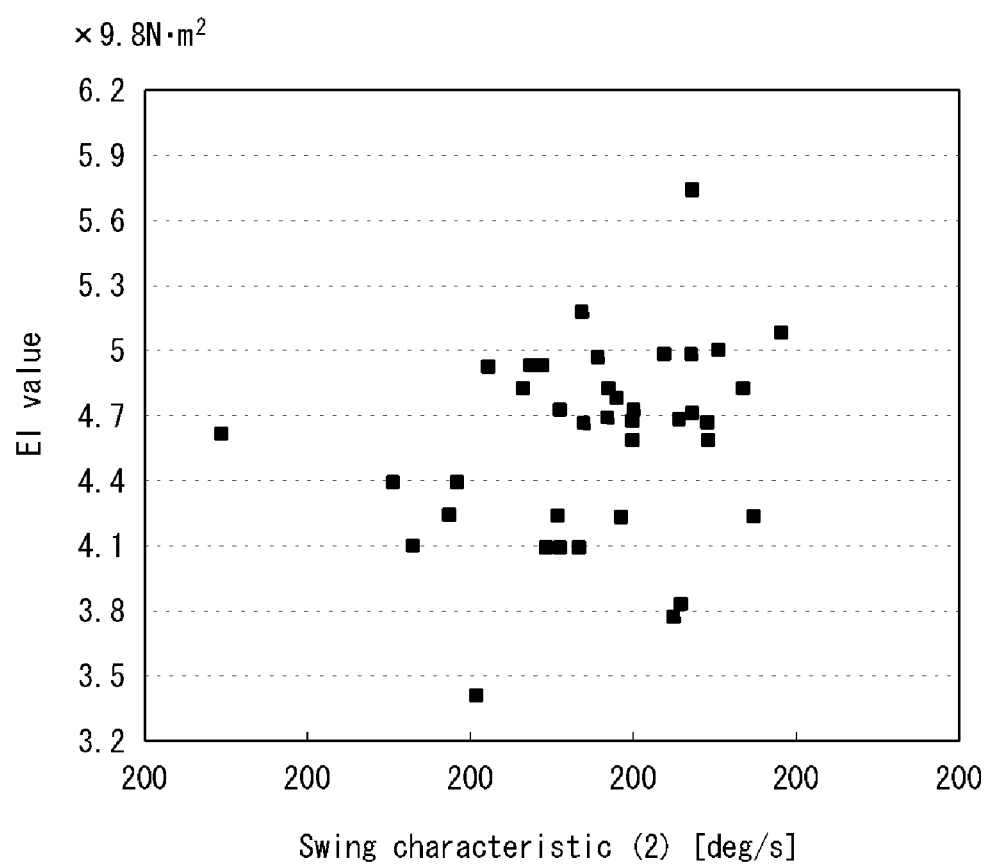
FIG. 33 shows a relationship between bending stiffness (EI value) and swing characteristic amount (2) at the measurement point of "26 inches;"
Figure 34:
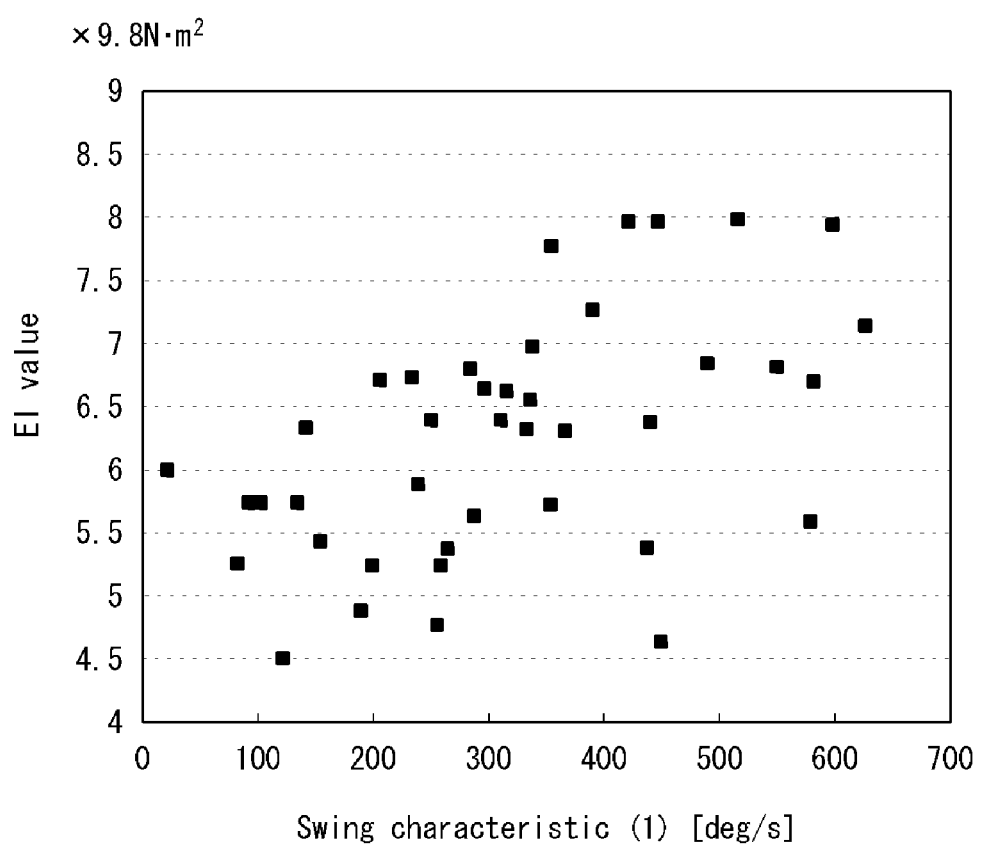
FIG. 34 shows a relationship between bending stiffness (EI value) and swing characteristic amount (1) at the measurement point of "36 inches;"

As shown in FIGS. 32 to 34, although there is a certain correlation between bending stiffness and swing characteristic amounts at a measurement point in every inch, there is a considerable number of golfers who deviate from the average population. In view of such fact, in the present embodiment, instead of simply representing the relationship between swing characteristic amounts and bending stiffness in an approximate expression, for each of the measurement points, each of the swing characteristic amounts is divided into multiple ranges, and bending-stiffness ranges of the shaft are configured so as to correspond to the respective ranges.

In the present invention, there is no particular limitation in the number by which each of the swing characteristic amounts is divided, and the number may be selected as appropriate from a range of, for example, 2 to 4.

For example, regarding the swing characteristic amount (3) that relates to FIG. 32, it is possible to apply a classification of bending stiffness EI $(N \cdot m^2) < 24.5$ when the swing characteristic amount (3) is not larger than 400 (deg/s), apply a classification of $23.0 <$ bending stiffness EI $(N \cdot m^2) < 27.5$ when the swing characteristic amount (a) is larger than 400 (deg/s) but not larger than 800 (deg/s), and apply a classification of bending stiffness EI $(N \cdot m^2) > 25.5$ when the swing characteristic amount (c) is larger than 800 (deg/s). The range of bending stiffness is selected so as to slightly overlap with an adjacent range of bending stiffness. It should be noted that, in FIG. 32 and later described FIGS. 33 and 34, the unit of EI in the vertical axis is "$N \cdot m^2$," and a value obtained by multiplying the scale value by a numerical value 9.8 is bending stiffness $(N \cdot m^2)$.

In addition, regarding the swing characteristic amount (2) that relates to FIG. 33, it is possible to apply a classification of bending stiffness EI $(N \cdot m^2) < 47.5$ when the swing characteristic amount (2) is not larger than 550 (deg/s), and apply a classification of bending stiffness EI $(N \cdot m^2) > 42.5$ when the swing characteristic amount (b) is larger than 550 (deg/s).

In addition, regarding the swing characteristic amount (1) that relates to FIG. 34, it is possible to apply a classification of bending stiffness EI $(N \cdot m^2) < 68.5$ when the swing characteristic amount (1) is not larger than 360 (deg/s), and apply a classification of bending stiffness EI $(N \cdot m^2) > 60.0$ when the swing characteristic amount (a) is smaller than 360 (deg/s).

Furthermore, when the present inventors divided golfers into two groups according to the level of head speed, and investigated the correlation between swing characteristic amounts and bending stiffness in each of the groups, they discovered that the correlation became higher when each of the group was evaluated separately instead of combining the two groups and evaluating the whole.

Therefore, by taking into consideration the level of head speed, dividing (classification) the ranges of the swing characteristic amounts and bending stiffness as described above can be conducted.

For example, when golfers are divided into two group using a head speed of 45.5 m/s as a standard, dividing of the ranges of the swing characteristic amounts and bending stiffness can be conducted in the following manner.

<Head Speed lower than 45.5 m/s>

With respect to a golfer having a head speed that is lower than 45.5 m/s, it is possible to, for example, apply a classification of bending stiffness EI $(N \cdot m^2) < 24.5$ when the swing characteristic amount (3) is not larger than 500 (deg/s), apply a classification of $23.0 <$ bending stiffness EI $(N \cdot m^2) < 26.5$ when the swing characteristic amount (3) is larger than 500 (deg/s) but not larger than 800 (deg/s), and apply a classification of $25.5 <$ bending stiffness EI $(N \cdot m^2) < 28.5$ when the swing characteristic amount (3) is larger than 800 (deg/s).

Furthermore, it is possible to apply a classification of bending stiffness EI $(N \cdot m^2) < 45.0$ when the swing characteristic amount (2) is not larger than 550 (deg/s), and apply a classification of $42.5 <$ bending stiffness EI $(N \cdot m^2) < 52.0$ when the swing characteristic amount (2) is larger than 550 (deg/s).

In addition, it is possible to apply a classification of bending stiffness EI $(N \cdot m^2) < 60.0$ when the swing characteristic amount (1) is not larger than 350 (deg/s), and apply a classification of bending stiffness EI $(N \cdot m^2) > 55.5$ when the swing characteristic amount (1) is larger than 350 (deg/s).

<Head Speed not Lower than 45.5 m/s>

With respect to a golfer having a head speed not lower than 45.5 m/s, it is possible to, for example, apply a classification of bending stiffness EI $(N \cdot m^2) < 24.5$ when the swing characteristic amount (3) is not larger than 300 (deg/s), apply a classification of $23.0 <$ bending stiffness EI $(N \cdot m^2) < 26.5$ when the swing characteristic amount (3) is larger than 300 (deg/s) but not larger than 550 (deg/s), apply a classification of $24.0 <$ bending stiffness EI $(N \cdot m^2) < 28.5$ when the swing characteristic amount (3) is larger than 550 (deg/s) but not larger than 800 (deg/s), and apply a classification of $26.0 <$ bending stiffness EI $(N \cdot m^2)$ when the swing characteristic amount (3) is larger than 800 (deg/s).

Furthermore, it is possible to apply a classification of $40.0 <$ bending stiffness EI $(N \cdot m^2) < 50.0$ when the swing characteristic amount (2) is not larger than 550 (deg/s), and apply a classification of $42.5 <$ bending stiffness EI $(N \cdot m^2)$ when the swing characteristic amount (2) is larger than 550 (deg/s).

Furthermore, it is possible to apply a classification of $51.0 <$ bending stiffness EI $(N \cdot m^2) < 73.0$ when the swing characteristic amount (1) is not larger than 360 (deg/s), and apply a classification of bending stiffness EI $(N \cdot m^2) > 64.0$ when the swing characteristic amount (1) is larger than 360 (deg/s).

[Calculation of IFC in Every Inch]

With respect to the range of EI value of the shaft selected in every inch using the method described above, a corresponding range among the 10-scale IFC is selected using, for example, a conversion table shown in Tables 10 to 12. As described above, in the present embodiment, a method of sorting shafts into 10 scales within a range of shafts intended to be provided to a user by a fitter while taking into consideration frequency of usage etc., is employed.

For example, when the swing characteristic amount (1) is 450 (deg/s), and when, from this value, a classification of bending stiffness at 36 inches being larger than 60 $(N \cdot m^2)$ is applied, the IFC corresponding to the bending stiffness of this range can be selected from Table 10 as "4" or larger since $60/9.8 \approx 6.12$. Similarly, when the swing characteristic amount (1) is 300 (deg/s), and when, from this value, a classification of bending stiffness at 36 inches being smaller than 68.5 $(N \cdot m^2)$ is applied, the IFC corresponding to the bending stiffness of this range can be selected from Table 10 as "6" or smaller since $68.5/9.8 \approx 6.99$.

[Shaft Selection]

In the manner described above, IFC in every inch is calculated for a golfer to whom a fitting is performed.

Examples of ranges of calculated IFC may include 36 inches: 5 to 9, 26 inches: 0 to 6, and 6 inches: 1 to 7.

Then, a shaft that matches the most with the calculation result is selected from a database. The database has stored therein data of multiple types of shafts regarding weight, IFC measured in advance in every inch, etc. As described later, when multiple shafts are selected, "coincidence rate" indicated by expression (3) is calculated, and a club whose value therefrom is the smallest is suggested to the golfer. It should be noted that "coincidence rate" in the present specification does not mean the degree of coincidence but indicates an index whose value is small when a shaft has a bending stiffness that is close to a calculation result, as obvious from expression (3). A coincidence rate of zero means a shaft has bending stiffness that is identical to a calculation result in every inch.

When there are multiple shafts whose coincidence rates are small to the same degree, multiple shafts may be suggested to the user, or they may be narrowed down to a single shaft after taking into consideration a request of the user. As the standard for narrowing down to a single shaft, there are methods such as a method of placing greater value on ease of swinging by prioritizing a coincidence rate of IFC at "36 inches" or "26 inches" on the shaft hand side, and a method of placing greater value on performance (flight distance, directionality) by prioritizing a coincidence rate of IFC at "6 inches" on the shaft front end side.

Furthermore, in the present embodiment, when performing the selecting based on "coincidence rate" described above, an interview is conducted beforehand with the golfer to whom a fitting is performed with regard to the weight of his/her own club. Among the multiple shafts that are stored in the database, fitting is performed based on the result of the interview, using shafts having a weight within a range of plus and minus 5 g of the weight of the golfer's own club. If the weight of a golf club having a selected shaft is largely different from the weight of his/her own club that is ordinarily used, there is a possibility of the golfer not being able to exert his/her full performance due to swinging being difficult because of difficulty in adjusting the timing. In order to prevent this with certainty, it is preferable to perform the fitting using shafts having a weight within a range of plus and minus 5 g of the weight of the golfer's own club.

Figure 35:
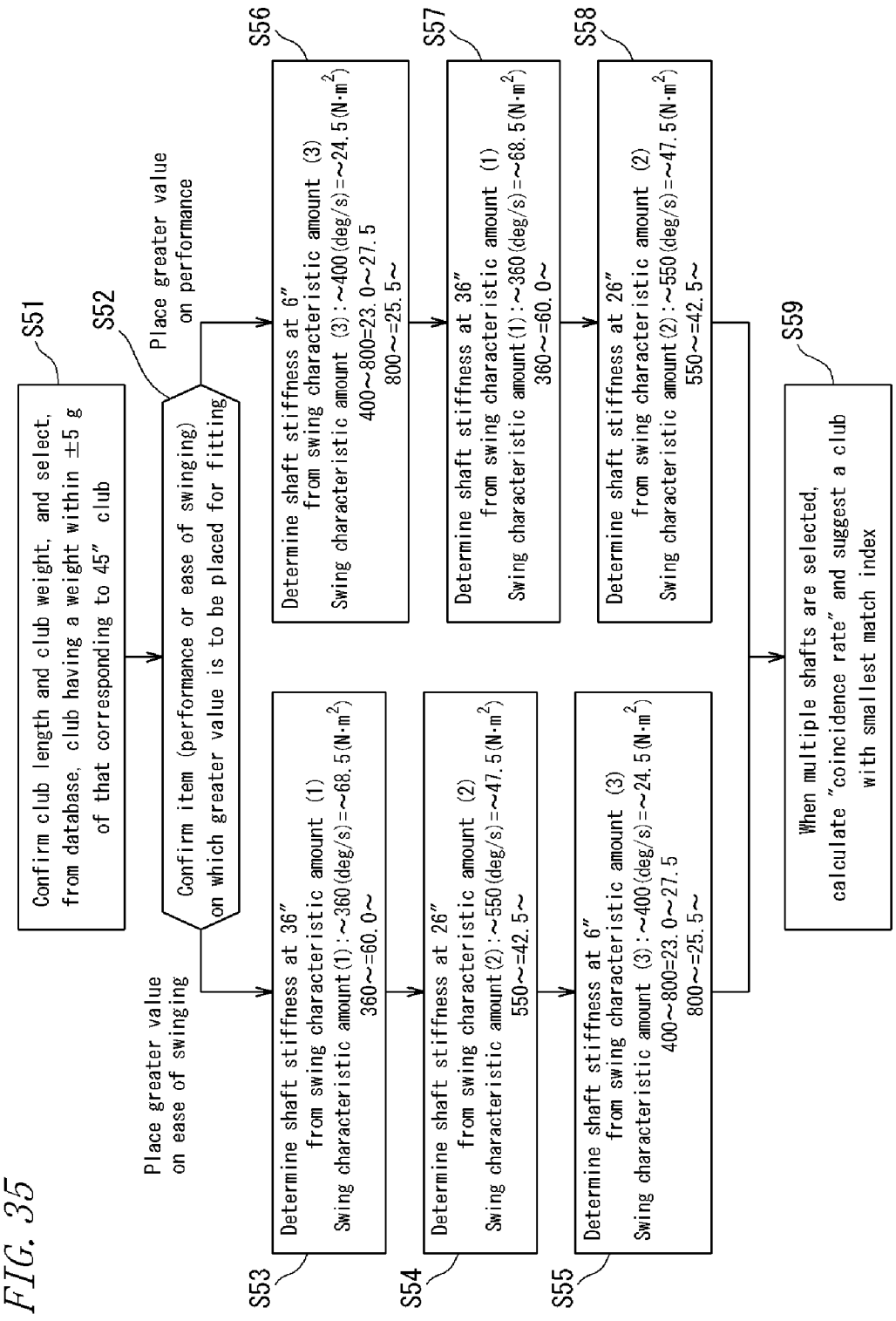
FIG. 35 is a flowchart showing one example of a shaft selection process.

In the following, specific examples of the selection method will be described with reference to flowcharts. FIG. 35 is a flowchart showing one example of a shaft selection process. In this example, a flow for selection is different depending on, when performing a fitting, whether a golfer places greater value on performance (flight distance, directionality) or on ease of swinging. A priority order is set to the swing characteristic amounts (1) to (3) obtained from test-hitting, and selection of a shaft is performed in accordance with the priority order. This selection method is particularly effective when a shaft conforming to all the bending-stiffness ranges of the shaft acquired from each of the swing characteristic amounts does not exist in the multiple shafts whose bending stiffnesses are measured in advance at the three positions corresponding to the three swing characteristic amounts.

First, at step S51, the length and weight of a club ordinarily used by the golfer to whom a fitting is performed are confirmed. As described above, for the purpose of preventing a golfer from not being able to exert his/her full performance, the fitting is performed using shafts having a weight within a range of plus and minus 5 g of the weight of the golfer's own club. Furthermore, for the purpose of improving accuracy of fitting, if a length of a user's own club is different from a length of a golf club based on a shaft stored in a database, a shaft matching the user is selected by changing a club total weight to a weight corresponding to the length of the club prepared in the database. For example, if the length of the club stored in a database is 45 inches, and length A (mm) of the club of the user is different from 45 inches (=1143 mm), the total weight of the club used for measuring a swing is changed to a weight (total weight corresponding to 45 inches) calculated from the following expression to perform the fitting.

(Total Weight of Club used for Measurement)=(A−1143)×0.377+(Club Total Weight of the User's Own Club)

Next, at step S52, it is confirmed with the golfer whether greater value is to be placed on performance or ease of swinging in the fitting. When the golfer places greater value on ease of swinging, the flow advances to step S53. On the other hand, when the golfer places greater value on performance, the flow advances to step S56.

At step S53, the bending stiffness EI ($N \cdot m^2$) at the part 36 inches from the tip end of the shaft is determined from the swing characteristic amount (1). A classification of bending stiffness EI ($N \cdot m^2$)<68.5 is applied when the swing characteristic amount (1) is not larger than 360 (deg/s), and a classification of bending stiffness EI ($N \cdot m^2$)>60.0 is applied when the swing characteristic amount (1) is larger than 360 (deg/s). Next, a range of the value of IFC corresponding to the range of the classified bending stiffness is selected in accordance with Table 10. Subsequently, narrowing down to shafts in the selected range of IFC is conducted. When it is narrowed down to a single shaft as a result of the selection at step S51 and classification and narrowing down at step S53, the fitting ends here at step S53 because the fitting has failed, and a fitting is performed again after conditions are examined and changed. It should be noted that, also in the following steps S54 to S58, in a manner similar to step S53, a range of the value of IFC corresponding to the range of the classified bending stiffness is selected in accordance with Tables 10 to 12. Subsequently, it is narrowed down to shafts in the selected range of IFC.

At step S54, the bending stiffness EI ($N \cdot m^2$) at the part 26 inches from the tip end of the shaft is determined from the swing characteristic amount (2). A classification of bending stiffness EI ($N \cdot m^2$)<47.5 is applied when the swing characteristic amount (2) is not larger than 550 (deg/s), and a classification of bending stiffness EI ($N \cdot m^2$)>42.5 is applied when the swing characteristic amount (2) is larger than 550 (deg/s). When it is narrowed down to a single shaft as a result of the selection at step S51 and classification at steps S53 and S54, the fitting ends here at step S54.

At step S55, the bending stiffness EI ($N \cdot m^2$) at the part 6 inches from the tip end of the shaft is determined from the swing characteristic amount (3). A classification of bending stiffness EI ($N \cdot m^2$)<24.5 is applied when the swing characteristic amount (3) is not larger than 400 (deg/s); a classification of 23.0<bending stiffness EI ($N \cdot m^2$)<27.5 is applied when the swing characteristic amount (3) is larger than 400 (deg/s) but not larger than 800 (deg/s); and a classification of bending stiffness EI ($N \cdot m^2$)>25.5 is applied when the swing characteristic amount (3) is larger than 800 (deg/s).

On the other hand, at step S56 where greater value is placed on performance, unlike the case where greater value is placed on ease of swinging, first, the bending stiffness EI ($N \cdot m^2$) at the part 6 inches from the tip end of the shaft is determined from the swing characteristic amount (3). A classification of bending stiffness EI ($N \cdot m^2$)<24.5 is applied when the swing characteristic amount (3) is not larger than 400 (deg/s); a classification of 23.0<bending stiffness EI (N·m$^2$)<27.5 is applied when the swing characteristic amount (3) is larger than 400 (deg/s) but not larger than 800 (deg/s); and a classification of bending stiffness EI (N·m$^2$)>25.5 is applied when the swing characteristic amount (3) is larger than 800 (deg/s). When it is narrowed down to a single shaft as a result of the selection at step S51 and classification and narrowing down at step S56, the fitting ends here at step S56 because the fitting has failed, and a fitting is performed again after conditions are examined and changed.

At step S57, the bending stiffness EI (N·m$^2$) at the part 36 inches from the tip end of the shaft is determined from the swing characteristic amount (1). A classification of bending stiffness EI (N·m$^2$)<68.5 is applied when the swing characteristic amount (1) is not larger than 360 (deg/s), and a classification of bending stiffness EI (N·m$^2$)>60.0 is applied when the swing characteristic amount (1) is larger than 360 (deg/s). When it is narrowed down to a single shaft as a result of the selection at step S51 and classification at steps S56 and S57, the fitting ends here at step S57.

At step S58, the bending stiffness EI (N·m$^2$) at the part 26 inches from the tip end of the shaft is determined from the swing characteristic amount (2). A classification of bending stiffness EI (N·m$^2$)<47.5 is applied when the swing characteristic amount (2) is not larger than 550 (deg/s), and a classification of bending stiffness EI (N·m$^2$)>42.5 is applied when the swing characteristic amount (2) is larger than 550 (deg/s).

When multiple shafts are selected through step S55 or step S58, "coincidence rate" is calculated in accordance with the above described expression (3), and a shaft having the smallest coincidence rate is selected. In this case, the IFCs selected in steps S53 to S58 range from a certain value to a certain value. Therefore, a median of this range may be used to calculate the coincidence rate in accordance with expression (3).

Figure 36:
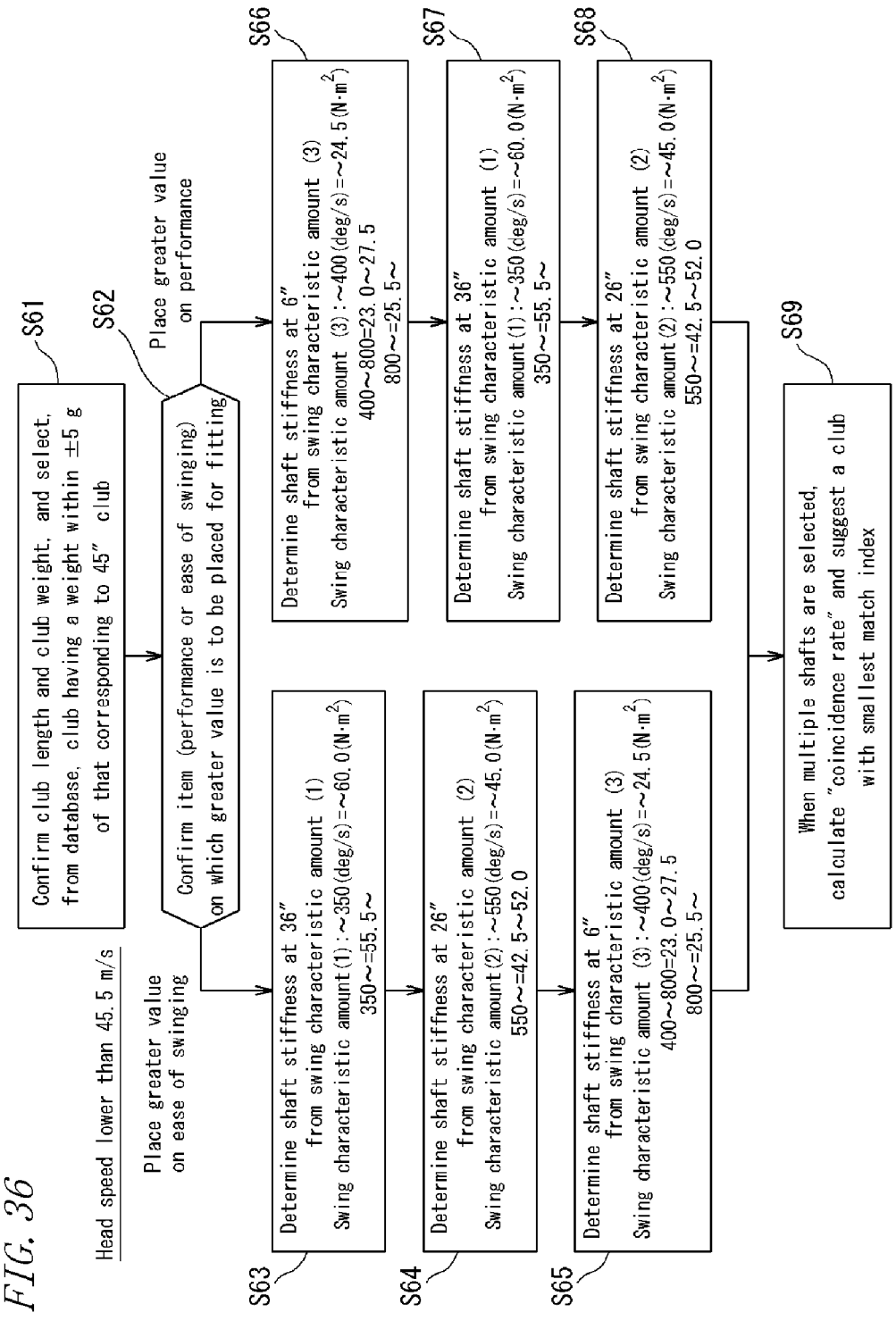
FIG. 36 is a flowchart showing one example of the shaft selection process when head speed is low.

FIG. 36 is a flowchart showing one example of the shaft selection process when the head speed is low (lower than 45.5 m/s).

First, at step S61, similar to the selection process at step S51 shown in FIG. 35 described above, the length and weight of a club ordinarily used by the golfer to whom a fitting is performed are confirmed. Then, fitting is performed from among shafts whose club weights are within a range of plus and minus 5 g of a weight equivalent to 45 inches of length.

Next, at step S62, it is confirmed with the golfer whether greater value is to be placed on performance or ease of swinging in the fitting. When the golfer places greater value on ease of swinging, the flow advances to step S63. On the other hand, when the golfer places greater value on performance, the flow advances to step S66.

At step S63, the bending stiffness EI (N·m$^2$) at the part 36 inches from the tip end of the shaft is determined from the swing characteristic amount (1). A classification of bending stiffness EI (N·m$^2$)<60.0 is applied when the swing characteristic amount (1) is not larger than 350 (deg/s), and a classification of bending stiffness EI (N·m$^2$)>55.5 is applied when the swing characteristic amount (1) is larger than 350 (deg/s). Next, a range of the value of IFC corresponding to the range of the classified bending stiffness is selected in accordance with Table 10. Subsequently, it is narrowed down to shafts in the selected range of IFC. When it is narrowed down to a single shaft as a result of the selection at step S61 and classification and narrowing down at step S63, the fitting ends here at step S63 because the fitting has failed, and a fitting is performed again after conditions are examined and changed. It should be noted that, also in the following steps S64 to S68, in a manner similar to step S63, a range of the value of IFC corresponding to the range of the classified bending stiffness is selected in accordance with Tables 10 to 12. Subsequently, it is narrowed down to shafts in the selected range of IFC.

At step S64, the bending stiffness EI (N·m$^2$) at the part 26 inches from the tip end of the shaft is determined from the swing characteristic amount (2). A classification of bending stiffness EI (N·m$^2$)<45.0 is applied when the swing characteristic amount (2) is not larger than 550 (deg/s), and a classification of 42.5<bending stiffness EI (N·m$^2$)<52.0 is applied when the swing characteristic amount (2) is larger than 550 (deg/s). When it is narrowed down to a single shaft as a result of the selection at step S61 and classification at steps S63 and S64, the fitting ends here at step S64.

At step S65, the bending stiffness EI (N·m$^2$) at the part 6 inches from the tip end of the shaft is determined from the swing characteristic amount (3). A classification of bending stiffness EI (N·m$^2$)<24.5 is applied when the swing characteristic amount (3) is not larger than 500 (deg/s); a classification of 23.0<bending stiffness EI (N·m$^2$)<26.5 is applied when the swing characteristic amount (3) is larger than 500 (deg/s) but not larger than 800 (deg/s); and a classification of 25.5<bending stiffness EI (N·m$^2$) is applied when the swing characteristic amount (3) is larger than 800 (deg/s).

On the other hand, at step S66 where greater value is placed on performance, unlike the case where greater value is placed on ease of swinging, first, the bending stiffness EI (N·m$^2$) at the part 6 inches from the tip end of the shaft is determined from the swing characteristic amount (3). A classification of bending stiffness EI (N·m$^2$)<24.5 is applied when the swing characteristic amount (3) is not larger than 500 (deg/s); a classification of 23.0<bending stiffness EI (N·m$^2$)<26.5 is applied when the swing characteristic amount (3) is larger than 500 (deg/s) but not larger than 800 (deg/s); and a classification of 25.5<bending stiffness EI (N·m$^2$) is applied when the swing characteristic amount (3) is larger than 800 (deg/s). When it is narrowed down to a single shaft as a result of the selection at step S61 and classification and narrowing down at step S66, the fitting ends here at step S66 because the fitting has failed, and a fitting is performed again after conditions are examined and changed.

At step S67, the bending stiffness EI (N·m$^2$) at the part 36 inches from the tip end of the shaft is determined from the swing characteristic amount (1). A classification of bending stiffness EI (N·m$^2$)<60.0 is applied when the swing characteristic amount (1) is not larger than 350 (deg/s), and a classification of bending stiffness EI (N·m$^2$)>55.5 is applied when the swing characteristic amount (1) is larger than 350 (deg/s). When it is narrowed down to a single shaft as a result of the selection at step S61 and classification at steps S66 and S67, the fitting ends here at step S67.

At step S68, the bending stiffness EI (N·m$^2$) at the part 26 inches from the tip end of the shaft is determined from the swing characteristic amount (2). A classification of bending stiffness EI (N·m$^2$)<45.0 is applied when the swing characteristic amount (2) is not larger than 550 (deg/s), and a classification of 42.5<bending stiffness EI (N·m$^2$)<52.0 is applied when the swing characteristic amount (2) is larger than 550 (deg/s).

When multiple shafts are selected through step S65 or step S68, "coincidence rate" is calculated in accordance with the above described expression (3), and a shaft having the smallest coincidence rate is selected. In this case, the IFCs selected in steps S63 to S68 range from a certain value to a certain value. Therefore, a median of this range may be used to calculate the coincidence rate in accordance with expression (3).

FIG. 37 is a flowchart showing one example of the shaft selection process when the head speed is high (not lower than 45.5 m/s).

First, at step S71, similar to the selection process at step S51 shown in FIG. 35 described above, the length and weight of a club ordinarily used by the golfer to whom a fitting is performed are confirmed. Then, fitting is performed from among shafts whose club weights are within a range of plus and minus 5 g of a weight equivalent to 45 inches of length.

Next, at step S72, it is confirmed with the golfer whether greater value is to be placed on performance or ease of swinging in the fitting. When the golfer places greater value on ease of swinging, the flow advances to step S73. On the other hand, when the golfer places greater value on performance, the flow advances to step S76.

At step S73, the bending stiffness EI (N·m$^2$) at the part 36 inches from the tip end of the shaft is determined from the swing characteristic amount (1). A classification of 51.0<bending stiffness EI (N·m$^2$)<73.0 is applied when the swing characteristic amount (1) is not larger than 360 (deg/s), and a classification of bending stiffness EI (N·m$^2$)>64.0 is applied when the swing characteristic amount (1) is larger than 360 (deg/s). Next, a range of the value of IFC corresponding to the range of the classified bending stiffness is selected in accordance with Table 10. Subsequently, it is narrowed down to shafts in the selected range of IFC. When it is narrowed down to a single shaft as a result of the selection at step S71 and classification and narrowing down at step S73, the fitting ends here at step S73 because the fitting has failed, and a fitting is performed again after conditions are examined and changed. It should be noted that, also in the following steps S74 to S78, in a manner similar to step S73, a range of the value of IFC corresponding to the range of the classified bending stiffness is selected in accordance with Tables 10 to 12. Subsequently, it is narrowed down to shafts in the selected range of IFC.

At step S74, the bending stiffness EI (N·m$^2$) at the part 26 inches from the tip end of the shaft is determined from the swing characteristic amount (2). A classification of 40.0<bending stiffness EI (N·m$^2$)<50.0 is applied when the swing characteristic amount (2) is not larger than 550 (deg/s), and a classification of 42.5<bending stiffness EI (N·m$^2$) is applied when the swing characteristic amount (2) is larger than 550 (deg/s). When it is narrowed down to a single shaft as a result of the selection at step S71 and classification at steps S73 and S74, the fitting ends here at step S74.

At step S75, the bending stiffness EI (N·m$^2$) at the part 6 inches from the tip end of the shaft is determined from the swing characteristic amount (3). A classification of bending stiffness EI (N·m$^2$)<24.5 is applied when the swing characteristic amount (3) is not larger than 300 (deg/s); a classification of 23.0<bending stiffness EI (N·m$^2$)<26.5 is applied when the swing characteristic amount (3) is larger than 300 (deg/s) but not larger than 550 (deg/s); a classification of 24.0<bending stiffness EI (N·m$^2$)<28.5 is applied when the swing characteristic amount (3) is larger than 550 (deg/s) but not larger than 800 (deg/s); and a classification of 26.0<bending stiffness EI (N·m$^2$) is applied when the swing characteristic amount (3) is larger than 800 (deg/s).

On the other hand, at step S76 where greater value is placed on performance, unlike the case where greater value is placed on ease of swinging, first, the bending stiffness EI (N·m$^2$) at the part 6 inches from the tip end of the shaft is determined from the swing characteristic amount (3). A classification of bending stiffness EI (N·m$^2$)<24.5 is applied when the swing characteristic amount (3) is not larger than 300 (deg/s); a classification of 23.0<bending stiffness EI (N·m$^2$)<26.5 is applied when the swing characteristic amount (3) is larger than 300 (deg/s) but not larger than 550 (deg/s); a classification of 24.0<bending stiffness EI (N·m$^2$)<28.5 is applied when the swing characteristic amount (3) is larger than 550 (deg/s) but not larger than 800 (deg/s); and a classification of 26.0<bending stiffness EI (N·m$^2$) is applied when the swing characteristic amount (3) is larger than 800 (deg/s). When it is narrowed down to a single shaft as a result of the selection at step S71 and classification and narrowing down at step S76, the fitting ends here at step S76 because the fitting has failed, and a fitting is performed again after conditions are examined and changed.

At step S77, the bending stiffness EI (N·m$^2$) at the part 36 inches from the tip end of the shaft is determined from the swing characteristic amount (1). A classification of 51.0<bending stiffness EI (N·m$^2$)<73.0 is applied when the swing characteristic amount (1) is not larger than 360 (deg/s), and a classification of bending stiffness EI (N·m$^2$)>64.0 is applied when the swing characteristic amount (1) is larger than 360 (deg/s). When it is narrowed down to a single shaft as a result of the selection at step S71 and classification at steps S76 and S77, the fitting ends here at step S77.

At step S78, the bending stiffness EI (N·m$^2$) at the part 26 inches from the tip end of the shaft is determined from the swing characteristic amount (2). A classification of 40.0<bending stiffness EI (N·m$^2$)<50.0 is applied when the swing characteristic amount (2) is not larger than 550 (deg/s), and a classification of bending stiffness EI (N·m$^2$)>42.5 is applied when the swing characteristic amount (2) is larger than 550 (deg/s).

When multiple shafts are selected through step S75 or step S78, "coincidence rate" is calculated in accordance with the above described expression (3), and a shaft having the smallest coincidence rate is selected. In this case, the IFCs selected in steps S73 to S78 range from a certain value to a certain value. Therefore, a median of this range may be used to calculate the coincidence rate in accordance with expression (3).

[Verification Result]

A shaft-exchangeable golf club whose shaft can be freely exchanged was manufactured, and verification of the effectiveness of the fitting method according to the present embodiment was conducted using this golf club.

An experiment was conducted using, as subjects, testers who use an S or X shaft and who have skills equivalent to a single digit handicap player. The number of the testers was 17, and their head speeds were about 41 to 51 m/s.

First, a tester was asked to test-hit a ball using a golf club having a sensor attached on a grip thereof to measure swing characteristic amounts of the tester, and a single shaft having a bending stiffness matching the tester was determined from a database using the swing characteristic amounts. In this database, data of 59 shafts whose IFCs are calculated in advance in every inch are stored.

Next, the tester was asked to test-hit using, from among the 59 shafts, five shafts that have different shaft properties (flex, kick point) and whose weights are within plus and minus 5 g of the tester's own club. As shown in FIG. 29 described above, the five shafts had properties regarding flex (hardness) and kick point of: hard and low kick point; hard and middle kick point; moderate hardness and middle kick point; soft and middle kick point; and soft and high kick point. Shafts having such five patterns of properties were prepared in different weight levels.

Evaluation standards were set as, as a result of the test-hit: if there is one club that has large flight distance, capable of obtaining a ball course that does not curve, and is easy to swing among the five clubs, whether or not a shaft whose shaft properties are close to those of the one club has been selected; or if there are two or more such clubs, whether or not the selected shaft is contained in or in the vicinity of an ellipse (cf. shaded area in FIG. 29) including those shafts.

Figure 38A:
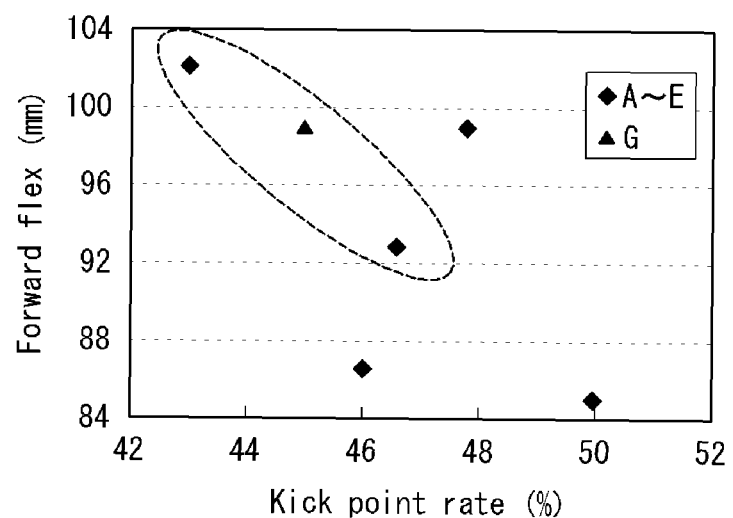
FIG. 38A shows one example of verification results.
Figure 38B:
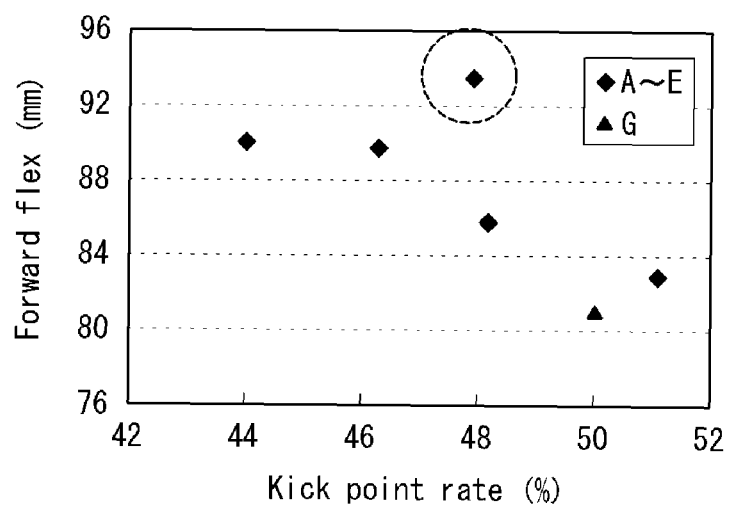
FIG. 38B shows one example of verification results.

FIGS. 38A and 38B show one example of the verification result, FIG. 38A shows the selected club G being included in an area enclosed by the short dashed line, and fitting being performed properly, and FIG. 38B shows the selected club being outside of an area enclosed by the short dashed line, and fitting not being performed properly.

For each of the 17 testers, it was determined as a "correct answer" when the fitted club was included in the ellipse. The result was that 15 out of the 17 testers confirmed that fitting was performed correctly. The correct answer rate was (15/17)×100≈88%. Then, it was confirmed with the 15 testers to whom the method was effective (who obtained a correct answer) how effective the method was regarding flight distance, directionality, and ease of swinging. As averages of the 15 testers, it was confirmed that flight distance increased by 5.1 yards, directionality improved where a shift of 7.4 yards toward the center was observed, and ease of swinging improved by 1.7 points. It should be noted that evaluation of ease of swinging is based on a 9-scale evaluation ("5" as being neither easy nor difficult) shown in FIG. 12 described above.

Third Embodiment

Fitting Apparatus

First, a fitting apparatus capable of using the fitting method according to the present embodiment will be described.

Figure 39:
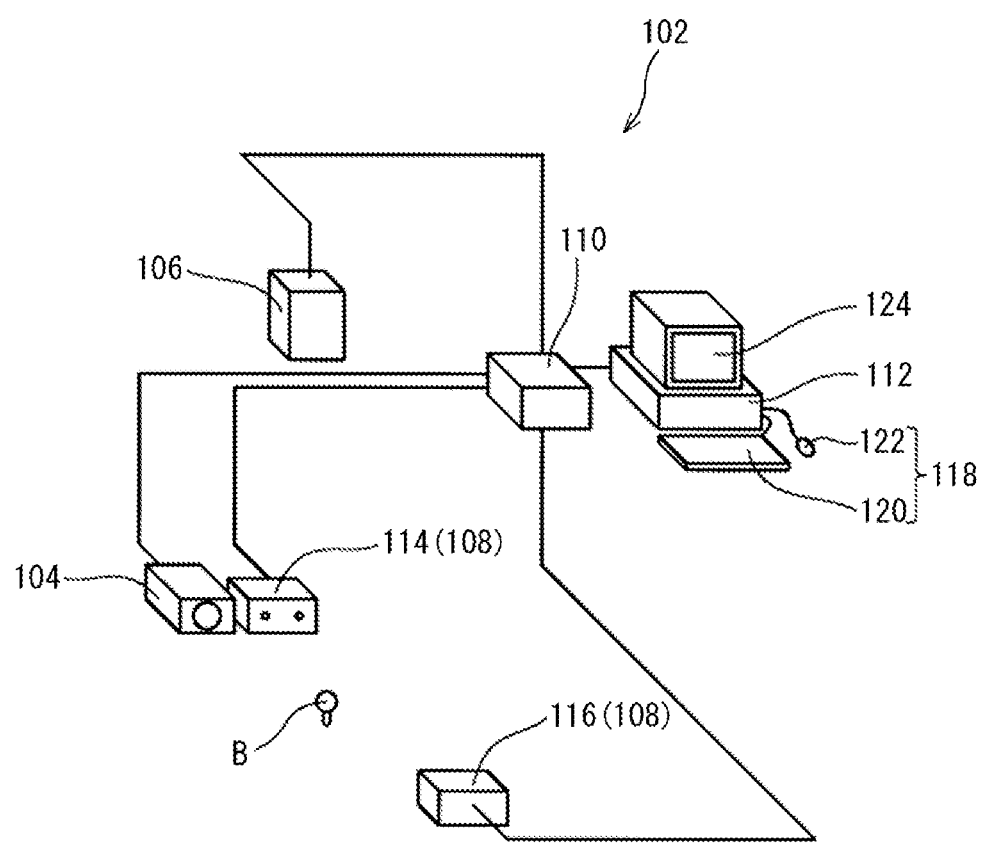
FIG. 39 is an illustrative diagram of one example of a fitting apparatus capable of executing a fitting method according to a third embodiment of the present invention.

FIG. 39 is an illustrative diagram of a fitting apparatus 102 used for the fitting method of the present invention. The fitting apparatus 102 is a fitting apparatus for right-handed golfers, and includes: a front camera 104 and an upper camera 106 as image capturing sections; a first sensor 108 including a light emitter 114 and a light receiver 116; a control device 110; and an information processing device 112 as a computation section.

The front camera 104 is located in the front of a golfer who is to perform a swing, and is arranged in a direction and position allowing capturing of a swing image from the front of the golfer. On the other hand, the upper camera 106 is located above a position where a ball B is placed, and is arranged in a direction and position allowing capturing of a swing image from above the golfer. Examples of the front camera 104 and the upper camera 106 include CCD cameras. The front camera 104 and the upper camera 106 are merely illustrative examples, and it is possible to use a camera capable of capturing an image from the front, back, or a diagonal direction of the golfer instead of or in addition to the cameras 104 and 106. Furthermore, although two cameras (the front camera 104 and the upper camera 106) are used for the fitting apparatus 102 shown in FIG. 39, the fitting method according to the present embodiment can also be realized by using a fitting apparatus having only a single camera (the upper camera 106).

The light emitter 114 of the first sensor 108 is located in the front of the golfer who is to perform a swing, and the light receiver 116 is located at the golfer's feet who is to perform the swing. The light emitter 114 and the light receiver 116 are arranged at positions between which a swung golf club passes. The first sensor 108 detects a head or shaft of the golf club that passes. As long as the first sensor 108 is located at a position enabling detection of the head or shaft, the first sensor 108 may be disposed in the front or back of the golfer. The first sensor 108 is not limited to that including the light emitter 114 and the light receiver 116, and may be, for example, other types such as reflective types.

The control device 110 is connected to the front camera 104, the upper camera 106, the first sensor 108, and the information processing device 112. The control device 110 transmits image-capture start signals and image-capture stop signals with respect to the front camera 104 and the upper camera 106, and receives signals of a swing image from the front camera 104 and the upper camera 106. The control device 110 receives detection signals of the head or shaft from the first sensor 108. Then, the control device 110 outputs the received signals of the swing image and the detection signals of the head or shaft to the information processing device 112.

Figure 40:
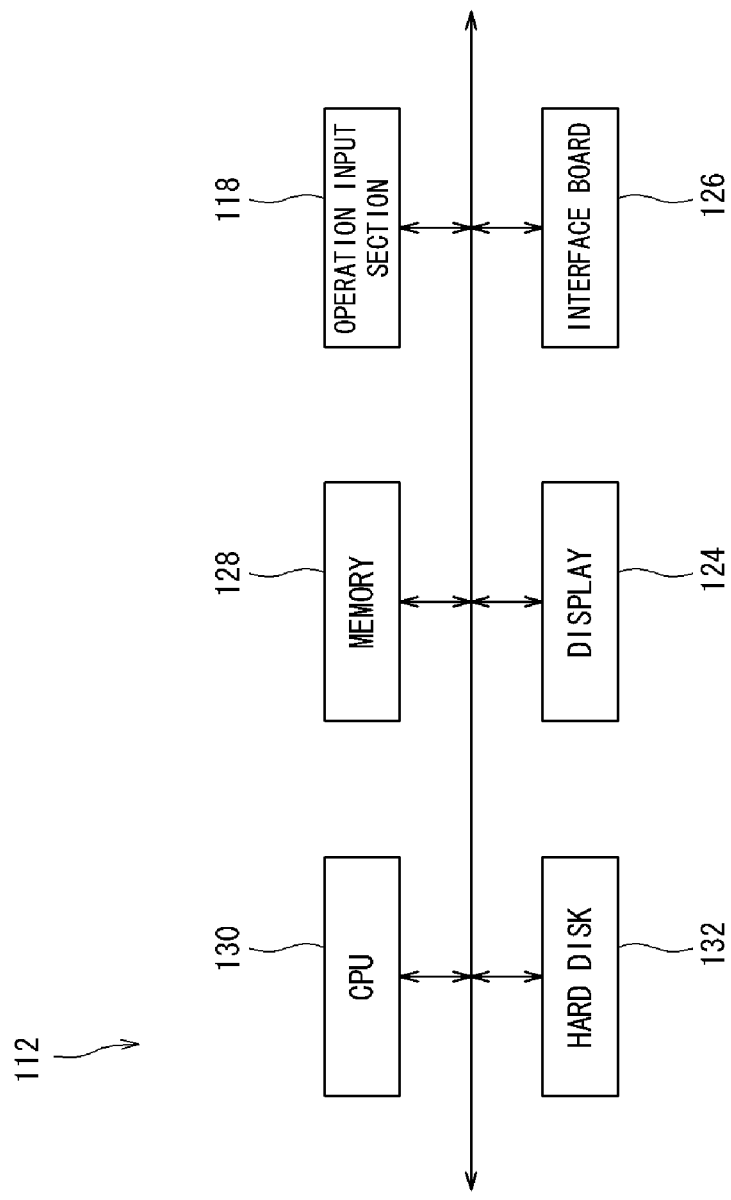
FIG. 40 is an illustrative diagram of a system configuration of an information processing device in the fitting apparatus shown in FIG. 39.

As shown in FIG. 39 and FIG. 40, the information processing device 112 includes: a keyboard 120 and a mouse 122 as an information input section 118; a display 124 as an output section; an interface board 126 as a data input section; a memory 128; a CPU 130; and a hard disk 132. As the information processing device 112, a generic computer may be used as it is.

The display 124 that displays various information is controlled by the CPU 130. As long as the output section is capable of displaying fitting information such as fitted shaft and golf club, measurement data of a swing, and the like; the output section is not limited to the display 124, and may be, for example, a printer.

To the interface board 126, the signals of the swing image, the detection signals of the head or shaft, and the like are inputted. The measurement data is obtained from the signals of an image and the detection signals. The measurement data is outputted to the CPU 130.

The memory 128 is a rewritable memory. The hard disk 132 has stored therein a program, data, and the like. For example, physical property values of multiple shafts are stored therein as a database. Specifically, for example, expressions and data representing a relationship between an index and a hit-ball result for every physical property values are stored in the memory. The memory 128 forms storage area, workspace, etc., for measurement data and the program read-out from the hard disk 132.

The CPU 130 can read out a program stored in the hard disk 132, and load the read-out program onto the workspace of the memory 128. The CPU 130 can execute various processes in accordance with the program.

Figure 41:
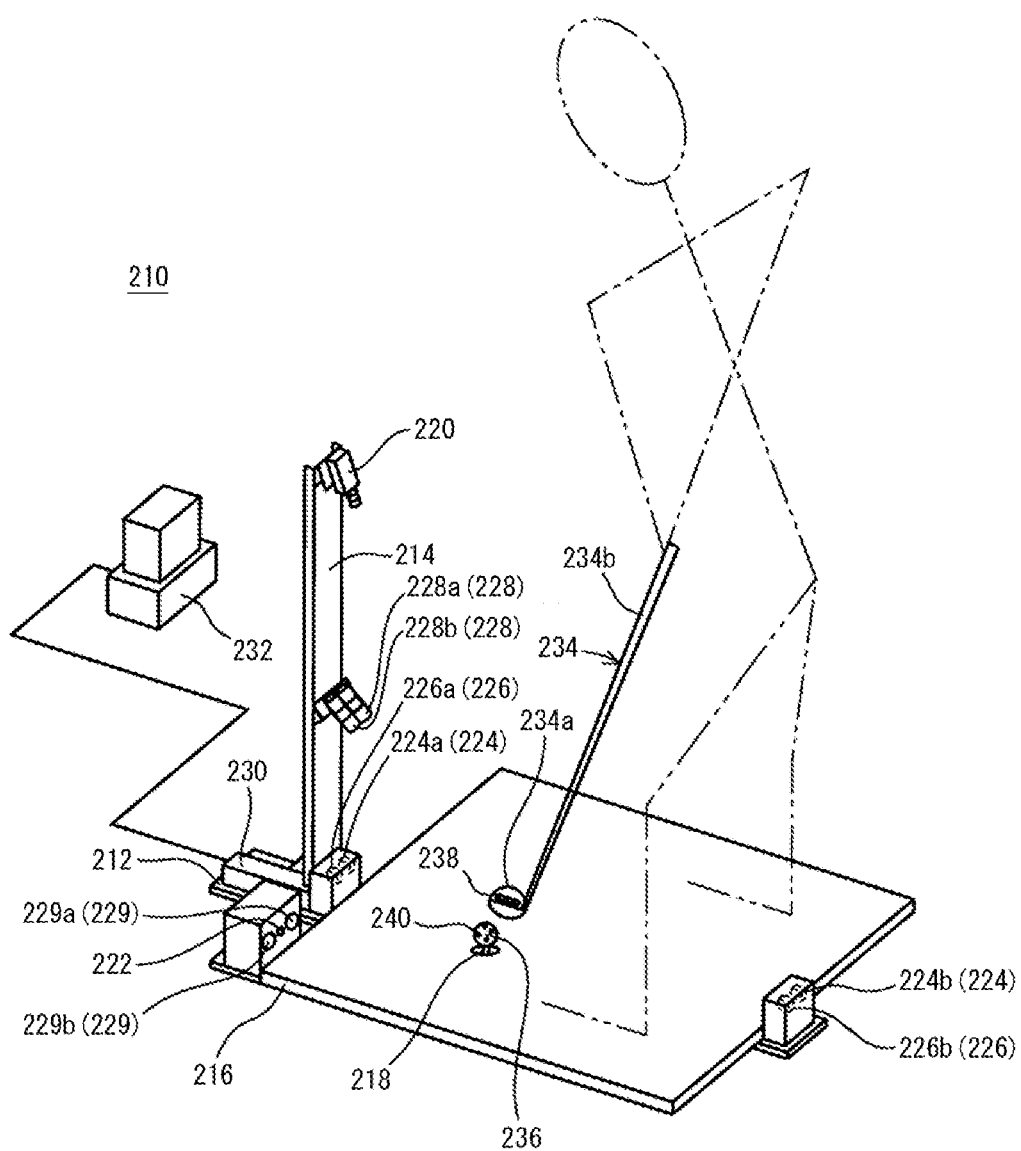
FIG. 41 is an illustrative diagram of another example of a fitting apparatus capable of executing the fitting method according to the third embodiment of the present invention.
Figure 42:
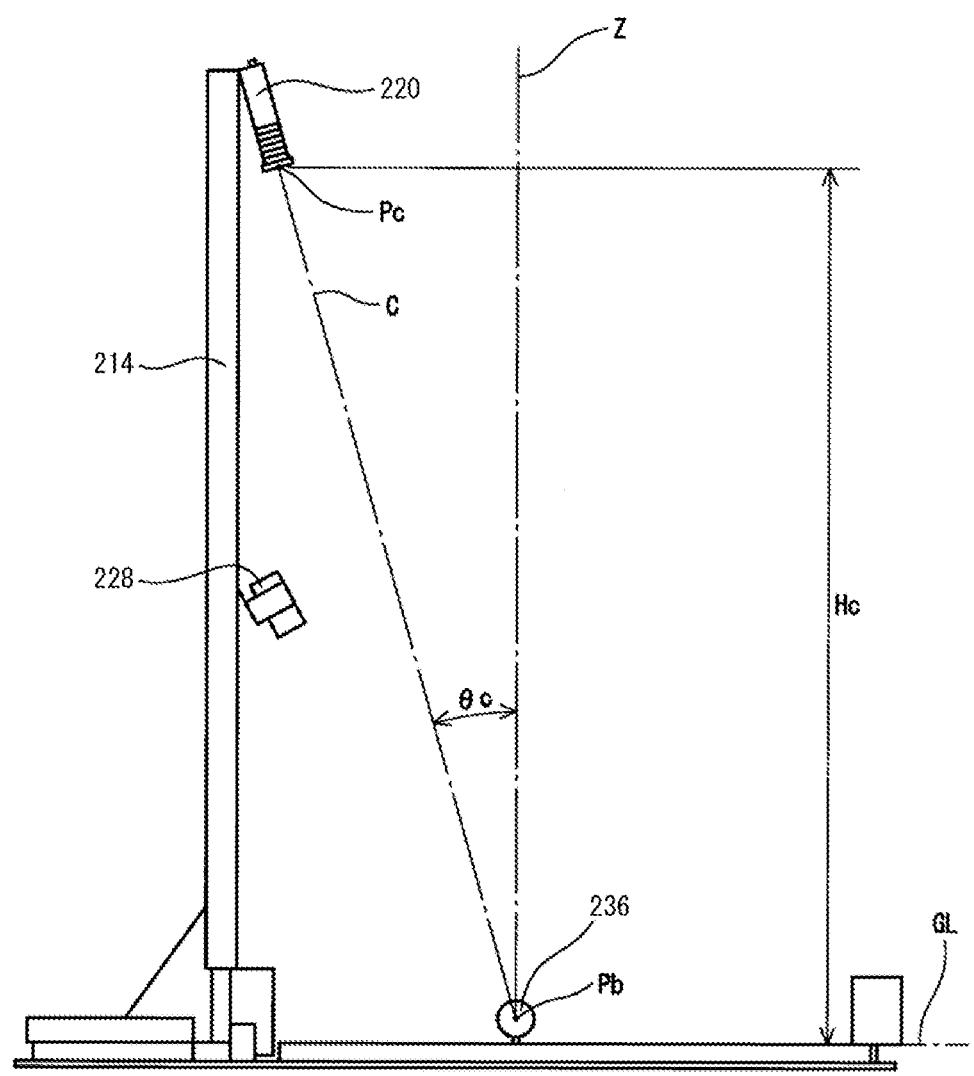
FIG. 42 is a front view of the fitting apparatus shown in FIG. 41.

FIG. 41 is an illustrative diagram of another example of a fitting apparatus capable of executing the fitting method of the present invention, and FIG. 42 is a front view of the fitting apparatus.

A fitting apparatus 210 shown in FIG. 41 includes: a base 212, a support column 214, a floor board 216, a tee 218, a club camera 220, a ball camera 222, a first sensor 224 (224a, 224b), a second sensor 226 (226a, 226b), a strobe light 228 (228a, 228b), a strobe light 229 (229a, 229b), a control device 230, and an information processing device 232.

In FIG. 41, a golf club 234 and a golf ball 236 are also shown in addition to the fitting apparatus 210. The golf club 234 includes a head 234a and a shaft 234b. In FIG. 41, an address posture of a right-handed golf player is shown by long dashed double-short dashed lines. The golf ball 236 will be hit leftward of the player who is assuming this address posture.

The support column 214 and the floor board 216 are positioned and fixed on the base 212. The support column 214 extends upward of the base 212. The tee 218 is positioned and attached to the floor board 216. The club camera 220 is positioned and attached to an upper portion of the support column 214. The ball camera 222 is located in front of the tee 218, and positioned and attached to a lateral surface of the floor board 216. The club camera 220 and the ball camera 222 are arranged toward the golf ball 236 so as to be able to capture an image thereof.

The first sensor 224 includes a light emitter 224a and a light receiver 224b. The light emitter 224a is arranged on one lateral surface of the floor board 216, and the light receiver 224b is arranged on a lateral surface on the other side while having the floor board 216 located therebetween. The light receiver 224b is disposed behind the feet of the golf player. The second sensor 226 includes a light emitter 226a and a light receiver 226b. The light emitter 226a is arranged on one lateral surface of the floor board 216, and the light receiver 224b is arranged on a lateral surface on the other side while having the floor board 216 located therebetween. The light receiver 226b is disposed behind the feet of the player. The first sensor 224 and the second sensor 226 are arranged such that the head 234a or the shaft 234b of the golf club 234 that is swung down crosses between the light emitter 224a and the light receiver 224b, and between the light emitter 226a and the light receiver 226b.

The strobe light 228 (228a, 228b) is attached to a central portion in the vertical direction of a support column 214. The strobe light 228 is disposed below the club camera 220. The control device 230 is attached to the base 212.

A point Pb shown in FIG. 42 indicates a central point of the ball 236. A point Pc indicates a central point of a lens of the club camera 220. A straight line GL shows the ground level where the golf player is standing. A long dashed short dashed line Z shows a perpendicular line in the vertical direction passing through a central point Pb. A long dashed short dashed line C shows a straight line that passes through the central point Pb and the central point Pc. An angle θc shows an intersection angle of the perpendicular line Z and the straight line C. A two-headed arrow Hc shows the height of the central point Pc from the ground level. In this example, the height Hc is 1.1 m and the angle θc is 15°.

Although not diagrammatically illustrated, the control device 230 is connected to the club camera 220, the ball camera 222, the first sensor 224, the second sensor 226, the strobe light 228, the strobe light 229, and the information processing device 232. The control device 230 can transmit image-capture start signals to the club camera 220 and the ball camera 222. The control device 230 can receive captured image signals from the club camera 220 and the ball camera 222. The control device 230 can receive detection signals of the head 234a or the shaft 234b from the sensors 224 and 226. The control device 230 can transmit light emission start signals to the strobe lights 228 and 229.

Although not diagrammatically illustrated, the information processing device 232 includes a monitor as an output section, an interface board as a data input section, a memory, a CPU, and a hard disk. The information processing device 232 may include a keyboard and a mouse. As the information processing device 232, a generic computer may be used as it is.

The hard disk has stored therein a program. The memory is rewritable, and forms a storage area and workspace of various data and program called up from the hard disk. The CPU can read out a program stored in the hard disk. The CPU can load the program onto a workspace of the memory. The CPU can execute various processes in accordance with the program.

To the interface board, club image data, ball image data, and synchronous data of these two types of image data can be inputted. These input data are outputted to the CPU. The CPU performs various processes, and outputs, to a monitor, a club action value, a ball action value, and, among values calculated from these values, data that is predetermined. In addition, the CPU stores predetermined data in the hard disk.

Figure 43:
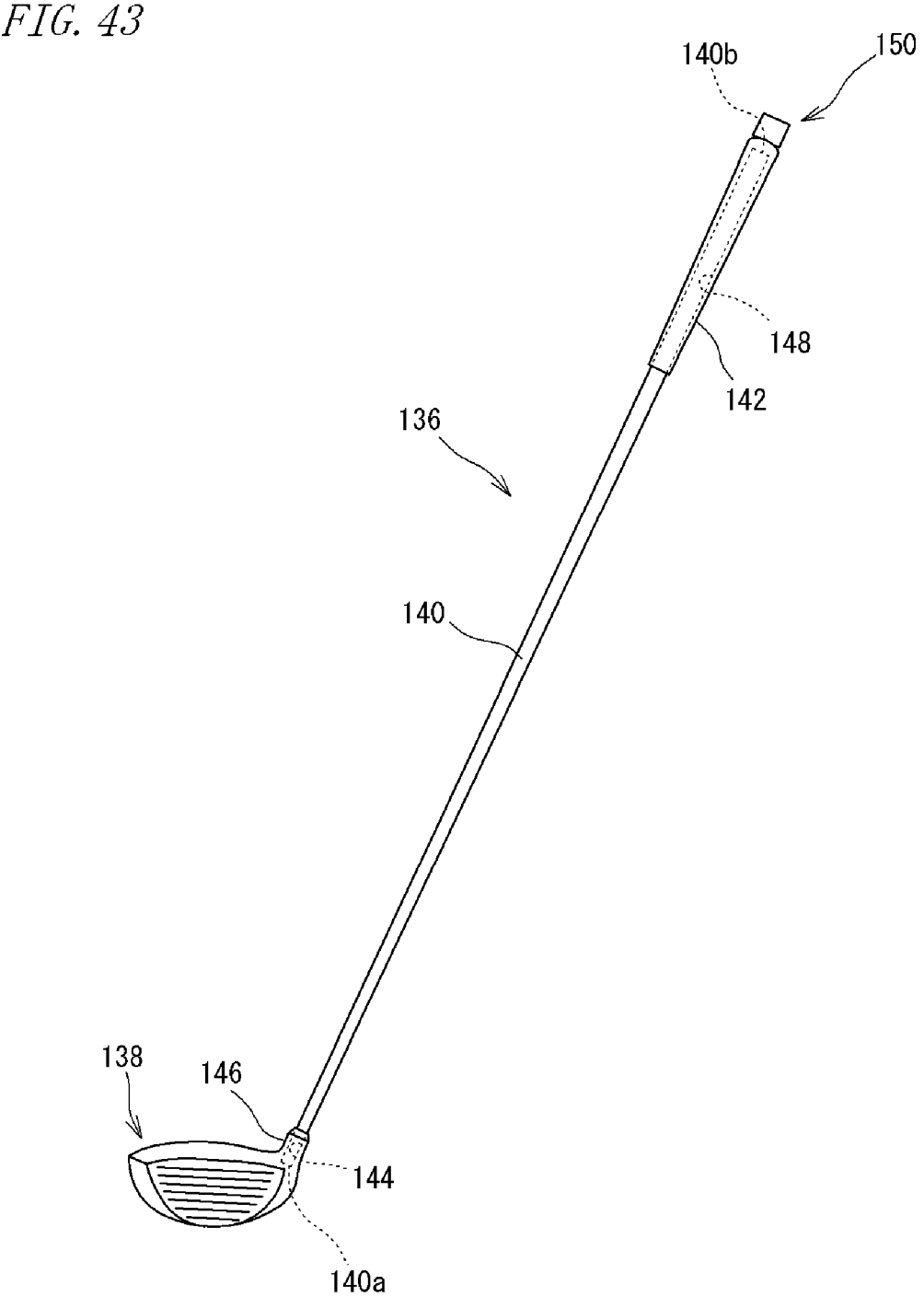
FIG. 43 is an illustrative diagram of one example of a golf club used in the fitting method according to the third embodiment of the present invention.

FIG. 43 shows one example of a golf club used in a fitting apparatus shown in FIG. 39 or FIG. 41. A golf club used in a later described fitting method is referred to as a "test club," and a golf club 136 above is one example of such test club. The golf club 136 includes a wood-type golf club head 138 having a predetermined loft angle, a shaft 140, and a grip 142. The head 138 has a hosel 146 including a shaft hole 144 to which a tip end 140a on the front end side of the shaft 140 is inserted and fixed. A butt end 140b at the back end side of the shaft 140 is inserted and fixed in a grip hole 148 of the grip 142. The tip end 140a is positioned inside the head 138, and the butt end 140b is positioned inside the grip 142. A second sensor 150 used for action analysis of a golf swing is arranged at the grip end edge of the grip 142.

The second sensor 150 is wireless, and measured data are transmitted through wireless communication to a wireless receiver (not shown) built in an information processing device 12 that functions as a data analysis device. For the wireless communication, for example, standards and technologies of Bluetooth (Registered trademark) can be used.

The second sensor 150 has built therein an angular velocity sensor (not shown) capable of measuring angular velocities about three axial directions (x-axial direction, y-axial direction, and z-axial direction). The second sensor 150 further includes an A/D converter, a CPU, a wireless interface, a wireless antenna, and a power supply. As the power supply, for example, a button type lithium ion battery or the like can be used. The battery may be one that is rechargeable. Furthermore, the second sensor 150 may also include a charging circuit for recharging a battery. Examples of the second sensor 150 that can be used include WAA-010 (product name) manufactured by Wireless Technologies Inc.

It should be noted that the wireless receiver for receiving signals from the second sensor 150 includes a wireless antenna, a wireless interface, a CPU, and a network interface.

The second sensor 150 detects angular velocities about respective axes of x axis, y axis, and z axis. These angular velocities are obtained as analog signals, and these analog signals are converted into digital signals by the A/D converter built in the second sensor 150. Output from the A/D converter is transmitted to the CPU and computation processes such as primary filtering are executed. Data processed in the second sensor 150 in this manner is transmitted to the wireless receiver built in the information processing device 12 from the wireless antenna through the wireless interface.

Data transmitted from the second sensor 150 is received by the wireless interface through the wireless antenna on the wireless receiver side. The received data is processed by the CPU 130 of the information processing device 112.

Data sent to the information processing device 112 are stored in a memory resource such as the hard disk 132. The hard disk 132 has stored therein a program, data, and the like required for data processing etc. The program causes the CPU 130 to execute required data processing. The CPU 130 is capable of executing various computation processes, and a computed result is outputted to the display 124, a printer that is not shown, or the like.

When attaching the second sensor 150 to the grip end, the relationships between measurement axes and the golf club 136 are taken into consideration. In the present embodiment, the z axis of the second sensor 150 matches the shaft axis of the golf club 136. The x axis of the second sensor 150 is orientated so as to follow along a toe-heel direction of the head 138 of the golf club 136. In addition, the y axis of the second sensor 150 is orientated so as to follow along a normal line direction of a face surface of the head 138. By attaching the second sensor 150 in this manner, computation can be simplified.

In the present embodiment, a polar coordinate system is considered, and the x axis, y axis, and z axis of the polar coordinate system is a three-dimensional orthogonal coordinate system. In the present embodiment, the z axis is defined as the shaft axis of the golf club 136, and the x axis is oriented so as to follow along the toe-heel direction of the head 138. In addition, the y axis is oriented so as to follow along a normal line direction of the face surface of the head 138.

Thus, the z axis in the polar coordinate system matches the z axis of the second sensor 150, and the y axis of the polar coordinate system matches the y axis of the second sensor 150. In addition, the x axis of the polar coordinate system matches the x axis of the second sensor 150.

With the second sensor 150, a plurality of chronologically successive data points can be obtained. The number of data points per unit of time depends on sampling frequency.

[Fitting Method]

Figure 44:
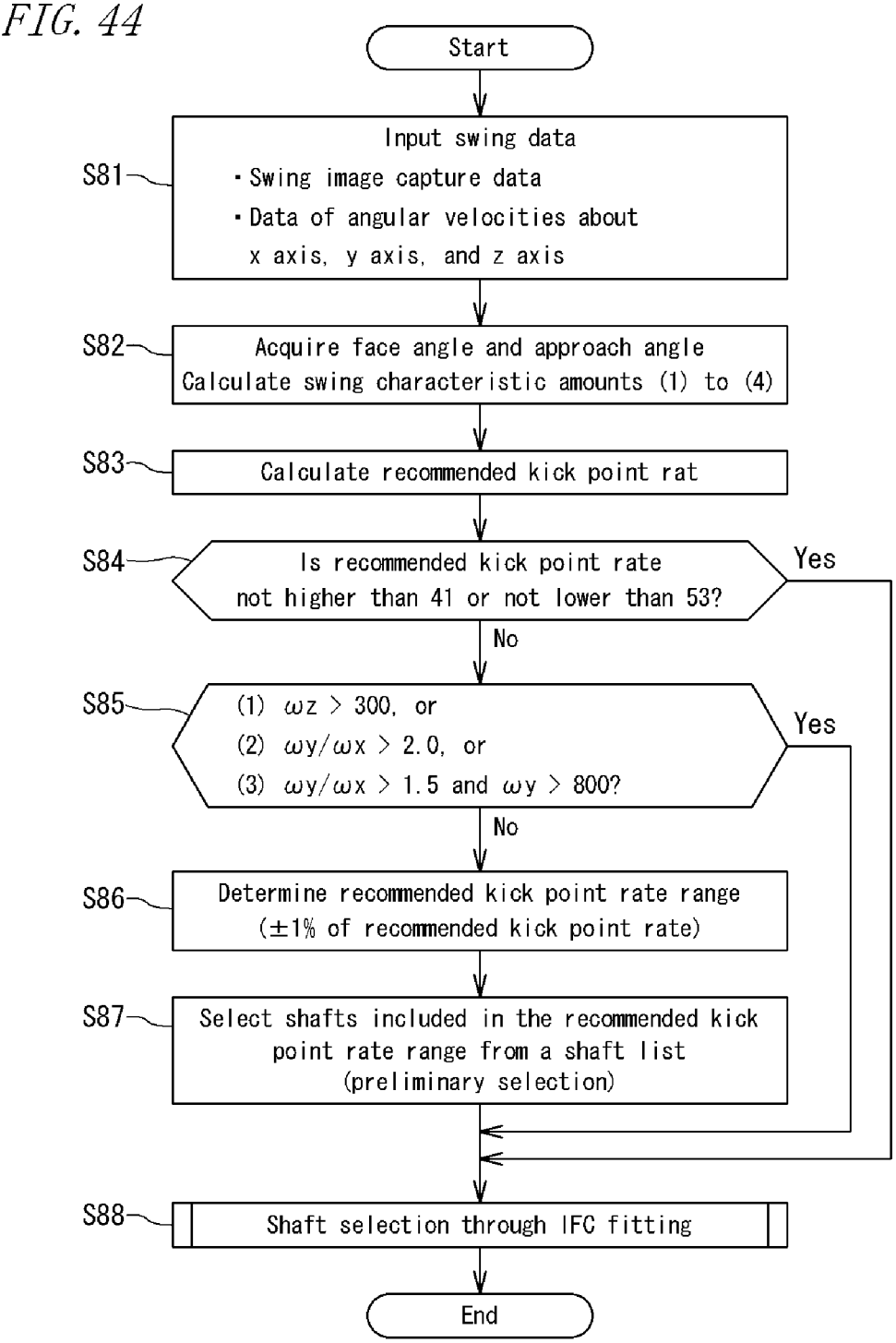
FIG. 44 is a flowchart of one example of the fitting method according to the third embodiment of the present invention.

FIG. 44 is a flowchart of the fitting method according to the present embodiment. In the present embodiment, shaft selection is performed through two stages in a broad way. Specifically, selection of a shaft suited for a golfer is performed through a preliminary selection step focusing on a kick point rate of a shaft, and a selection step focusing on flex of a shaft.

First, at step S81, by using, for example, the fitting apparatus shown in FIG. 39, a golfer who hopes for a fitting is asked to actually hit a ball, and inputting of swing data obtained there is conducted. The swing data inputted to the information processing device 112 includes a detection signal of the ball B and the head 138 detected by the first sensor 108, a signal of a swing image captured by the front camera 104 and the upper camera 106, and angular velocity signals about three axial directions obtained from an angular velocity sensor built in the second sensor. It should be noted that, at step S81, multiple swing image signals may be extracted, and these multiple swing image signals may each be converted into measurement data. The information processing device 112 may determine measurement data that is to be used for the fitting from multiple measurement data, using information that specifies an image.

Next, at step S82, by using swing data acquired at step S81, a face angle and an approach angle are calculated, and swing characteristic amounts (1) to (4) described later are calculated. The swing characteristic amounts are indices representing properties of a swing by the golfer, using angular velocities in three axial directions of the shaft during the swing. In this case, the golfer is asked to swing multiple times, and face angles measured from the multiple swings may be averaged. By using an average value of the face angles, accuracy of the fitting can be improved.

In the present embodiment, a face angle and an approach angle immediately before impact are measured. Here, "immediately before impact" is preferably a moment when the face surface of the head 138 is separated from the center line of the tee by a predetermined distance, and is, for example, a moment when the distance between the center line of the tee and the face surface of the head 138 is 3 cm. When a tee is not used, a vertical line passing through the center of the ball B may be used instead the center line of the tee. In some cases, the face angle at the time of impact is difficult to measure when compared to the face angle immediately before impact. The distance between the ball center and the face surface when the face angle is to be measured is preferably not larger than 10 cm, and more preferably not larger than 5 cm. It should be noted that, in the present embodiment, approach angle indicates a direction of head trajectory immediately before impact, and may be determined, for example, as an angle of head trajectory when the head is viewed from above.

Next, at step S83, for example, based on the following expression (4), a recommended kick point rate is calculated.

$$\text{Recommended Kick Point Rate} = 0.8648 \times (\text{Face Angle} - \text{Approach Angle}) + \text{Kick Point Rate of Standard Club} - 5.033 \quad (4)$$

This expression (4) can be statistically obtained based on experimental results of multiple golfers each hitting balls using multiple golf clubs having different kick point rates. A standard club is a club used for measuring a swing of a golfer hoping for a fitting, and is determined by taking into consideration the golfer's build, strength, exercise experience, preference, etc. As the standard club, a club having a shaft with a middle kick point is preferable, and, more specifically, a club having a shaft whose kick point rate is approximately 46% is preferable.

Expression (4) is a relational expression used as one example of a relationship created by using a correlation between hit-ball results (e.g., ball flight distance, directionality, etc.) and face and approach angles immediately before impact. The relational expression is not limited to a linear expression as in the case with expression (4), and examples thereof include quadratic expression and polynomial expression. A method of how to obtain the relational expression will be described using linear expression as an example. It should be noted that, a large value of face angle indicates the face is "open." In the case with a right-handed golfer, a positive face angle means the face of a club is facing right, and a negative face angle means the face of a club is facing left. Furthermore, in expression (4), the open direction of the face angle is defined as "+," inside-out in terms of the approach angle is defined as "+," and, based on a premise that a ball will fly straight if the clubface is perpendicular with respect to the trajectory of a swing, "face angle−approach angle" is used as a variable. If inside-out in terms of the approach angle is defined as "−," the face angle and the approach angle will make a variable of "face angle+ approach angle."

Although examples of the hit-ball result includes ball direction, flight distance, and the like as described above, a case of employing ball direction (flying direction) will be described here. Examples of the direction include left-right direction (horizontal direction), up-down direction (vertical direction), and three dimensional direction. One example of the left-right direction is a horizontal angle of initial velocity vector of a ball. Other examples of the left-right direction include a distance of a ball stop-point from a straight line connecting a hit position and a target, and a distance of a ball landing point from a straight line connecting a hit position and a target.

In the following, description will be provided using, as an example, the left-right direction (hereinafter, also simply referred to as left-right deviation) as the hit-ball result employed in expression (4). Here, the left-right deviation is shown as an angle. When a ball is hit out straight with respect to a target, the angle of the left-right deviation is zero degrees. The angle is displayed as minus when a hit ball has deviated leftward, and the magnitude of the deviation is represented by the angle. On the other hand, the angle is displayed as plus when a hit ball has deviated rightward, and the magnitude of the deviation is represented by the angle. It should be noted that, in the following, in order to simplify the description, "face angle" is used as a variable instead of "face angle–approach angle."

In the information processing device 112 in FIG. 39, a database is created having respective data of kick point rate of a shaft, left-right deviation, and face angle immediately before impact obtained from the experiment.

Figure 45:
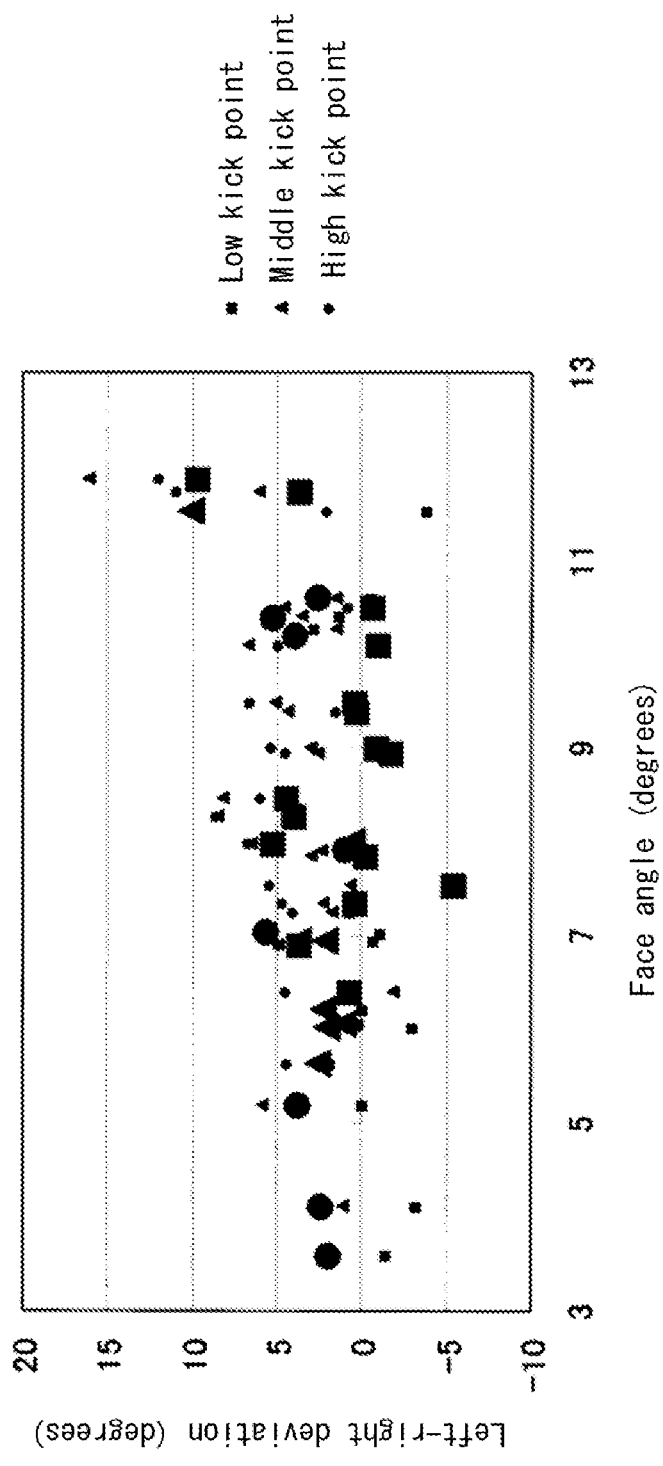
FIG. 45 shows a relationship between face angle and fly direction (left-right deviation) of a ball.

FIG. 45 shows left-right deviations of balls hit by multiple golfers each using shafts with low kick point, middle kick point, and high kick point. In this example, low kick point refers to a kick point rate of 48%, middle kick point refers to a kick point rate of 46%, and high kick point refers to a kick point rate of 44%.

In FIG. 45, a golfer can be identified by the value of face angle. With every face angle, i.e., with every golfer, a point representing a golf club that had the largest flight distance is shown to be larger in size than points of other golf clubs. In each of the golfers (face angles), it is shown that there is a tendency of left-right deviation being small when the flight distance is the largest when compared to shafts with other kick points. In other words, with a kick point rate the results in the largest flight distance, the left-right deviation tends to approach zero degrees.

Figure 46:
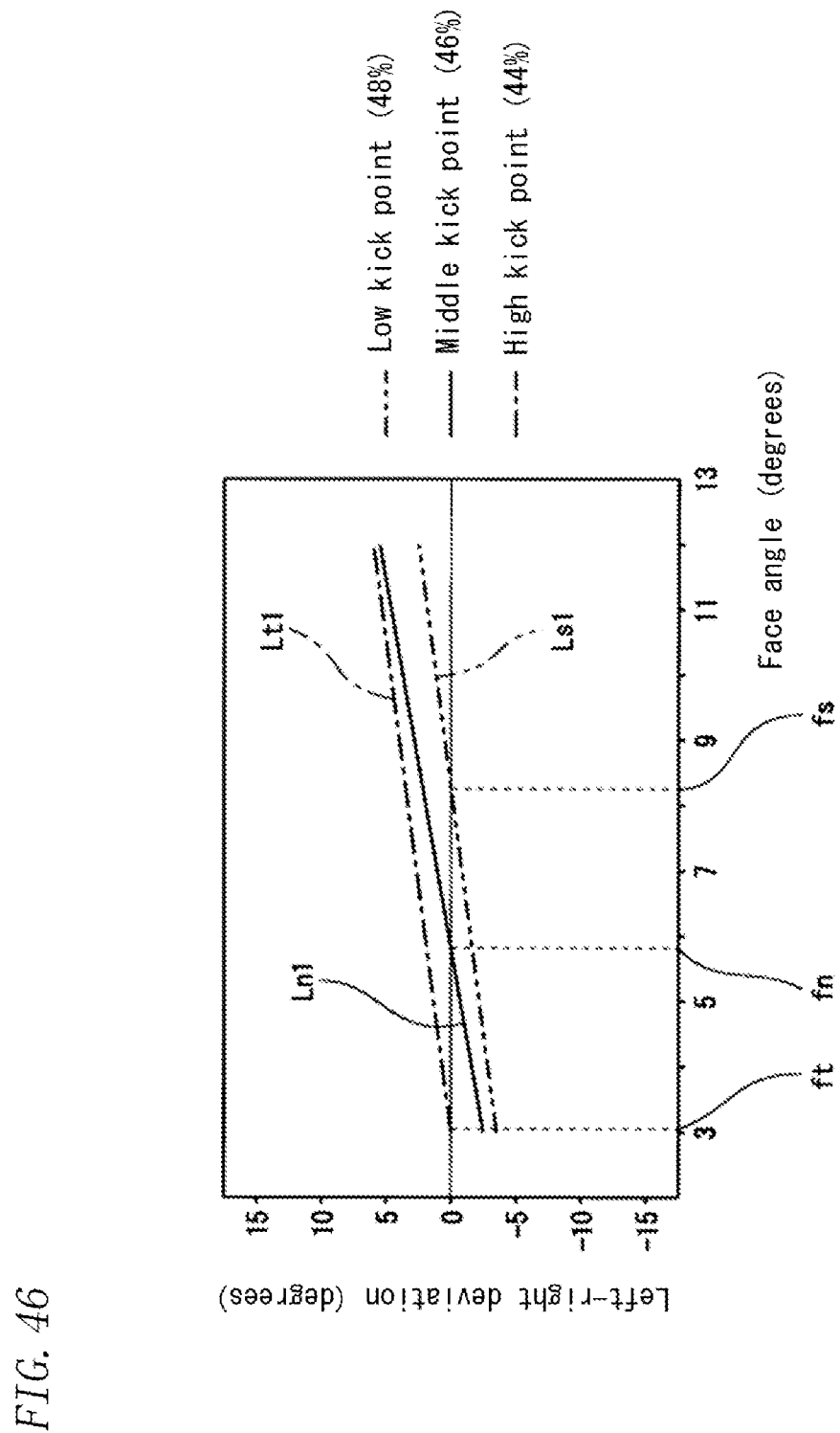
FIG. 46 shows a relationship between face angle and left-right deviation for each kick point rate.

FIG. 46 is a graph showing the relationship between face angle and left-right deviation. FIG. 46 is based on data in FIG. 45, and a relational expression of face angle and left-right deviation is obtained for each of the kick point rates. These relational expressions (straight lines) are obtained through regression analysis using least squares method. A straight line Ls1 in FIG. 46 is based on data of low kick point in FIG. 45. A straight line Ln1 in FIG. 46 is based on data of middle kick point in FIG. 45. A straight line Lt1 in FIG. 46 is based on data of high kick point in FIG. 45. Based these relational expressions, a kick point rate resulting in the smallest left-right deviation can be obtained with respect to the face angle of a golfer. In each of the straight line Ls1, the straight line Ln1, and the straight line Lt1; a face angle leading to a left-right deviation of zero degrees is obtained. In the straight line Ls1, a face angle leading to a left-right deviation of zero degrees is fs degrees (cf. FIG. 46). In the straight line Ln1, a face angle leading to a left-right deviation of zero degrees is fn degrees (cf. FIG. 46). In the straight line Lt1, a face angle leading to a left-right deviation of zero degrees is ft degrees (cf. FIG. 46).

Figure 47:
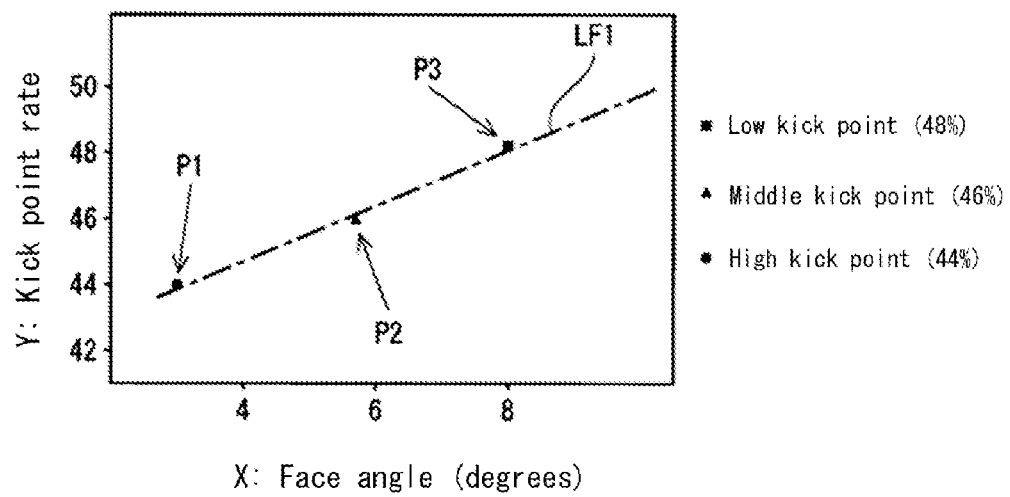
FIG. 47 shows a relationship between face angle and kick point rate when the left-right deviation becomes small.

Here, description will be provided regarding how to obtain the a straight line LF1 in FIG. 47 showing the relationship between face angle and kick point rate. In FIG. 47, point P1 shows a combination of face angle and high kick point (kick point rate 44%) when the angle of left-right deviation becomes zero degrees. More specifically, the coordinate of point P1 is (ft, 44). Point P2 shows a combination of face angle and middle kick point (kick point rate 46%) when the angle of left-right deviation becomes zero degrees. More specifically, the coordinate of point P2 is (fn, 46). Point P3 shows a combination of face angle and low kick point (kick point rate 48%) when the angle of left-right deviation becomes zero degrees. More specifically, the coordinate of point P3 is (fs, 48).

The straight line LF1 is obtained as an approximate linear function expression passing through point P1, point P2, and point P3. Here, the straight line LF1 is obtained using least squares method on these three points.

When the kick point rate of a shaft is represented as Y, and the value of face angle is represented as X, the straight line LF1 is indicated as the following approximate linear expression. This approximate linear expression is one example of a relational expression F1 in the present invention.

$$Y = A1 \cdot X + B$$

(Coefficient A1, and intercept B are constants)

From this relational expression F1, a shaft kick point rate Y suited for a subject (golfer) can be calculated based on a measured face angle X.

In the description above, although the relational expression is obtained based on the relationship between face angle and directionality of a hit ball, which is a single hit-ball result, the relational expression can also be obtained by combining two hit-ball results. When compared to using a single hit-ball result, accuracy of fitting can be improved by using two hit-ball results. Here, a case will be described in which results regarding ball direction and flight distance are used as the two hit-ball results. In this example, left-right deviation is used as ball direction, and flight distance ratio is used as a result regarding flight distance. Flight distance ratio is a relative value of flight distance. Instead of flight distance ratio, an absolute value of flight distance may be used. An absolute value of flight distance is ordinarily displayed in yards or meters.

First, as described above, a straight line LF1 (relational expression F1) is obtained based on left-right deviation (first hit-ball result). Next, the straight line LF1 is corrected based on flight distance ratio (second hit-ball result). This correction is based on a correlation Rx between flight distance ratio and face angle.

Figure 48:
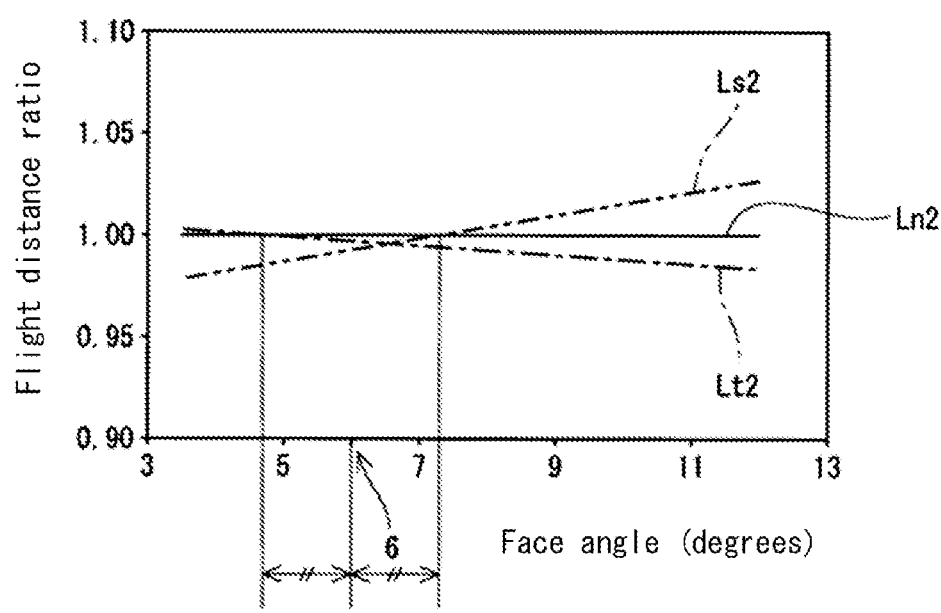
FIG. 48 shows a relationship between flight distance ratio and face angle for each kick point rate.

FIG. 48 is a graph showing this correlation Rx. In FIG. 48, a correlation Rx of the above described flight distance ratio and face angle is obtained for each kick point rate. A database used for creating FIG. 48 is the same database used for creating FIG. 45. As the correlation Rx, three relational expressions are obtained. These relational expressions are obtained through regression analysis using least squares method.

Here, based on the correlation Rx, a range in which a preferable result is obtained with a shaft with middle kick point (kick point rate 46%) is selected. As shown in FIG. 48, in this example, a particularly preferable result is obtained with the shaft with middle kick point (kick point rate 46%) between face angles of 4.7 degrees to 7.3 degrees. More specifically, the shaft with middle kick point (kick point rate 46%) has a high flight distance ratio in this range when compared to a shaft with high kick point (kick point rate 44%) and a shaft with low kick point (kick point rate 48%). In FIG. 48, between face angles of 4.7 degrees and 7.3 degrees, a straight line Ln2 (middle kick point) is above a straight line Ls2 (low kick point) and a straight line Lt2 (high kick point). For example, any value can be selected from this preferable range (between 4.7 degrees and 7.3 degrees). Preferably, a median of this preferable range is selected. The median here is 6.0 degrees.

Figure 49:
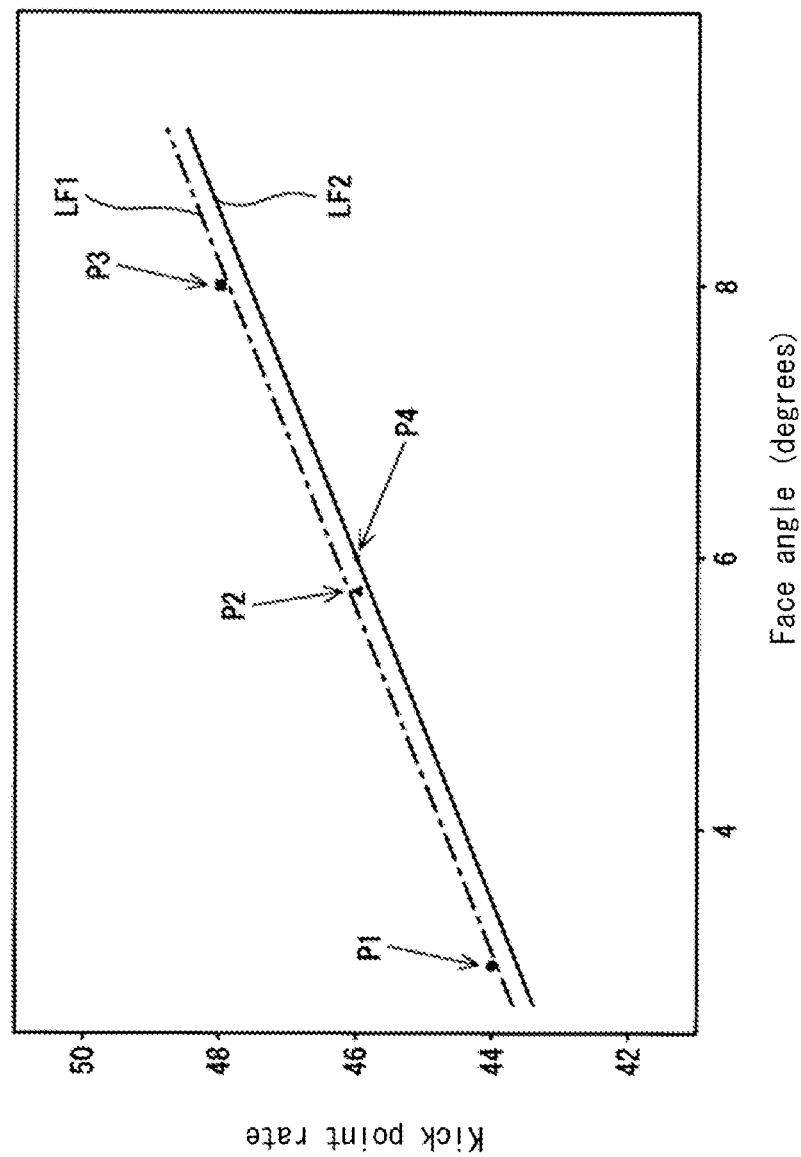
FIG. 49 shows another relationship between face angle and kick point rate when the left-right deviation becomes small.

In FIG. 49, a straight line LF2 is obtained from the straight line LF1. The straight line LF2 has the same slope A1 as the straight line LF1. The value of intercept B is corrected such that this straight line LF2 passes through point P4 for middle kick point (kick point rate 46%) and face angle of 6.0 degrees. More specifically, the straight line LF2 is a straight line that passes through point P4 (6.0, 46), and has a slope identical to that of the straight line LF1. This straight line LF2 may be used as the relational expression F1 instead of the straight line LF1. This straight line LF2 is a relational expression F1 obtained by correcting, based on the second hit-ball result (flight distance ratio), the relational expression F1 (straight line LF1) obtained based on the first hit-ball result (left-right deviation). In this correction, the relational expression F1 (straight line LF1) is corrected such that the second hit-ball result (flight distance ratio) becomes preferable at middle kick point (kick point rate 46%). Here, as a standard shaft kick point Yh, a kick point rate of 46% is employed. This straight line LF2 takes into consideration two hit-ball results. Therefore, when expression of the straight line LF2 is employed as the relational expression F1, accuracy of the fitting can be improved.

Next, the relational expression F1 of the present invention will be described in more detail. As described above, other than a linear expression, although quadratic expression, polynomial expression, etc., can be used as the relational expression F1, a case with a linear expression will be described for simplicity.

As described above, a linear relational expression F1 can be represented by the following expression (5).

$$Y = A1 \cdot X + B \tag{5}$$

When a face angle X of a test club (shaft kick point rate D1) used by a subject golfer is defined as Xd1, a kick point rate Y1 recommended for the subject can be obtained as follows based on expression (5).

Recommended Kick Point Rate $Y1 = A1 \cdot Xd1 + B$

Preferably, in this expression (5), a preferable hit-ball result is reflected for the standard shaft kick point Yh (which is a shaft kick point used as a standard when certifying a preferable hit-ball result, and "kick point rate 46%" is employed as a standard shaft kick point in FIG. 47). The reflected relational expression F1 is also referred to in the following as a relational expression F1$p$. One example of the relational expression F1$p$ is the expression for the straight line LF2. The relational expression F1$p$ can be considered as a relational expression F1 optimized with the standard shaft kick point Yh. Therefore, the relational expression F1$p$ displays particularly excellent accuracy when the kick point rate D1 of the test club, i.e., the kick point rate D1 of the standard club, matches the standard shaft kick point Yh.

The relational expression F1$p$ may be used regardless of the kick point rate of the shaft used for fitting. However, as described above, the relational expression F1$p$ is particularly preferable when the kick point rate D1 of the test club matches the standard shaft kick point Yh. Therefore, the relational expression F1$p$ is preferably corrected based on a kick point rate of the club used for fitting.

The corrected relational expression F1 is represented by the following expression (6).

$$Y = A1 \cdot X + B + (D1 - Yh) \tag{6}$$

By using the corrected relational expression F1, a kick point rate that is to be recommended can be obtained with fine accuracy even when the kick point rate D1 of the shaft of the test club is different from the standard shaft kick point Yh.

For the relational expression F1 of expression (6), the measured face angle X is used as a first input variable, and a value indicating the relationship between the shaft kick point D1 of the test club and the standard shaft kick point Yh is used as a second input variable. In the relational expression F1 of expression (6), a shaft kick point Y suited for the subject is used as a result variable. By using such relational expression F1, it is possible to increase accuracy of fitting regardless of the kick point of the shaft used for fitting.

By using expression (6) as a basis, the above described expression (4) is statistically obtained based on numerous experimental data. Therefore, the constants "0.8648" and "5.033" in expression (4) are merely examples, and the constants are not limited thereto.

It should be noted that, in the embodiment described above, although the relational expression F1 is used as the relation C of the present invention, the relation C does not necessary have to be a relational expression.

In addition, the relation C is a relationship between face angle X and shaft kick point Y. In addition to the face angle X, other elements may also be considered. For example, the relation C may be a relationship between shaft kick point Y, and face angle X and approach angle. The relational expression F1 may be a relational expression of shaft kick point Y, and face angle X and approach angle. This approach angle indicates a direction of head trajectory immediately before impact. Examples of the approach angle include an angle of head trajectory when viewed from above.

Next, returning to FIG. 44, at step S84, it is determined whether or not the recommended kick point rate calculated at step S83 is not higher than 41 or not lower than 53. This determination is conducted for removing cases where the recommended kick point rate is too low or too high. In other words, the determination is conducted for excluding swing patterns that are not preferable for performing a fitting using a kick point rate. At step S84, if the recommended kick point rate is higher than 41 but lower than 53, the result is "NO" and the flow advances to step S85; whereas if the recommended kick point rate is not higher than 41 or not lower than 53, the result is "YES" and the flow advances to step S88 to conduct selecting of a shaft through a later described IFC fitting.

Next, at step S85, it is determined whether or not average angular velocities $\omega x$, $\omega y$, and $\omega z$ from the top to the impact satisfy any of the relationships of the following (1) to (3). Similar to step S84, the determination at step S85 is also conducted for excluding swing patterns that are not preferable for performing a fitting using a kick point rate.

(1) $\omega z > 300$, or (2) $\omega y / \omega x > 2.0$, or (3) $\omega y / \omega x > 1.5$ and $\omega y > 800$ At step S85, if any of the relationships of (1) to (3) above is satisfied, the result is "YES" and the flow advances to step S88 to conduct selecting of a shaft through a later described IFC fitting; whereas if none of the relationships of (1) to (3) above are satisfied, the result is "NO" and the flow advances to step S86.

Next, at step S86, based the recommended kick point rate calculated at step S83, a recommended kick point rate range is determined. In the present embodiment, the recommended kick point rate range is within plus and minus 1% of the recommended kick point rate. Specifically, when the recommended kick point rate is 46%, the recommended kick point rate range is 45 to 47%.

Next, at step S87, from a shaft list stored in advance in a database having a predetermined number of shafts, shafts included in the recommended kick point rate range determined at step S86 are selected (preliminary selection). Stored in the database is information of the predetermined number of shafts regarding the shaft's physical property values, e.g., kick point rate, a later described bending stiffness at a predetermined position of the shaft, etc.

Next, at step S88, a shaft suited for a golfer among the shafts preliminarily selected at step S87 is selected through IFC fitting.

[IFC Fitting]

Next, the above described IFC fitting at step S88, i.e., a fitting method using an index called IFC, will be described in detail. It should be noted that, IFC is an abbreviation of International Flex Code, and is proposed by the present applicant as an index that represents hardness of a shaft.

Before describing processes of IFC fitting in the present invention, the principle or theoretical background of the IFC fitting method will be described. The present inventors have focused on the fact that bending of a shaft of a golf club travels from a hand side to a front end side of the shaft as a swing proceeds from the top to the impact. Then, as a result of conducting thorough research and examination under an assumption that there is a correlation between swing characteristics (details of the swing characteristics will be described later), of a certain golfer, associated with the course of time from the top to the impact and hardness in every inch of a shaft matching the golfer, the present inventors have accomplished the IFC fitting method.

Specifically, a swing of a golfer when hitting a ball transitions from address to top and to impact, and, at that moment, since a head having a relatively large weight exists at the front end of a golf club to cause inertia, bending occurs in a shaft of the golf club due to the inertia. The bending does not occur at the same part of the shaft during the whole swing process, and the bending is transferred from the hand side to the front end side of the shaft during the swing from the top to the impact as shown in FIG. 1. In other words, as the swing proceeds from the top to the impact, the position of bending in the shaft moves from the hand side to the front end side of the shaft.

More specifically, at a time point (a time point shown as (1) in FIG. 1) when a backswing is performed after addressing to reach the top, bending occurs in the shaft near the hand. Then, when a turn is performed to reach the initial stage of a downswing (a time point shown as (2) in FIG. 1), the bending moves slightly to the front end side of the shaft. Subsequently, at a time point when the golfer's arms become horizontal (a time point shown as (3) in FIG. 1), the bending moves further toward the front end side from the center of the shaft. Further, at a time point immediately before impact (a time point shown as (4) in FIG. 1), the bending moves near the front end of the shaft.

In view of the bending of shaft being transferred from the hand side to the front end side of the shaft during a swing from the top to the impact in this manner, the present inventors have focused on swing characteristics of a golfer in the time intervals of (1) to (4), and have attempted to select optimal bending stiffness in every inch of the shaft.

Specifically, similar to the first embodiment, a shaft is divided into four regions, and bending stiffness at a single point in each of the regions is defined (cf. FIG. 2). In the present embodiment, with respect to the tip end 140a of the shaft 140, a part 36 inches therefrom is defined as a measurement point (1), a part 26 inches therefrom is defined as a measurement point (2), a part 16 inches therefrom is defined as a measurement point (3), and a part 6 inches therefrom is defined as a measurement point (4). Then, bending stiffnesses at the four measurement points of the shaft 140 are measured and converted into numerical values.

Bending stiffness (EI value: $N \cdot m^2$) of every inch of the shaft can be measured similarly to the first embodiment as shown in FIG. 3 using, for example, a model 2020 measuring machine (maximum load 500 kgf) manufactured by INTESCO Co., Ltd.

Also in the present embodiment, similar to the first embodiment, a rank value is given from among multiple-scale rank values in accordance with bending stiffnesses of the shaft measured for every inch. Specifically, a value of one of the above described 10-scale IFCs is given in accordance with bending stiffness.

Conversion from an EI value of a shaft to an IFC at the measurements point (1) to (4) is conducted using, for example, the above described Tables 1 to 4, respectively. As a method for sorting hardness of a shaft into 10 scales, several methods are conceivable such as a method of sorting shafts into 10 scales using, as subjects, all commercially available shafts, and a method of sorting shafts into 10 scales within a range of shafts intended to be provided to a user by a fitter while taking into consideration frequency of usage etc. However, in the present embodiment, fitting is performed using the latter of the two methods.

[Swing Characteristic Amount]

Also in the present embodiment, similar to the first and second embodiments, a golfer hoping for fitting of a golf club is asked to actually swing a golf club, and swing characteristic amounts specific to the golfer are measured from the swing using the second sensor 150. As shown in FIG. 43, the second sensor 150 is attached to the grip end of the golf club 136 using a double-sided tape, an adhesive, a screw, or the like.

It should be noted that, for the purpose of improving accuracy of fitting, if a length of a user's own club is different from a length of a golf club based on a shaft stored in a database, it is possible to select a shaft matching the user by changing a club total weight to a weight corresponding to the length of the club prepared in the database. For example, if the length of the club stored in a database is 45 inches, and length A (mm) of the club of the user is different from 45 inches (=1143 mm), the total weight of the club used for measuring a swing is changed to a weight (total weight corresponding to 45 inches) calculated from the following expression to perform the fitting.

$$(\text{Total Weight of Club used for Measurement}) = (A - 1143) \times 0.377 + (\text{Club Total Weight of the User's Own Club})$$

Then, among the above described various stages of the swing, focus is placed on an angular velocity $\omega y$ in the direction of a wrist cock during a downswing from around the top to the impact, and the angular velocity $\omega y$ is subdivided and quantified depending on elapsed time.

In the present embodiment, as shown in FIG. 11 described above and similarly to the first embodiment, four swing characteristics of (1) to (4) are configured depending on elapsed time of the swing, and the swing characteristics are each quantified.

The swing characteristic amount (1) as the swing characteristic amount (a) is the slope of the angular velocity $\omega y$ in the direction of a wrist cock around the top, and, for example, can be represented as a sum of an angular velocity $\omega y$ 50 ms before the top and an angular velocity $\omega y$ after 50 ms of the top. The swing characteristic amount (1) is correlated with the above described bending stiffness at the measurement point of 36 inches from the tip end of the shaft.

The swing characteristic amount (2) as the swing characteristic amount (b) is an average value of the angular velocity ωy from the top to a time point at which the angular velocity ωy becomes a maximum. The average value can be obtained by obtaining a maximum value of the angular velocity ωy from the top to the impact, and dividing an accumulated value of the angular velocity ωy from the top to the time point at which the maximum value is obtained by a time period from the top to the time point at which the maximum value is obtained. The swing characteristic amount (2) is correlated with the above described bending stiffness at the measurement point of 26 inches from the tip end of the shaft.

The swing characteristic amount (3) as the swing characteristic amount (c) is an average value of the angular velocity ωy from a time point at which the angular velocity ωy becomes a maximum to the impact, and the average value can be obtained by dividing an accumulated value of the angular velocity ωy from the time point at which the maximum value is obtained to the impact by a time period from the time point at which the maximum value is obtained to the impact. The swing characteristic amount (3) is correlated with the above described bending stiffness at the measurement point of 16 inches from the tip end of the shaft.

The swing characteristic amount (4) as the swing characteristic amount (d) is an average value of the angular velocity ωy from the top to the impact, and the average value can be obtained by dividing an accumulated value of the angular velocity ωy from the top to the impact by a time period from the top to the impact. This swing characteristic amount (4) is correlated with the above described bending stiffness at the measurement point of 6 inches from the tip end of the shaft.

For the swing characteristic amounts (1) to (4), a golfer hoping for a fitting is asked to test-hit a predetermined number of balls, for example, five balls, and swing characteristic amounts obtained upon hitting each of the balls can be averaged to be set as swing characteristic amounts of the golfer.

[Calculation of Shaft Stiffnesses in Every Inch]

Next, based on the calculated swing characteristic amounts (1) to (4), shaft stiffnesses suited for the golfer are calculated in every inch. Preceding this calculation, an approximate expression representing a relationship between swing characteristic amount and preferable bending stiffness (EI value) of a shaft is obtained for each of the swing characteristic amounts. The approximate expression is created based on data collected by having multiple testers conduct test-hits. From a standpoint of increasing reliability of the approximate expression, having a larger number of testers is preferable. In the present embodiment, the testers are intermediate-level or advanced-level players having a handicap of 20 or lower. For each of the testers, several golf clubs have been selected from multiple golf clubs (drivers) prepared in advance using as a reference the weight, length, and flex (or kick point) of golf clubs that are ordinarily used by a tester. Then, a tester is asked to test-hit several balls (excluding miss-shots), e.g., six balls, for each of the several golf clubs, and is asked to select a golf club that is easy to swing in accordance with a later described standard.

With regard to a golf club easy to swing, three items of "flight distance," "directionality," and "ease of swinging" are scored in accordance with evaluation standards shown in, for example, the above described Table 5; and a club whose sum total of score is 1.5 points or higher is determined as a club that is easy to swing. The selected several golf clubs have their shaft portions painted in black, and are randomly provided to a tester. With this, a tester cannot determine which club he or she is hitting. The test-hitting is performed in two sets of three balls for each club, and a questionnaire regarding ease of swinging is given to the tester for scoring, every time he or she has test-hit three balls with a certain club.

Figure 50:
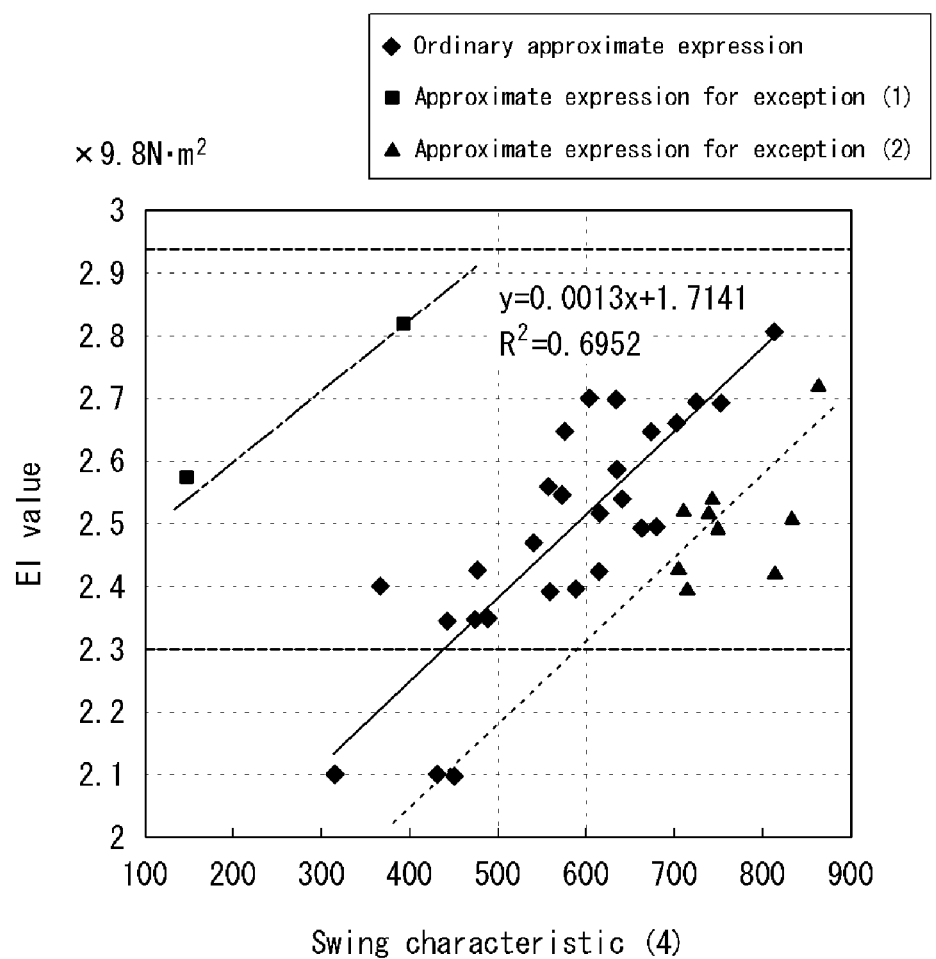
FIG. 50 shows a relationship between bending stiffness (EI value) and swing characteristic amount (4) at the measurement point of "6 inches;"
Figure 51:
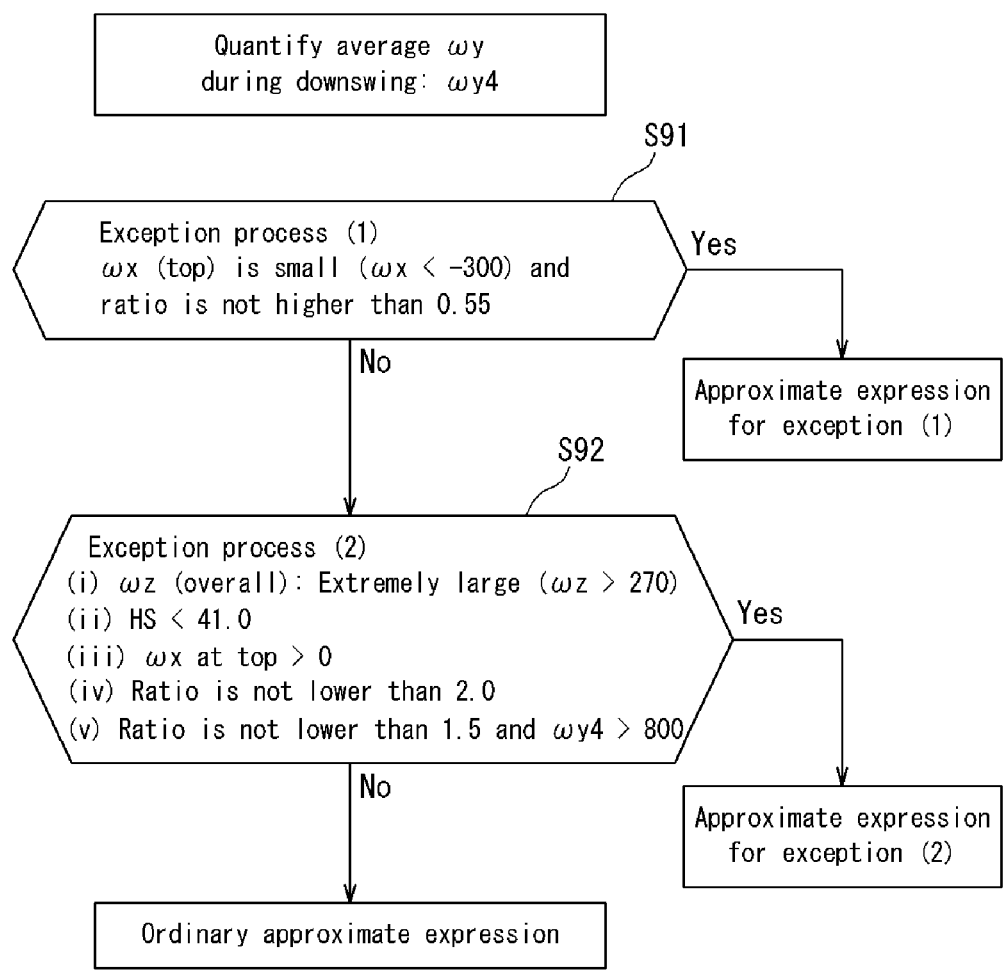
FIG. 51 shows a flow for calculating an EI value at the measurement point of "6 inches;"
Figure 53:
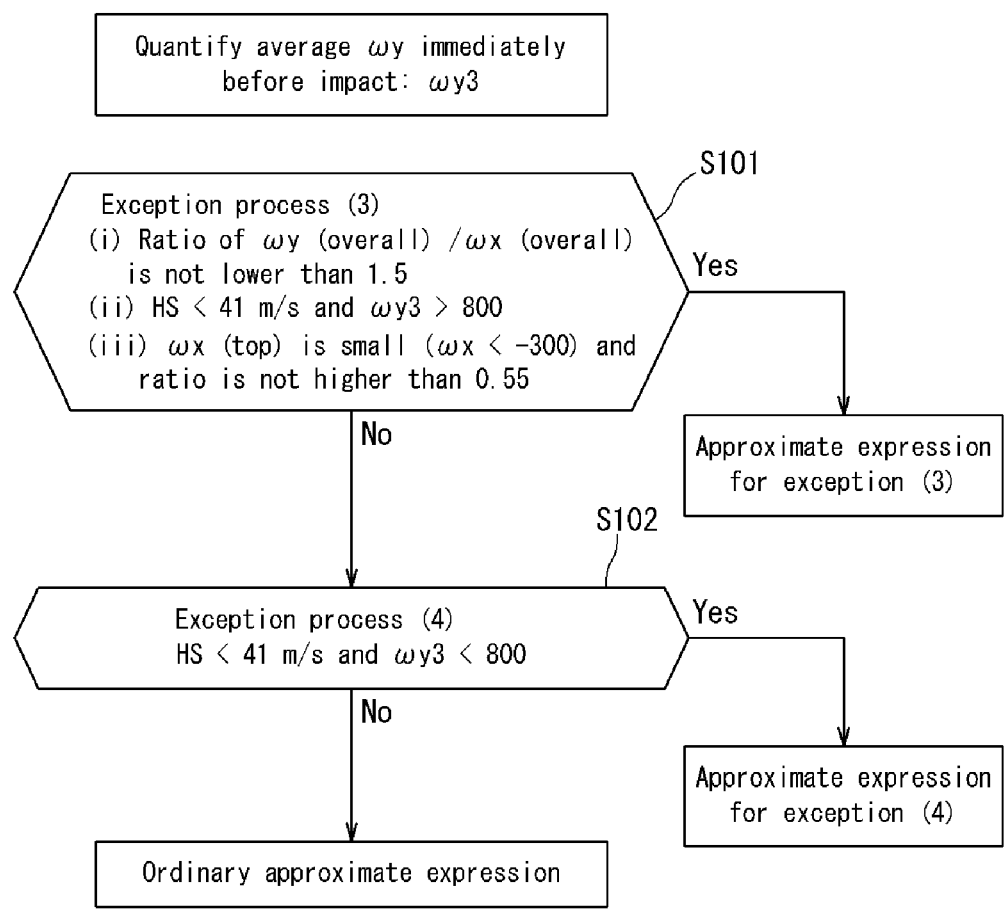
FIG. 53 shows a flow for calculating an EI value at the measurement point of "16 inches;"
Figure 55:
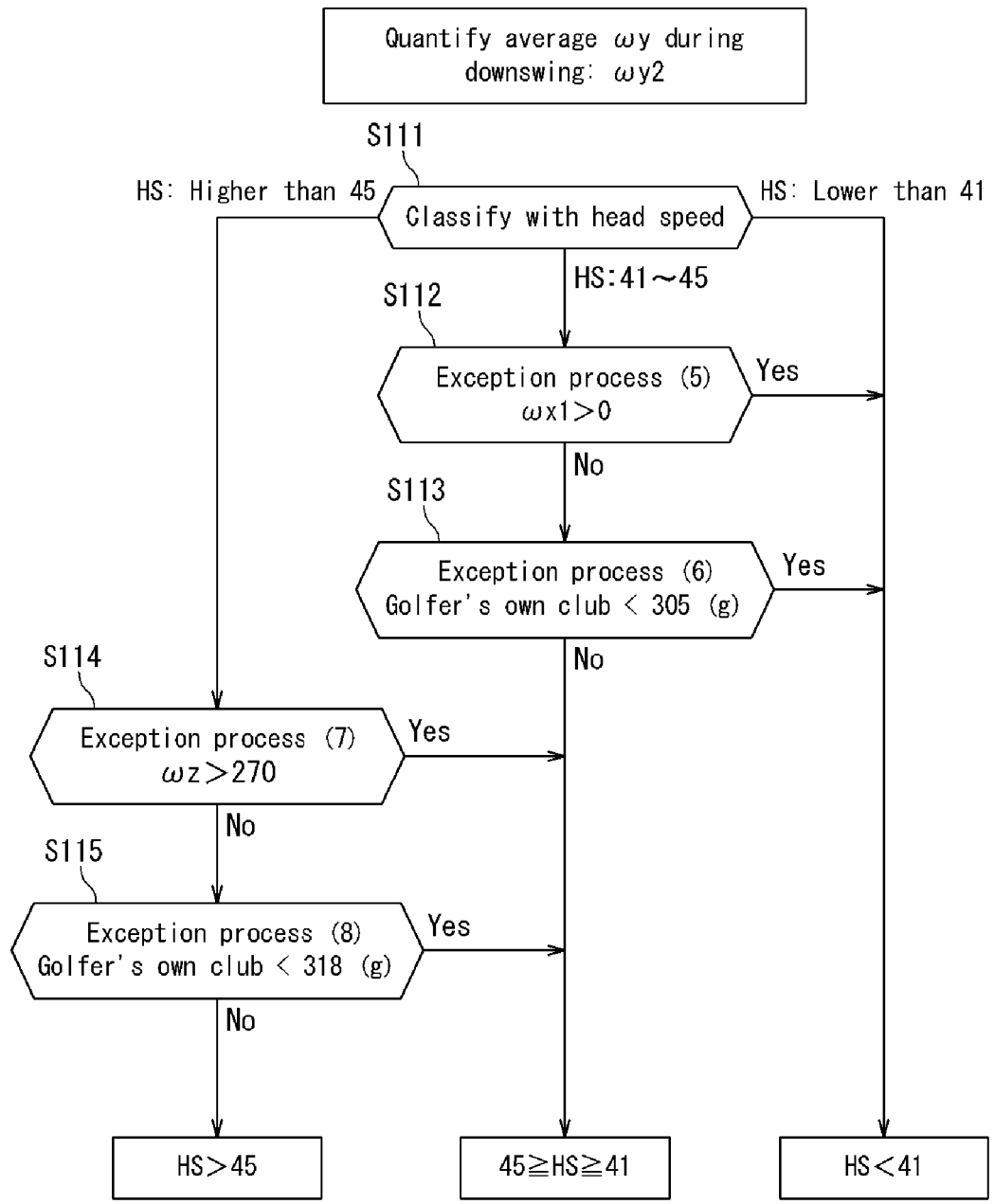
FIG. 55 shows a flow for calculating an EI value at the measurement point of "26 inches;"
Figure 57:
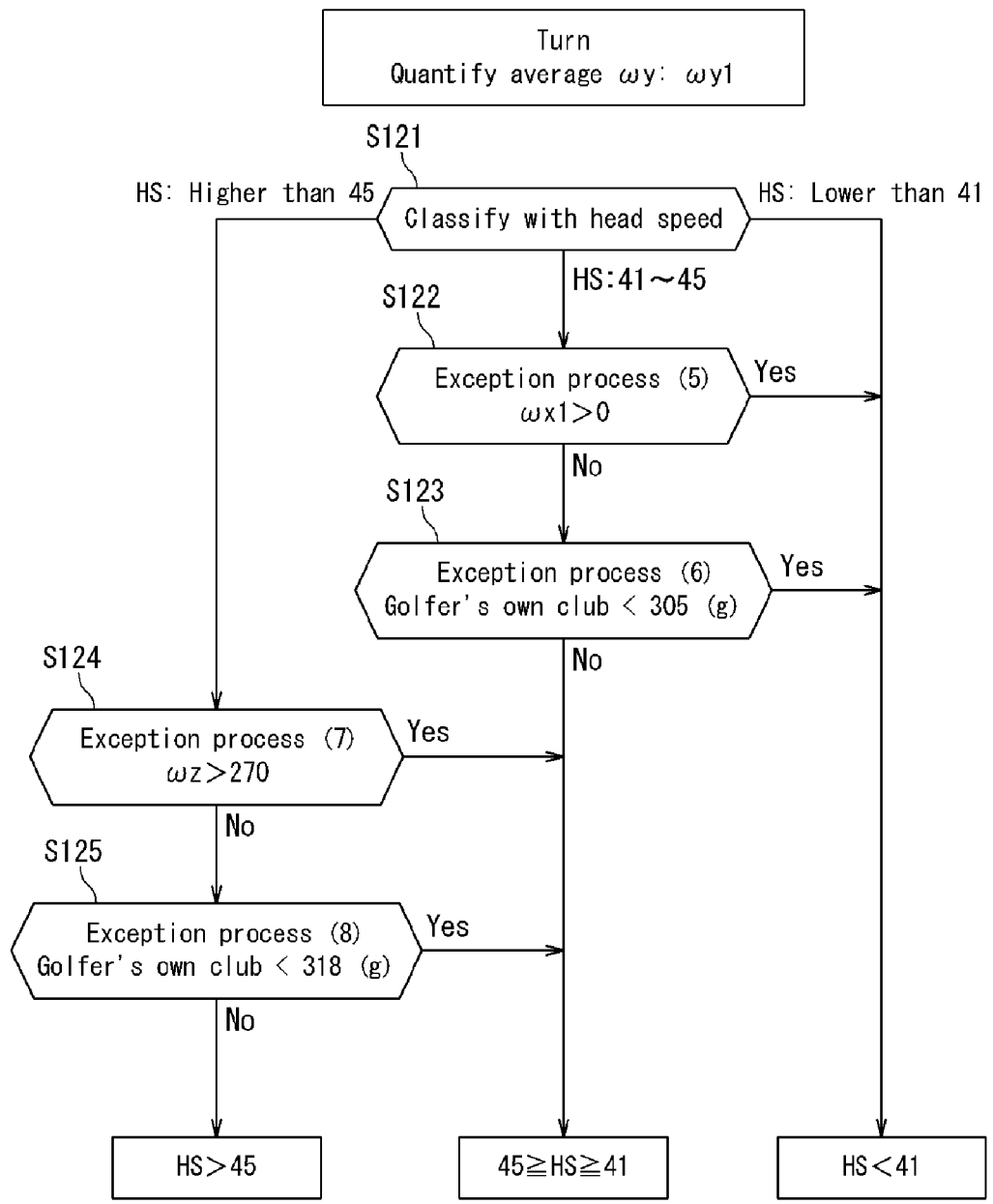
FIG. 57 shows a flow for calculating an EI value at the measurement point of "36 inches;"
Figure 58:
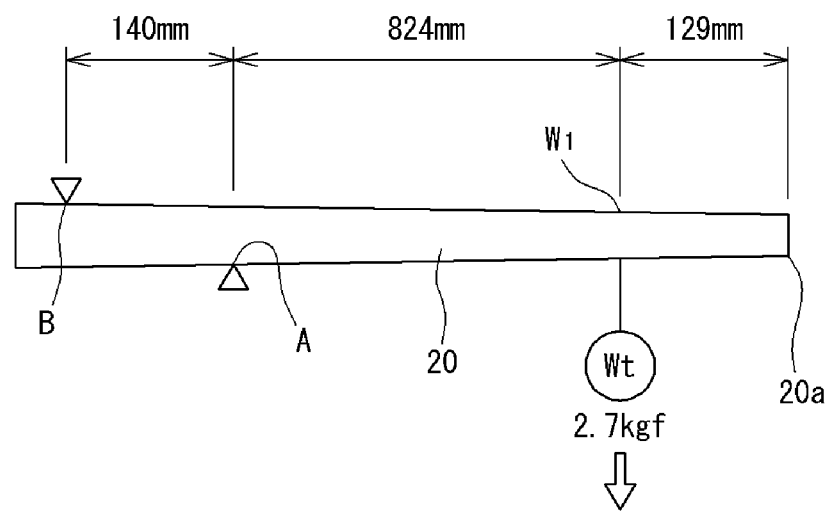
FIG. 58 is for describing a method for measuring forward flex.
Figure 59:
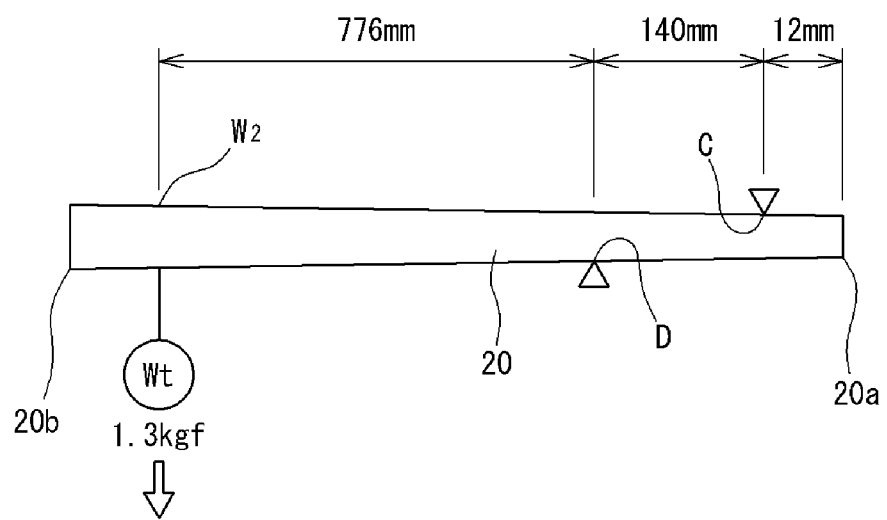
FIG. 59 is for describing a method for measuring backward flex.

FIG. 50 shows a relationship between bending stiffness (EI value) and the swing characteristic amount (4) at the measurement point of "6 inches" created in advance as described above, and FIG. 51 shows a flow for calculating the EI value at the measurement point of "6 inches." It should be noted that, in FIG. 51, "ωy4" is the swing characteristic amount (4) of the angular velocity in the direction of a wrist cock. The same applies for FIGS. 53, 55, and 57 described later.

In the present embodiment, for the purpose of improving accuracy of calculating the EI value, not only one approximate expression but three approximate expressions are prepared in advance. Although it is possible to represent the relationship between the swing characteristic amount (4) and the EI value at the measurement point of "6 inches" with a single approximate expression, there are cases where a highly reliable EI value cannot be calculated with a single approximate expression for golfers whose swings are deviated from average such as golfers having an extremely low angular velocity ωx in the x-axial direction around the top and golfers having considerably low head-speeds. Therefore, in addition to an ordinary approximate expression for average golfers, an approximate expression for exception (1) and an approximate expression for exception (2) are prepared in the present embodiment.

First, exception process (1) is executed at step S91. Specifically, it is determined whether or not the angular velocity ωx in the x-axial direction around the top is ωx<−300, and a ratio (ωy (overall)/ωx (overall)) between an average value of the angular velocity ωy in the y-axial direction from the top to the impact and an average value of the angular velocity ωx in the x-axial direction from the top to the impact is 0.55 or lower. And if the result is YES, the EI value is calculated using the approximate expression for exception (1) shown by a long dashed short dashed line in FIG. 50.

On the other hand, if the result is NO at step S91, the flow advances to step S92 and exception process (2) is executed. In this exception process (2), it is determined whether or not at least one of the following five conditions of (a) to (e) is satisfied.

(a) An accumulated value of the angular velocity ωz in the z-axial direction from the top to the impact is extremely large as ωz>270.

(b) The head speed is lower than 41.0 m/s.

(c) The angular velocity ωx in the x-axial direction around the top satisfies ωx>0.

(d) The ratio (ωy (overall)/ωx (overall)) between an average value of the angular velocity ωy in the y-axial direction from the top to the impact and an average value of the angular velocity ωx in the x-axial direction from the top to the impact is 2.0 or higher.

(e) The ratio (ωy (overall)/ωx (overall)) between an average value of the angular velocity ωy in the y-axial direction from the top to the impact and an average value of the angular velocity ωx in the x-axial direction from the top to the impact is 1.5 or higher, and the swing characteristic amount (4) is larger than 800.

If the result is YES at step S92, the EI value is calculated using the approximate expression for exception (2) shown as a short dashed line in FIG. 50. On the other hand, if the result is NO at step S92, the EI value is calculated using the ordinary approximate expression shown as a solid line in FIG. 50.

The ordinary approximate expression, the approximate expression for exception (1), and the approximate expression for exception (2) can all be regarded as a linear expression representing a regression line obtained by least squares method. Slopes and intercepts of the respective expressions are shown in the following Table 13.

TABLE 13

|  | Slope | Intercept |
|---|---|---|
| Ordinary approximate expression | 0.00135 | 1.74 |
| Approximate expression for exception (1) |  | 1.74 + 0.6 |
| Approximate expression for exception (2) |  | 1.74 − 0.2 |

Figure 52:
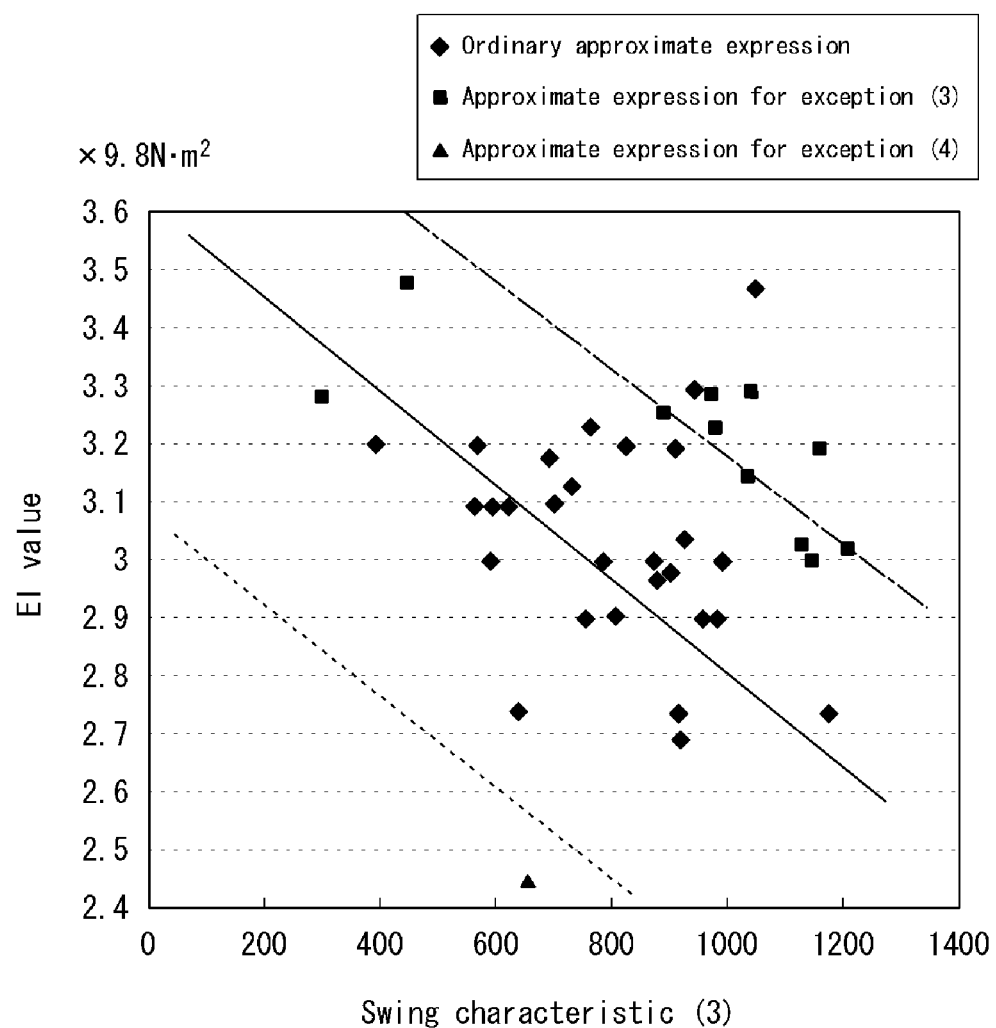
FIG. 52 shows a relationship between bending stiffness (EI value) and swing characteristic amount (3) at the measurement point of "16 inches;"

FIG. 52 shows a relationship between bending stiffness (EI value) and the swing characteristic amount (3) at the measurement point of "16 inches" created in advance as described above, and FIG. 53 shows a flow for calculating the EI value at the measurement point of "16 inches."

First, at step S101, exception process (3) is executed. Specifically, it is determined whether or not at least one of the following three conditions of (f) to (h) is satisfied.

(f) The ratio ($\omega y$ (overall)/$\omega x$ (overall)) between an average value of the angular velocity $\omega y$ in the y-axial direction from the top to the impact and an average value of the angular velocity $\omega x$ in the x-axial direction from the top to the impact is 1.5 or higher.

(g) The head speed (HS) is lower than 41 m/s, and the swing characteristic amount (3) is larger than 800.

(h) The angular velocity $\omega x$ in the x-axial direction around the top is lower than −300, and the ratio ($\omega y$ (overall)/$\omega x$ (overall)) between an average value of the angular velocity $\omega y$ in the y-axial direction from the top to the impact and an average value of the angular velocity $\omega x$ in the x-axial direction from the top to the impact is 0.55 or lower.

If the result is YES at step S101, the EI value is calculated using the approximate expression for exception (3) shown as a long dashed short dashed line in FIG. 52. On the other hand, if the result is NO at step S101, the flow advances to step S102 and exception process (4) is executed. In this exception process (4), it is determined whether or not the head speed is lower than 41 m/s and the swing characteristic amount (3) is smaller than 800.

If the result is YES at step S102, the EI value is calculated using the approximate expression for exception (4) shown as a short dashed line in FIG. 52. On the other hand, if the result is NO at step S102, the EI value is calculated using the ordinary approximate expression shown as a solid line in FIG. 52.

The ordinary approximate expression, the approximate expression for exception (3), and the approximate expression for exception (4) can all be regarded as a linear expression representing a regression line obtained by least squares method. Slopes and intercepts of the respective expressions are shown in the following Table 14.

TABLE 14

|  | Slope | Intercept |
|---|---|---|
| Ordinary approximate expression | −0.0008 | 3.6 |
| Approximate expression for exception (3) |  | 3.6 + 0.35 |
| Approximate expression for exception (4) |  | 3.6 − 0.6 |

Figure 54:
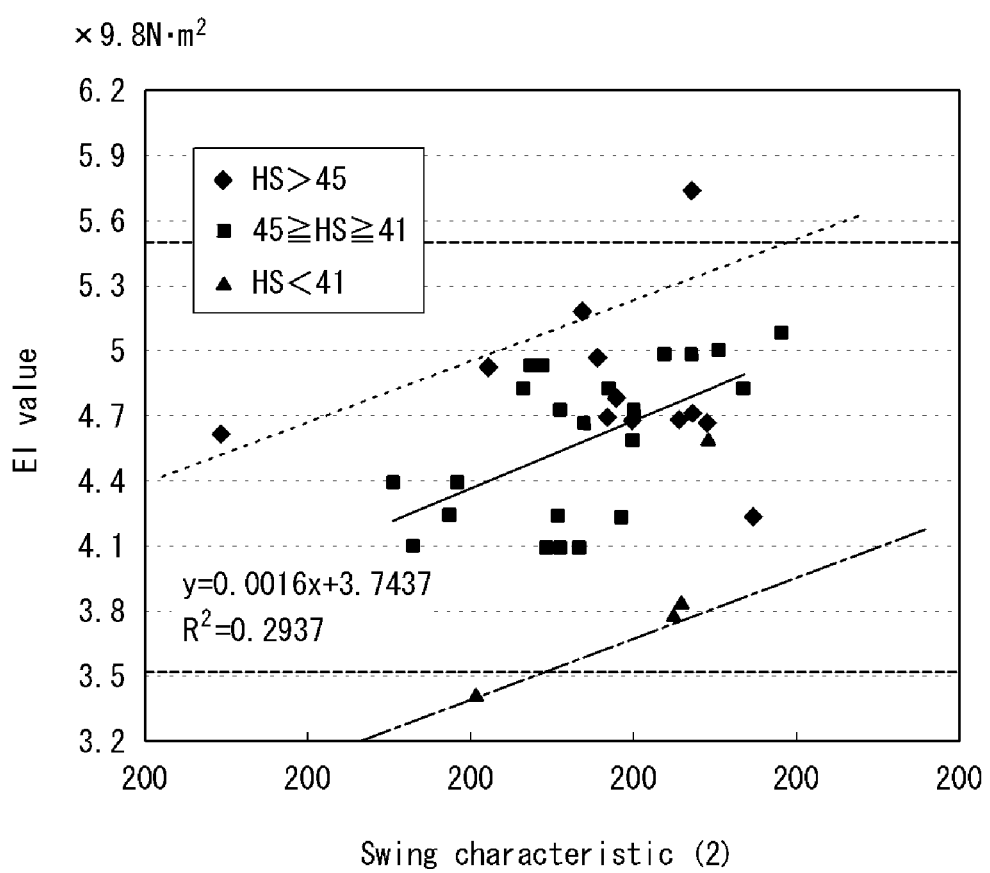
FIG. 54 shows a relationship between bending stiffness (EI value) and swing characteristic amount (2) at the measurement point of "26 inches;"

FIG. 54 shows a relationship between bending stiffness (EI value) and the swing characteristic amount (2) at the measurement point of "26 inches" created in advance as described above, and FIG. 55 shows a flow for calculating the EI value at the measurement point of "26 inches." For the swing characteristic amount (2), three approximate expressions in accordance with head speed of a golfer are configured. More specifically, an approximate expression is configured for each of the cases where the head speeds are lower than 41 m/s (case 1), not lower than 41 m/s but not higher than 45 m/s (case 2), and higher than 45 m/s (case 3).

First, at step S111, it is determined which of case 1, case 2, or case 3 applies to the head speed. If case 1 applies, the EI value is calculated using the approximate expression shown as a long dashed short dashed line in FIG. 54. Furthermore, if case 2 applies, the flow advances to step S112 and exception process (5) is executed. In this exception process (5), it is determined whether or not the angular velocity $\omega x$ in the x-axial direction around the top is larger than zero.

If the result is YES at step S112, the EI value is calculated using the approximate expression shown as a long dashed short dashed line in FIG. 54. On the other hand, if the result is NO at step S112, the flow advances to step S113 and exception process (6) is executed. In this exception process (6), it is determined whether or not the weight of a club (his/her own club) ordinarily used by a golfer to whom a fitting is performed is smaller than 305 g.

If the result is YES at step S113, the EI value is calculated using the approximate expression shown as a long dashed short dashed line in FIG. 54. On the other hand, if the result is NO at step S113, the EI value is calculated using the approximate expression shown as a solid line in FIG. 54.

Furthermore, if case 3 applies at step S111, the flow advances to step S114 and exception process (7) is executed. In this exception process (7), it is determined whether or not the angular velocity $\omega z$ in the z-axial direction is larger than 270. If the result is YES at step S114, the EI value is calculated using the approximate expression shown as a solid line in FIG. 54.

On the other hand, if the result is NO at step S114, the flow advances to step S115 and exception process (8) is executed. In this exception process (8), it is determined whether or not the weight of a club (his/her own club) ordinarily used by a golfer to whom a fitting is performed is smaller than 318 g. If the result is YES at step S115, the EI value is calculated using the approximate expression shown as a solid line in FIG. 54. On the other hand, if the result is NO at step S115, the EI value is calculated using the approximate expression shown as a short dashed line in FIG. 54.

The approximate expression for case (1), the approximate expression for case (2), and the approximate expression for case (3) can all be regarded as a linear expression representing a regression line obtained by least squares method. Slopes and intercepts of the respective expressions are shown in the following Table 15.

TABLE 15

|  | Slope | Intercept |
|---|---|---|
| HS > 45 | 0.0014 | 3.8 + 0.6 |
| 45 ≥ HS ≥ 41 |  | 3.8 |
| HS < 41 |  | 3.8 − 0.9 |

TABLE 16

|  | Slope | Intercept |
|---|---|---|
| HS > 45 | 0.0042 | 5.83 |
| 45 ≥ HS ≥ 41 | 0.0031 | 5.12 |
| HS < 41 | 0.0019 | 4.32 |

Figure 56:
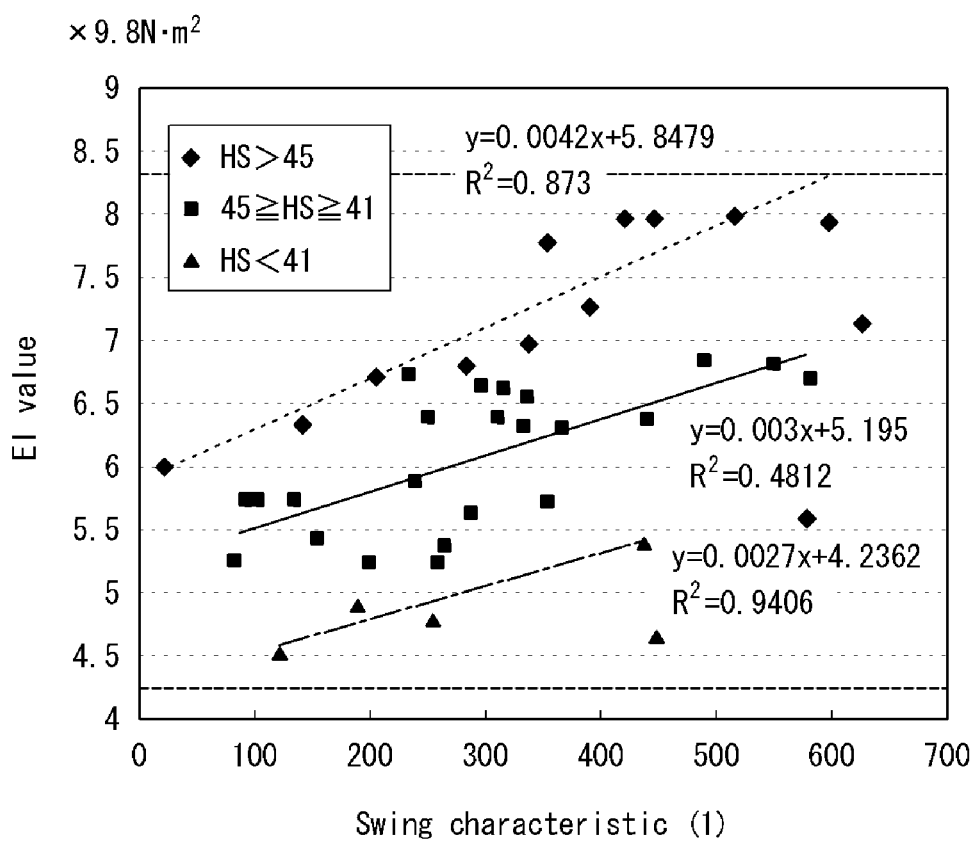
FIG. 56 shows a relationship between bending stiffness (EI value) and swing characteristic amount (1) at the measurement point of "36 inches;"

FIG. 56 shows a relationship between bending stiffness (EI value) and the swing characteristic amount (1) at the measurement point of "36 inches" created in advance as described above, and FIG. 57 shows a flow for calculating the EI value at the measurement point of "36 inches." Also for the swing characteristic amount (1), three approximate expressions in accordance with head speed of a golfer are configured. More specifically, an approximate expression is configured for each of the cases where the head speeds are lower than 41 m/s (case 1), not lower than 41 m/s but not higher than 45 m/s (case 2), and higher than 45 m/s (case 3).

First, at step S121, it is determined which of case 1, case 2, or case 3 applies to the head speed. If case 1 applies, the EI value is calculated using the approximate expression shown as a long dashed short dashed line in FIG. 56. Furthermore, if case 2 applies, the flow advances to step S122 and exception process (5) is executed. In this exception process (5), it is determined whether or not the angular velocity ωx in the x-axial direction around the top is larger than zero.

If the result is YES at step S122, the EI value is calculated using the approximate expression shown as a long dashed short dashed line in FIG. 56. On the other hand, if the result is NO at step S122, the flow advances to step S123 and exception process (6) is executed. In this exception process (6), it is determined whether or not the weight of a club (his/her own club) ordinarily used by a golfer to whom a fitting is performed is smaller than 305 g.

If the result is YES at step S123, the EI value is calculated using the approximate expression shown as a long dashed short dashed line in FIG. 56. On the other hand, if the result is NO at step S123, the EI value is calculated using the approximate expression shown as a solid line in FIG. 56.

Furthermore, if case 3 applies at step S121, the flow advances to step S124 and exception process (7) is executed. In this exception process (7), it is determined whether or not the angular velocity ωz in the z-axial direction is larger than 270. If the result is YES at step S124, the EI value is calculated using the approximate expression shown as a solid line in FIG. 56.

On the other hand, if the result is NO at step S124, the flow advances to step S125 and exception process (8) is executed. In this exception process (8), it is determined whether or not the weight of a club (his/her own club) ordinarily used by a golfer to whom a fitting is performed is smaller than 318 g. If the result is YES at step S125, the EI value is calculated using the approximate expression shown as a solid line in FIG. 56. On the other hand, if the result is NO at step S125, the EI value is calculated using the approximate expression shown as a short dashed line in FIG. 56.

The approximate expression for case (1), the approximate expression for case (2), and the approximate expression for case (3) can all be regarded as a linear expression representing a regression line obtained by least squares method. Slopes and intercepts of the respective expressions are shown in the following Table 16.

[Calculation of IFC in Every Inch]

With respect to the EI value of the shaft calculated in every inch using the above described method, one of the values of the 10-scale IFC is calculated using a conversion table shown in, for example, Tables 1 to 4. As described above, in the present embodiment, a method of sorting shafts into 10 scales within a range of shafts intended to be provided to a user by a fitter while taking into consideration frequency of usage etc., is employed.

[Shaft Selection]

In the manner described above, IFC in every inch is calculated for a golfer to whom a fitting is performed. Examples of calculated IFC may include 36 inches: 5, 26 inches: 4, 16 inches: 4, and 6 inches: 2.

Then, a shaft that matches the most with the calculation result is selected from a database. The database has stored therein data of multiple types of shafts regarding weight, IFC measured in advance in every inch, etc. By using the database, "coincidence rate" shown in the above described expression (3) is calculated for all clubs stored in the database, and a club whose value therefrom is the smallest is suggested to the golfer. It should be noted that "coincidence rate" in the present specification does not mean the degree of coincidence but indicates an index whose value is small when a shaft has a bending stiffness that is close to a calculation result, as obvious from expression (3). A coincidence rate of zero means a shaft has bending stiffness that is identical to a calculation result in every inch.

When there are multiple shafts whose coincidence rates are small to the same degree, multiple shafts may be suggested to the user, or they may be narrowed down to a single shaft after taking into consideration a request of the user. As the standard for narrowing down to a single shaft, there are methods such as a method of placing greater value on ease of swinging by prioritizing a coincidence rate of IFC at "36 inches" or "26 inches" on the shaft hand side, and a method of placing greater value on performance (flight distance, directionality) by prioritizing a coincidence rate of IFC at "16 inches" or "6 inches" on the shaft front end side.

Furthermore, in the present embodiment, when performing the selecting based on "coincidence rate" described above, an interview is conducted beforehand with the golfer to whom a fitting is performed with regard to the weight of his/her own club. Among the multiple shafts that are stored in the database, fitting is performed based on the result of the interview, using shafts having a weight within a range of plus and minus 5 g of the weight of the golfer's own club. If the weight of a golf club having a selected shaft is largely different from the weight of his/her own club that is ordinarily used, there is a possibility of the golfer not being able to exert his/her full performance due to swinging being difficult because of difficulty in adjusting the timing. In order to prevent this with certainty, it is preferable to perform the fitting using shafts having a weight within a range of plus and minus 5 g of the weight of the golfer's own club.

[Verification Result]

A shaft-exchangeable golf club whose shaft can be freely exchanged was manufactured, and verification of the effectiveness of the fitting method according to the present embodiment was conducted using this golf club.

An experiment was conducted using, as subjects, testers who use an S or an X shaft and who have skills equivalent to a single digit handicap player. The number of the testers was 43, and their head speeds were about 41 to 51 m/s.

First, a tester was asked to test-hit a ball using a golf club having a sensor attached on a grip thereof to measure face and approach angles and swing characteristic amounts of the tester, and a single shaft having a bending stiffness and kick point rate matching the tester was determined from a database using the face and approach angles and the swing characteristic amounts in accordance with the above described flow (cf. FIG. 44). In this database, data of 59 shafts whose IFCs are calculated in advance in every inch are stored.

Next, the tester was asked to test-hit using, from among the 59 shafts, five shafts that have different shaft properties (flex, kick point) and whose weights are within plus and minus 5 g of the tester's own club. As shown in the above described FIG. 29, the five shafts had properties regarding flex (hardness) and kick point of: hard and low kick point; hard and middle kick point; moderate hardness and middle kick point; soft and middle kick point; and soft and high kick point. Shafts having such five patterns of properties were prepared in different weight levels.

Evaluation standards were set as, as a result of the test-hit: if there is one club that has large flight distance, capable of obtaining a ball course that does not curve, and is easy to swing among the five clubs, whether or not a shaft whose shaft properties are close to those of the one club has been selected; or if there are two or more such clubs, whether or not the selected shaft is contained in or in the vicinity of an ellipse (cf. shaded area in FIG. 29) including those shafts.

For each of the 43 testers, it was determined as a "correct answer" when the fitted club was included in the ellipse. The result was that 38 out of the 43 testers confirmed that fitting was performed correctly. The correct answer rate was (38/43)×100≈88%. Then, it was confirmed with the 38 testers to whom the method was effective (who obtained a correct answer) how effective the method was regarding flight distance, directionality, and ease of swinging. As averages of the 38 testers, it was confirmed that flight distance increased by 7.4 yards, directionality improved where a shift of 11.5 yards toward the center was observed, and ease of swinging improved by 1.63 points. It should be noted that evaluation of ease of swinging is based on a 9-scale evaluation ("5" as being neither easy nor difficult) shown in FIG. 20.

It should be noted that a correct answer rate when selection was conducted based only on kick point rate as it has been conventionally was 67%. From this, it can be understood that the fitting method according to the invention of the present application is superior than prior art in terms of selection accuracy.

[Other Modes of IFC Fitting]

In the above described embodiment, with regard to the latter half portion of the fitting method according to the third aspect of the present invention, i.e., at step S88 in the flowchart shown in FIG. 44; all the swing characteristic amounts (1) to (4) calculated at step S82 are used. However, the present invention is not limited thereto, and effective shaft selection can be conducted by using at least two swing characteristic amounts among the four swing characteristic amounts.

For example, a case will be described regarding selecting a shaft using the swing characteristic amount (1) that is correlated with bending stiffness at the measurement point of 36 inches from the tip end of the shaft, and the swing characteristic amount (2) that is correlated with bending stiffness at the measurement point of 26 inches.

Table 17 shows ideal IFC configured with the above described method by asking two testers, Mr. A and Mr. B, to actually swing a golf club. Then, with respect to calculation results of Mr. A and Mr. B, multiple shafts were selected from the 59 shafts used in the above described verification while prioritizing coincidence rates of the swing characteristic amount (1) and the swing characteristic amount (2). Furthermore, among those shafts, a shaft having the small coincidence rate taking into account all the four swing characteristic amounts was defined as an optimum shaft, and a shaft having the second smallest coincidence rate was defined as a second candidate shaft. Then, for comparison, a shaft having a coincidence rate that is larger than that of the second candidate is defined as an improper shaft among shafts whose weight is within plus or minus 5 g of the tester's own club.

TABLE 17

| | Ideal IFC | | | | Test-hit shaft (Optimum) | | | | | Test-hit shaft (Second candidate) | | | | | Test-hit shaft (Improper) | | | | |
|---|---|---|---|---|---|---|---|---|---|---|---|---|---|---|---|---|---|---|---|
| | 36 | 26 | 16 | 6 | 36 | 26 | 16 | 6 | Coincidence rate | 36 | 26 | 16 | 6 | Coincidence rate | 36 | 26 | 16 | 6 | Coincidence rate |
| Mr. A | 5 | 5 | 3 | 3 | 5 | 6 | 4 | 3 | 2 | 5 | 6 | 5 | 7 | 7 | 7 | 9 | 6 | 3 | 9 |
| Mr. B | 3 | 5 | 3 | 4 | 3 | 3 | 2 | 4 | 3 | 4 | 6 | 3 | 2 | 4 | 5 | 6 | 5 | 6 | 7 |

Testers Mr. A and Mr. B were asked to swing golf clubs each having one of three shafts selected in the above described manner, and flight distance, directionality of a hit ball, and ease of swinging were measured or evaluated. The results are shown in Table 18. In Table 18 and a later described Table 20, "flight distance (yard)" is a flight distance (not including the run) of a hit ball, "directionality" is an absolute value (yard) of left-right bending of a hit ball, and ease of swinging is a sensory evaluation by the tester.

TABLE 18

| | | Optimum | Second candidate | Improper |
|---|---|---|---|---|
| Mr. A | Flight distance | 295 | 291 | 287 |
| | Directionality (Stability) | 5 | 10 | 7 |
| | Ease of swinging | ○ | X | X |
| Mr. B | Flight distance | 281 | 280 | 276 |
| | Directionality (Stability) | 11 | 20 | 17 |
| | Ease of swinging | ○ | Δ | X |

From Table 18, for Mr. A, it can be understood that the shaft selected using the swing characteristic amount (1) and the swing characteristic amount (2) enabled larger ball flight distance than the improper shaft having a large match index. Furthermore, for Mr. B, it can be understood that the shaft selected using the swing characteristic amount (1) and the swing characteristic amount (2) enabled increases in ease of swinging the club and ball flight distance when compared to the improper shaft having a large match index.

Next, as another mode, a case will be described regarding selecting a shaft using the swing characteristic amount (3) that is correlated with bending stiffness at the measurement point of 16 inches from the tip end of the shaft, and the swing characteristic amount (4) that is correlated with bending stiffness at the measurement point of 6 inches.

Table 19 shows ideal IFC configured with the above described method by asking a tester, Mr. C, to actually swing a golf club. Then with respect to calculation result for Mr. C, multiple shafts were selected from the 59 shafts used in the above described verification while prioritizing coincidence rates of the swing characteristic amount (3) and the swing characteristic amount (4). Furthermore, among those shafts, a shaft having the small coincidence rate that takes into account all the four swing characteristic amounts was defined as an optimum shaft, and a shaft having the second smallest coincidence rate was defined as a second candidate shaft. Then, for comparison, a shaft having a coincidence rate that is larger than that of the second candidate is defined as an improper shaft among shafts whose weight is within plus or minus 5 g of the tester's own club.

2a casing
10 computer (data analysis device)
20 shaft
20a tip end
20b butt end
102 fitting apparatus
104 front camera
106 upper camera
108 first sensor
110 control device
112 information processing device
114 light emitter
116 light receiver
118 information input section
120 keyboard
122 mouse
124 display
126 interface board
128 memory
130 CPU
132 hard disk
136 golf club
138 head
140 shaft

TABLE 19

| | Ideal IFC | | | | Test-hit shaft (Optimum) | | | | | Test-hit shaft (Second candidate) | | | | | Test-hit shaft (Improper) | | | | |
|---|---|---|---|---|---|---|---|---|---|---|---|---|---|---|---|---|---|---|---|
| | 36 | 26 | 16 | 6 | 36 | 26 | 16 | 6 | Coincidence rate | 36 | 26 | 16 | 6 | Coincidence rate | 36 | 26 | 16 | 6 | Coincidence rate |
| Mr. C | 8 | 9 | 4 | 5 | 6 | 6 | 5 | 6 | 7 | 5 | 6 | 4 | 3 | 8 | 5 | 7 | 9 | 6 | 11 |

Tester Mr. C was asked to swing golf clubs each having one of three shafts selected in the above described manner, and flight distance, directionality of a hit ball, and ease of swinging were measured or evaluated. The results are shown in Table 20.

TABLE 20

| | Optimum | Second candidate | Improper |
|---|---|---|---|
| Flight distance | 248 | 250 | 246 |
| Directionality (Stability) | 11 | 20 | 25 |
| Ease of swinging | ◯ | Δ | X |

From Table 20, it can be understood that the shaft selected using the swing characteristic amount (3) and the swing characteristic amount (4) enabled increases in ease of swinging the club and ball flight distance when compared to the improper shaft having a large coincidence rate.

From the description above, it can be understood that a shaft selected using two of the swing characteristic amounts among the four swing characteristic amounts is more suited for a golfer than a shaft selected without using the IFC fitting method. It is needless to say that a shaft more suited for a golfer can be selected when three rather than two, and all four rather than three of the swing characteristic amounts are used.

DESCRIPTION OF THE REFERENCE CHARACTERS 1 golf club
2 sensor
142 grip
144 shaft hole
146 hosel
148 grip hole
150 second sensor
G golfer
B ball

What is claimed is:

1. A fitting method of a shaft of a golf club for selecting a shaft matching a golfer based on a swing of the golfer, the method comprising the steps of:
   obtaining measurement values from a sensor attached to a grip of a golf club and capable of measuring angular velocities about three axes when a golf ball is hit by the golf club;
   determining address, top, and impact of a swing from the measurement values; and
   selecting a shaft that matches a golfer through a usage of the following swing characteristic amounts of (a) to (d) obtained from the measurement values:
   (a) amount of change of grip angular velocity in a direction of a wrist release around the top;
   (b) an average value of grip angular velocity in the direction of a wrist release, from the top to a point during a downswing where a grip angular velocity in the direction of a wrist release becomes a maximum;
   (c) an average value of grip angular velocity in the direction of a wrist release, from a point during a downswing where a grip angular velocity in the direction of a wrist release becomes a maximum to the impact;
   (d) an average value of grip angular velocity in the direction of a wrist release, from the top to the impact, wherein the above described (a) to (d) are respectively measured so as to correspond to bending stiffnesses of the shaft at plural positions including a position at a front end side of the shaft and a position of the shaft near hands of the golfer, an approximate expression that is created in advance with test-hitting and that represents a relationship between bending stiffnesses of the shaft and each of the swing characteristic amounts of (a) to (d), and the swing characteristic amounts of (a) to (d) obtained from the measurement values, are used to acquire bending stiffnesses of the shaft plural positions including a position at a front end side of the shaft and a position of the shaft near hands of the golfer, and from multiple shafts whose bending stiffnesses are measured in advance at the plural positions, a shaft matching a golfer is selected based on the acquired bending stiffnesses of the shaft at plural positions.

2. The fitting method of a shaft of a golf club according to claim 1, wherein the plural positions including a position at a front end side of the shaft and a position of the shaft near hands of the golfer are four positions of 36 inches, 26 inches, 16 inches, and 6 inches each from a tip end of the shaft.

3. The fitting method of a shaft of a golf club according to claim 2, wherein one rank value among multiple-scale rank values is given to each of the bending stiffnesses at the four positions in accordance with the acquired bending stiffness values; and a shaft matching a golfer is selected based on the given rank values at the four positions, from multiple shafts whose bending stiffnesses have been measured in advance at the four positions and that are each given one rank value among multiple-scale rank values in accordance with measured bending stiffness values.

4. The fitting method of a shaft of a golf club according to claim 2, wherein multiple approximate expressions are created in accordance with head speed.

5. The fitting method of a shaft of a golf club according to claim 2, wherein when a length of the golf club of a user is different from a length of a golf club having the shaft selected from multiple shafts, a total weight of the golf club is changed based on the difference of the two lengths.

6. A fitting method of a shaft of a golf club for selecting a shaft matching a golfer based on a swing of the golfer, the method comprising the steps of:

obtaining measurement values from a sensor attached to a grip of a golf club and capable of measuring angular velocities about three axes when a golf ball is hit by the golf club;

determining address, top, and impact of a swing from the measurement values; and selecting a shaft that matches a golfer through a usage of the following swing characteristic amounts of (a) to (a) obtained from the measurement values:

(a) amount of change of grip angular velocity in a direction of a wrist release around the top;

(b) an average value of grip angular velocity in the direction of a wrist release, from the top to a point during a downswing where a grip angular velocity in the direction of a wrist release becomes a maximum;

(c) an average value of grip angular velocity in the direction of a wrist release, from a point during a downswing where a grip angular velocity in the direction of a wrist release k becomes a maximum to the impact;

(d) An average value of grip angular velocity in the direction of a wrist release, from the top to the impact, wherein the above described (a) to (d) are respectively measured so as to correspond to bending stiffnesses of the shaft at four positions of 36 inches, 26 inches, 16 inches, and 6 inches each from a tip end of the shaft;

an approximate expression that is created in advance with test-hitting and that represents a relationship between bending stiffnesses of the shaft and each of the swing characteristic amounts of (a) to (d), and the swing characteristic amounts of (a) to (d) obtained from the measurement values, are used to acquire bending stiffnesses of the shaft at our positions of 36 inches, 26 inches, 16 inches, and 6 inches from the tip end of the shaft; and from multiple shafts whose bending stiffnesses are measured in advance at the four positions, a shaft matching a golfer is selected based on the acquired bending stiffnesses of the shaft at four positions.

\* \* \* \* \*